(12) United States Patent
Liu et al.

(10) Patent No.: US 12,267,591 B2
(45) Date of Patent: Apr. 1, 2025

(54) VIDEO PROCESSING METHOD AND RELATED ELECTRONIC DEVICE

(71) Applicant: Beijing Honor Device Co., Ltd., Beijing (CN)

(72) Inventors: Zhenyi Liu, Beijing (CN); Jianyong Xuan, Beijing (CN); Haikuan Gao, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 0 days.

(21) Appl. No.: 18/024,869

(22) PCT Filed: Aug. 27, 2022

(86) PCT No.: PCT/CN2022/115328
§ 371 (c)(1),
(2) Date: Mar. 6, 2023

(87) PCT Pub. No.: WO2023/051126
PCT Pub. Date: Apr. 6, 2023

(65) Prior Publication Data
US 2024/0305890 A1   Sep. 12, 2024

(30) Foreign Application Priority Data

Sep. 30, 2021 (CN) .......................... 202111161876.0
Dec. 23, 2021 (CN) .......................... 202111593768.0

(51) Int. Cl.
*H04N 23/69* (2023.01)
*G10L 21/0208* (2013.01)
*H04R 3/00* (2006.01)

(52) U.S. Cl.
CPC ......... *H04N 23/69* (2023.01); *G10L 21/0208* (2013.01); *H04R 3/005* (2013.01)

(58) Field of Classification Search
CPC ..... H04N 23/69; G10L 21/0208; H04R 3/005
(Continued)

(56) References Cited

U.S. PATENT DOCUMENTS

| | | | | |
|---|---|---|---|---|
| 8,218,033 B2* | 7/2012 | Oku | ....................... | G03B 31/00 |
| | | | | 348/240.99 |
| 8,401,364 B2* | 3/2013 | Oku | ....................... | H04N 5/772 |
| | | | | 386/224 |

(Continued)

FOREIGN PATENT DOCUMENTS

| | | |
|---|---|---|
| CN | 107105183 A | 8/2017 |
| CN | 110827843 A | 2/2020 |

(Continued)

OTHER PUBLICATIONS

Arun Asokan Nair et al: "Audiovisual Zooming: What You See Is What You Hear", In Proceedings of the 27th ACM International Conference on Multimedia (MM '19), Association for Computing Machinery, New York, NY, USA, 1107-1118.

*Primary Examiner* — Pritham D Prabhakher
(74) *Attorney, Agent, or Firm* — WOMBLE BOND DICKINSON (US) LLP

(57) ABSTRACT

This application provides a video processing method and a related electronic device. The video processing method includes: When generating a video, the electronic device may perform image zooming based on a change in a zoom ratio, or may perform audio zooming on an audio based on a change in a zoom ratio. That the electronic device performs audio zooming on the audio includes: When the zoom ratio increases and an angle of view decreases, suppressing a sound of an object outside a photographing range and enhancing a sound of a photographed object within the photographing range; when the zoom ratio decreases and the angle of view increases, suppressing a sound of an object (Continued)

outside the photographing range and weakening a sound of a photographed object within the photographing range.

20 Claims, 39 Drawing Sheets

(58) Field of Classification Search
USPC .................................................. 348/240.3
See application file for complete search history.

(56) References Cited

U.S. PATENT DOCUMENTS

| | | | |
|---|---|---|---|
| 8,712,231 B2* | 4/2014 | Ohtsuka | G03B 17/14 |
| | | | 396/312 |
| 9,258,644 B2 | 2/2016 | Maenpaa et al. | |
| 10,998,870 B2* | 5/2021 | Aoyama | H04N 21/43072 |
| 11,277,686 B2 | 3/2022 | Kim et al. | |
| 11,425,497 B2* | 8/2022 | Salehin | H04R 1/406 |
| 11,671,752 B2* | 6/2023 | Kim | H04R 5/033 |
| | | | 381/92 |
| 2009/0066798 A1* | 3/2009 | Oku | G03B 31/00 |
| | | | 348/207.99 |
| 2011/0052139 A1* | 3/2011 | Oku | H04R 3/005 |
| | | | 348/222.1 |
| 2011/0085061 A1* | 4/2011 | Kim | H04R 29/004 |
| | | | 348/240.99 |
| 2012/0308220 A1 | 12/2012 | Ohtsuka | |
| 2013/0021502 A1* | 1/2013 | Oku | G03B 31/00 |
| | | | 348/240.99 |
| 2014/0029761 A1* | 1/2014 | Maenpaa | H04R 3/005 |
| | | | 381/92 |
| 2020/0322540 A1* | 10/2020 | Tsujimoto | H04N 23/695 |
| 2020/0329202 A1* | 10/2020 | Toriumi | G10L 25/51 |
| 2020/0358415 A1 | 11/2020 | Aoyama et al. | |
| 2021/0044896 A1 | 2/2021 | Kim et al. | |
| 2022/0201395 A1* | 6/2022 | Salehin | G02B 27/0093 |
| 2022/0360891 A1* | 11/2022 | Kim | H04R 5/027 |
| 2023/0018004 A1 | 1/2023 | Wen et al. | |
| 2023/0041730 A1 | 2/2023 | Hu et al. | |
| 2023/0115929 A1 | 4/2023 | Bian et al. | |
| 2023/0116044 A1 | 4/2023 | Han et al. | |

FOREIGN PATENT DOCUMENTS

| | | |
|---|---|---|
| CN | 112492380 A | 3/2021 |
| CN | 112599144 A | 4/2021 |
| CN | 112951257 A | 6/2021 |
| CN | 113365012 A | 9/2021 |
| CN | 113365013 A | 9/2021 |
| CN | 113452898 A | 9/2021 |
| CN | 113497882 A | 10/2021 |
| CN | 114363512 A | 4/2022 |
| EP | 2690886 A1 | 1/2014 |
| KR | 20210017229 A | 2/2021 |
| WO | 2021175165 A1 | 9/2021 |
| WO | 2021175197 A1 | 9/2021 |

* cited by examiner

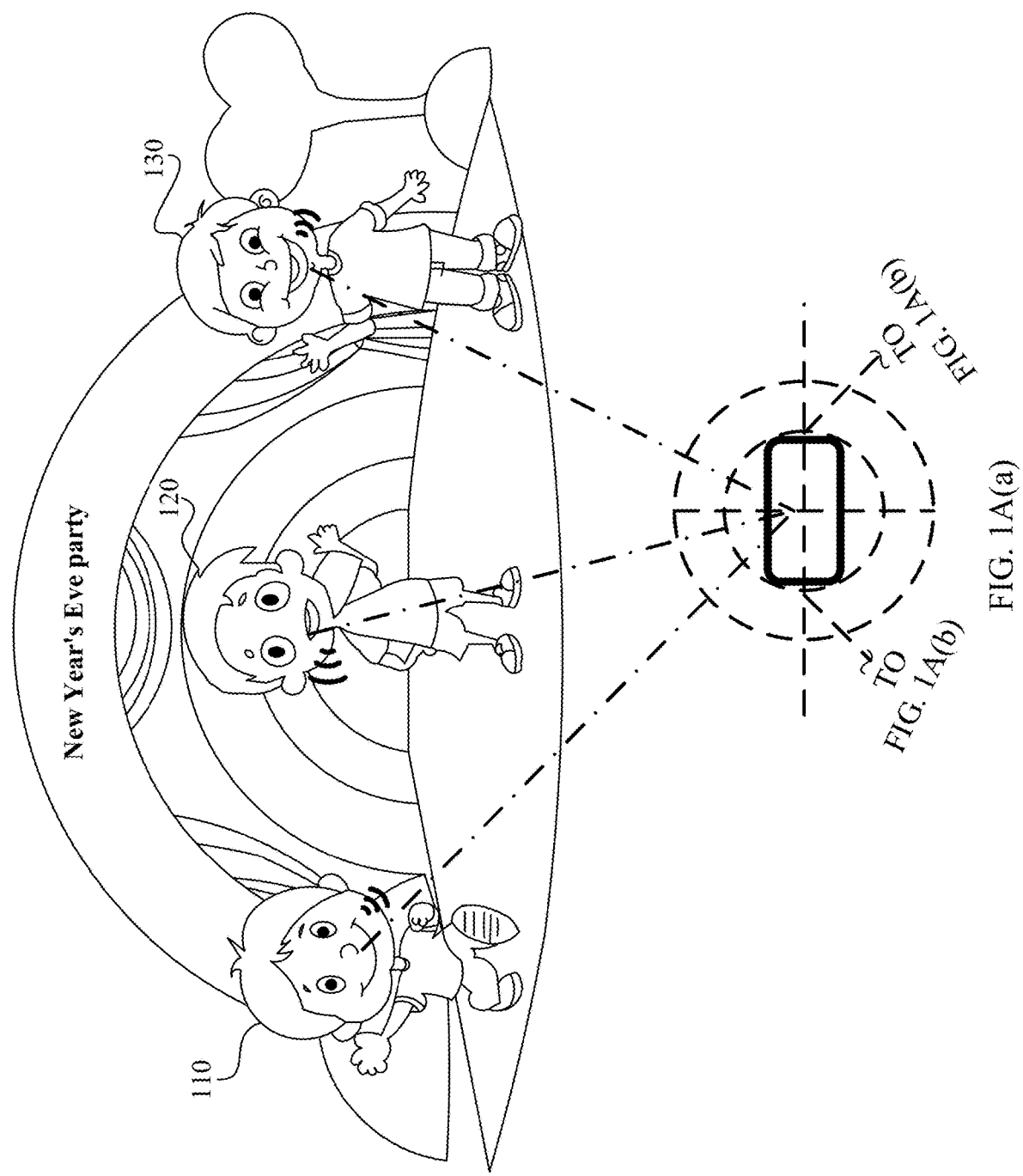

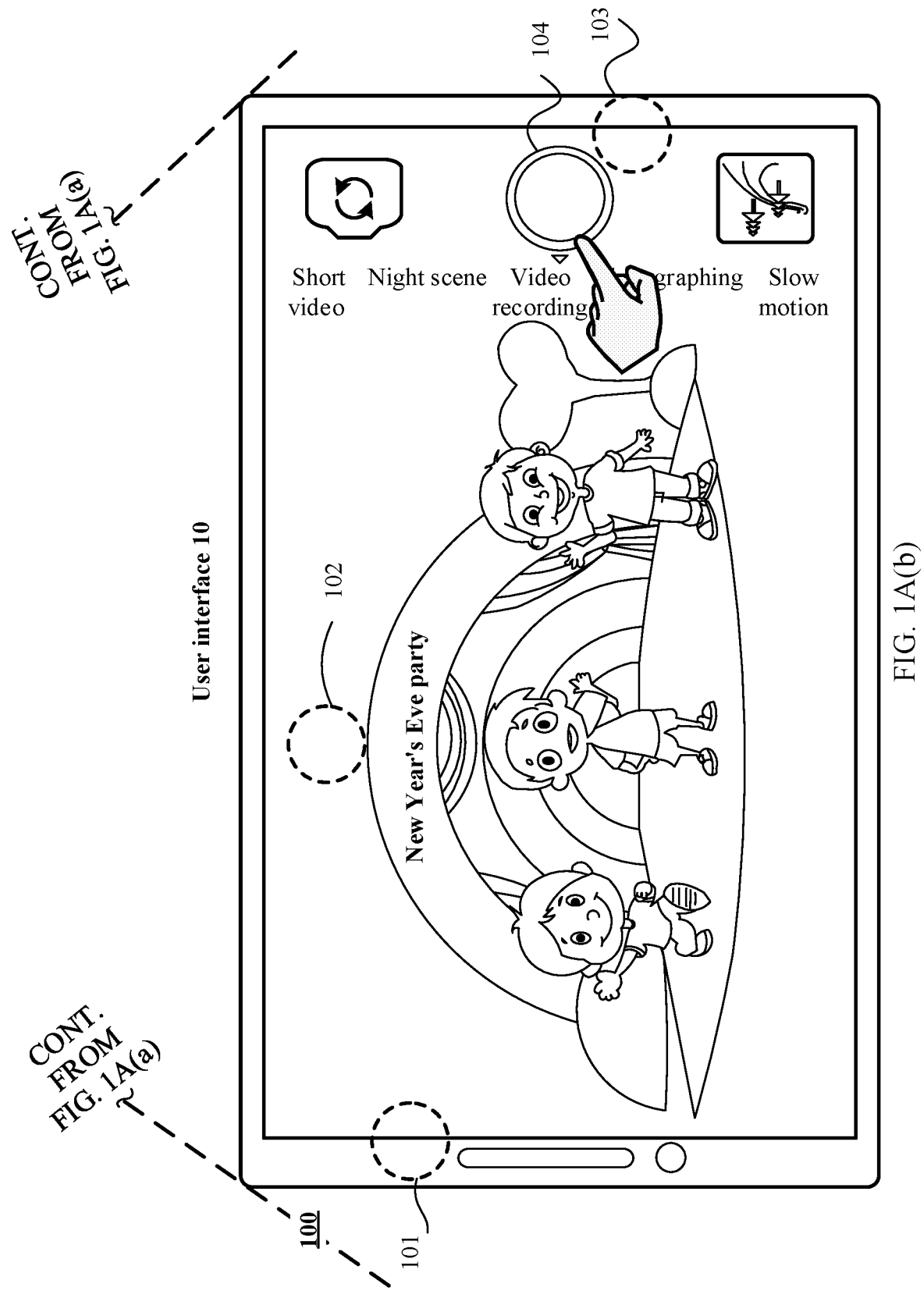

Beamforming diagram of a mono audio

Beamforming diagram of a mono audio

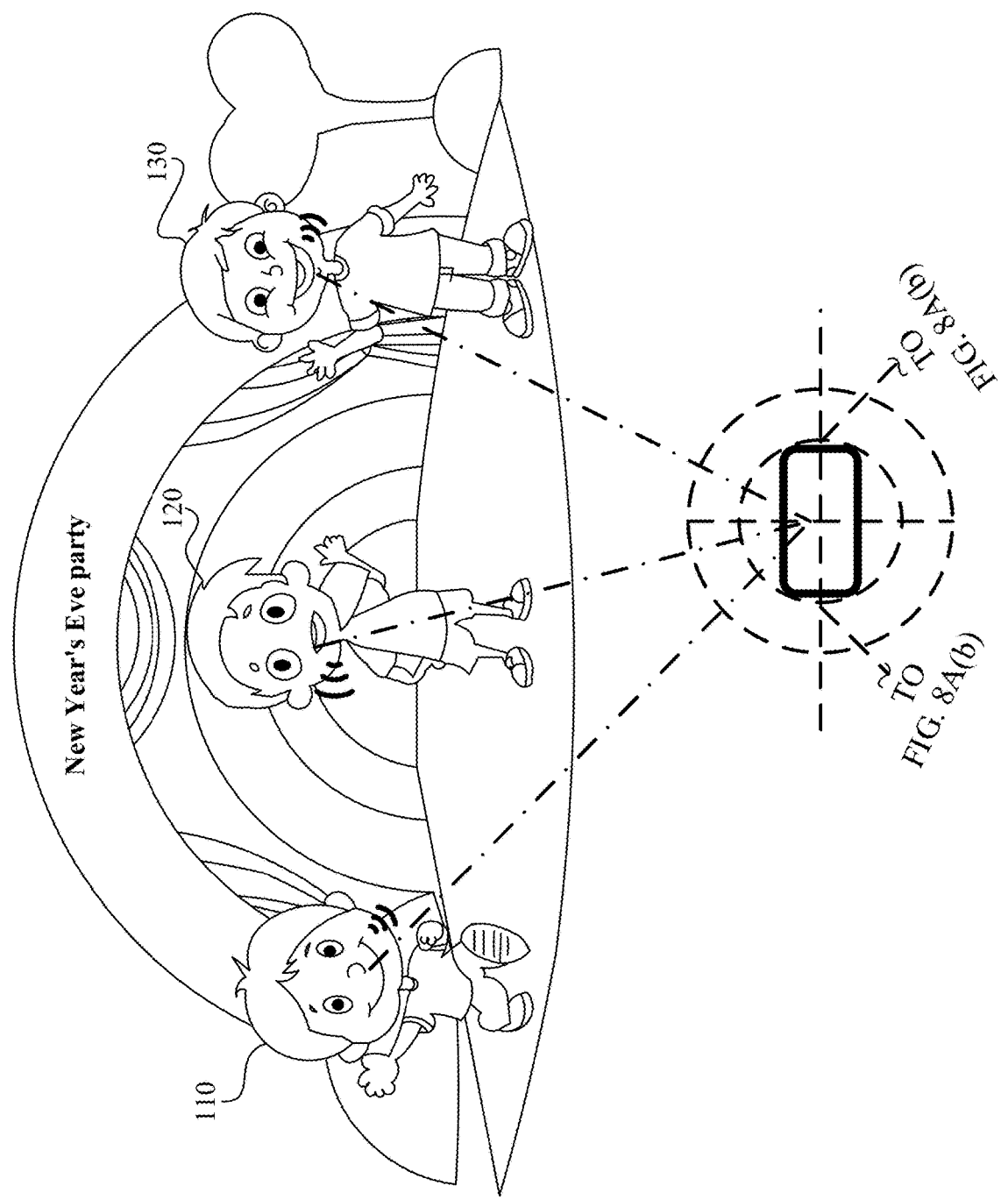

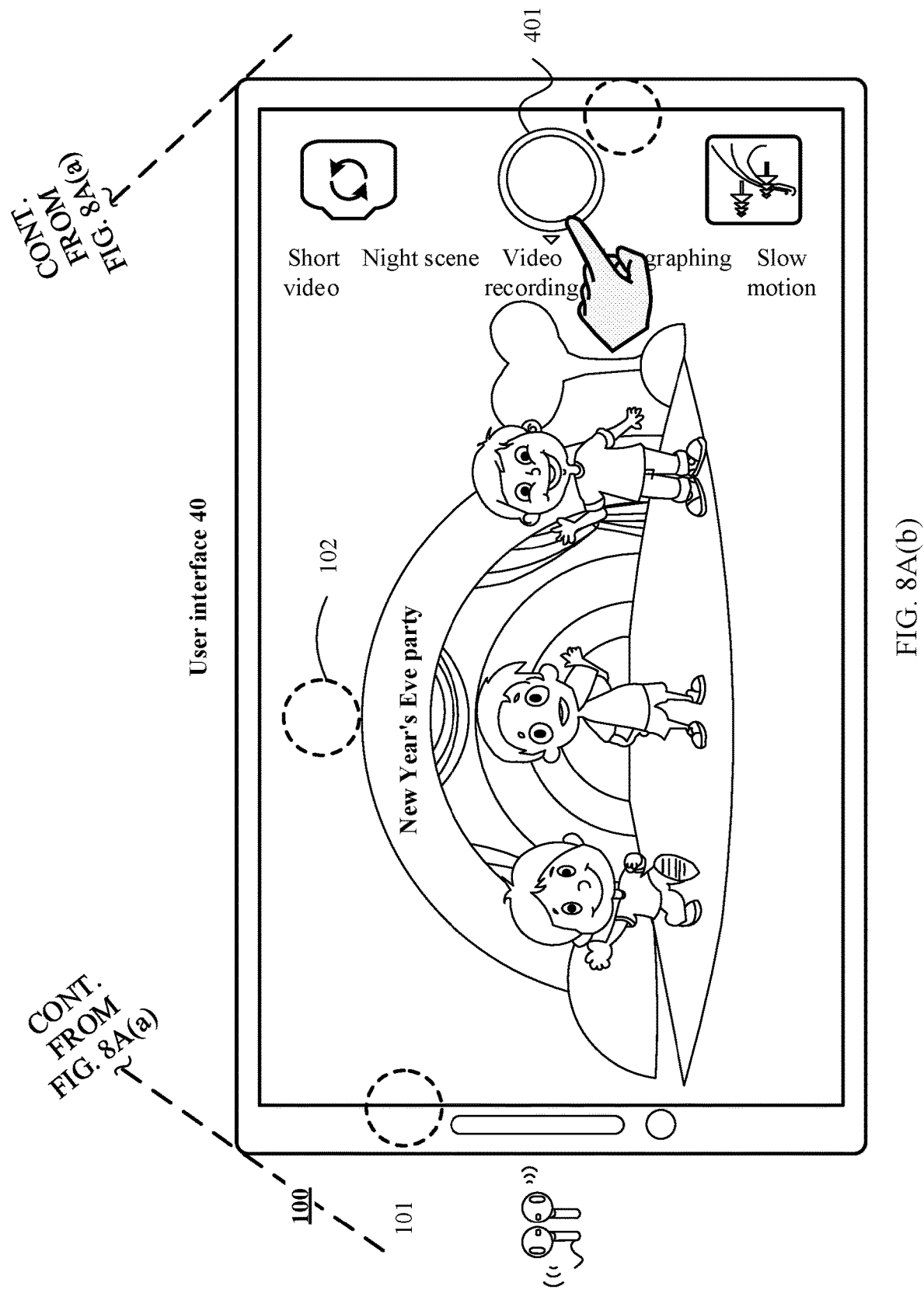

VIDEO PROCESSING METHOD AND RELATED ELECTRONIC DEVICE

This application is a national stage of International Application No. PCT/CN2022/115328, filed on Aug. 27, 2022, which claims priority to Chinese Patent Application No. 202111161876.0, filed on Sep. 30, 2021, and Chinese Patent Application No. 202111593768.0, filed on Dec. 23, 2021. The disclosures of each of the aforementioned applications are hereby incorporated by reference in their entireties.

TECHNICAL FIELD

This application relates to the field of video processing, and in particular, to a video processing method and a related electronic device.

BACKGROUND

With the development of terminal technologies, more video applications start to integrate an image zooming function. Image zooming means that in a photographing or video recording process, a focal length is changed so that a size of a photographed object in a video or an image is changed. A larger focal length leads to a larger photographed image. A smaller focal length leads to a smaller photographed image. In a video recording or live broadcast process, a target photographed object can be enlarged by changing the focal length of the image, so that the video recording or live broadcast better satisfies a need of a viewer.

In a video recording or live broadcast process of an electronic device, the electronic device usually receives audio signals of a plurality of sound sources in a photographing scene. In the video recording or live broadcast process, the electronic device can perform zooming on an image, but cannot perform zooming on an audio. To be specific, when a target photographed object in a video picture is enlarged by increasing a focal length, an audio signal of the target photographed object is not amplified, and an audio signal of another sound source is not suppressed. When a user watches a video or live broadcast, and when a photographed object in an image becomes smaller, the user tends to expect a smaller sound of the photographed object, and when the photographed object becomes larger, the user tends to expect a larger sound of the photographed object. In this way, when watching a video or live broadcast, the user usually has a more intuitive visual and audible feeling, thereby bringing good experience to the user.

Therefore, how to perform zooming on the audio while performing zooming on the image during video recording or live broadcast is an issue of increasing concern to a skilled person.

SUMMARY

This application provides a video processing method and an electronic device, so as to achieve an effect of simultaneously performing zooming on an audio and an image in a video recorded by the electronic device.

According to a first aspect, this application provides a video processing method. The method is applied to an electronic device and includes: The electronic device starts a camera; displaying a preview interface, where the preview interface includes a first control; detecting a first operation with respect to the first control; starting photographing in response to the first operation; displaying a photographing interface, where the photographing interface includes a second control and the second control is used to adjust a zoom ratio; displaying a first photographed image at a first moment when the zoom ratio is a first zoom ratio; a microphone collects a first audio at the first moment; detecting a third operation with respect to a third control; and stopping photographing and saving a first video in response to the third operation. The method further includes: processing the first audio to obtain a first left channel output audio and a first right channel output audio, where the processing the first audio to obtain a first left channel output audio and a first right channel output audio includes performing first processing on the first audio based on the first zoom ratio to obtain a first left channel input audio and a first right channel input audio; performing second processing on the first audio to obtain M channels of first sound source audios, where M represents a quantity of microphones of the electronic device; fusing the first left channel input audio with a first target audio to obtain a first left channel audio, where the first target audio is a sound source audio having highest correlation with the first left channel input audio among the M channels of first sound source audios; fusing the first right channel input audio with a second target audio to obtain a first right channel audio, where the second target audio is a sound source audio having highest correlation with the first right channel input audio among the M channels of first sound source audios; and performing enhancement processing on the first left channel audio and the first right channel audio to obtain the first left channel output audio and the first right channel output audio.

In the foregoing embodiment, in the video recording process, the electronic device may simultaneously perform zooming on an audio and an image based on the zoom ratio of the photographed image. A manner of performing zooming on an audio is enhancing a sound of a photographed object becoming larger in the photographed image so that the sound of the photographed object sounds large. A sound of a photographed object becoming smaller in the photographed image or a sound of a photographed object absent from the photographed image is suppressed so that the sound of the photographed object sounds small.

With reference to the first aspect, in a possible implementation, the first photographed image includes a first target object and a second target object, and the method further includes: detecting a second operation with respect to the second control; adjusting the zoom ratio to be a second zoom ratio in response to the second operation, where the second zoom ratio is greater than the first zoom ratio; displaying a second photographed image at a second moment, where the second photographed image includes the first target object and does not include the second target object; the microphone collects a second audio at the second moment, where the second audio includes a first sound corresponding to the first target object and a second sound corresponding to the second target object; and processing the second audio to obtain a second left channel output audio and a second right channel output audio, where the second left channel output audio and the second right channel output audio include a third sound and a fourth sound, the third sound corresponds to the first target object, the fourth sound corresponds to the second target object, the third sound is enhanced with respect to the first sound, and the fourth sound is suppressed with respect to the second sound. In this way, the electronic device can perform zooming on an audio by changing the zoom ratio. The sound of the photographed object becoming larger in the photographed image is enhanced so that the sound of the photographed object sounds large. The sound of the photographed object becoming smaller in the photographed image or the sound of the photographed object absent from the photographed image is enhanced so that the sound of the photographed object sounds large.

With reference to the first aspect, in a possible implementation, the processing the second audio to obtain a second left channel output audio and a second right channel output audio includes: performing first processing on the second audio based on the second zoom ratio to obtain a second left channel input audio and a second right channel input audio; performing second processing on the second audio to obtain M channels of second sound source audios, where M represents a quantity of microphones of the electronic device; fusing the second left channel input audio with a third target audio to obtain a second left channel audio, where the third target audio is a sound source audio having highest correlation with the second left channel input audio among the M channels of second sound source audios; fusing the second right channel input audio with a fourth target audio to obtain a second right channel audio, where the fourth target audio is a sound source audio having highest correlation with the second right channel input audio among the M channels of second sound source audios; and performing enhancement processing on the second left channel audio and the second right channel audio to obtain the second left channel output audio and the second right channel output audio. In this way, after performing the first processing (beamforming) and the second processing (blind source separation) on the first audio, the electronic device obtains the first left channel output audio and the first right channel output audio for which the sound of the photographed object absent from the photographed image is suppressed and the sound of the photographed object becoming larger in the photographed image is enhanced, thereby implementing audio zooming.

With reference to the first aspect, in a possible implementation, the performing second processing on the first audio to obtain M channels of first sound source audios specifically includes: obtaining the M channels of first sound source audios through calculation according to the formula $Y(\omega) = \Sigma_{i=1}^{M} W_i(\omega) x_i(\omega)$, where $x_i(\omega)$ represents an audio signal of a first audio collected by the $i^{th}$ microphone in frequency domain, $W_i(\omega)$ represents a first non-negative matrix corresponding to the $i^{th}$ microphone, $Y(\omega)$ represents a first matrix whose size is M*L, and each row vector of the first matrix is one channel of first sound source audio. In this way, the second processing (blind source separation) is performed on the first audio to obtain a plurality of channels of sound source audios, so that the electronic device can select and fuse a sound source audio having highest correlation with the first left channel audio and the first right channel audio, thereby improving accuracy of audio zooming.

With reference to the first aspect, in a possible implementation, the performing second processing on the second audio to obtain M channels of second sound source audios specifically includes: obtaining the M channels of second sound source audios through calculation according to the formula $Y'(\omega) = \Sigma_{i=1}^{M} W_i'(\omega) x_i'(\omega)$, where $x'(\omega)$ represents an audio signal of a second audio collected by the $i^{th}$ microphone in frequency domain, $WL'(\omega)$ represents a second non-negative matrix corresponding to the $i^{th}$ microphone, $Y'(\omega)$ represents a second matrix whose size is M*L, and each row vector of the second matrix is one channel of second sound source audio. In this way, the second processing (blind source separation) is performed on the second audio to obtain a plurality of channels of sound source audios, so that the electronic device can select and fuse a sound source audio having highest correlation with the second left channel audio and the second right channel audio, thereby improving accuracy of audio zooming.

With reference to the first aspect, in a possible implementation, the performing first processing on the first audio based on the first zoom ratio to obtain a first left channel input audio and a first right channel input audio specifically includes: obtaining the first left channel audio according to the formula $y_{l1}(\omega) = \alpha_1 * y_1(\omega) + (1-\alpha_1) * y_2(\omega)$; and obtaining the first right channel audio according to the formula $y_{r1}(\omega) = \alpha_1 * y_3(\omega) + (1-\alpha_1) * y_2(\omega)$, where $y_{l1}$ represents the first left channel input audio, $y_{r1}(\omega)$ represents the first right channel input audio, $\alpha_1$ represents a fusion coefficient obtained based on the first zoom ratio, $y_1(\omega)$ represents a first beam obtained based on the first audio and a first filter coefficient, $y_2(\omega)$ represents a second beam obtained based on the first audio and a second filter coefficient, and $y_3(\omega)$ represents a third beam obtained based on the first audio and a third filter coefficient. In this way, the electronic device performs the first processing (beamforming) on the first audio by using the beam obtained based on the zoom ratio, to obtain the first left channel input audio and the first right channel input audio for which the sound of the photographed object becoming larger in the photographed image is enhanced, and the sound of the photographed object becoming smaller in the photographed image or the sound of the photographed object absent from the photographed image is suppressed, thereby implementing audio zooming based on the zoom ratio.

With reference to the first aspect, in a possible implementation, before the performing first processing on the first audio based on the first zoom ratio to obtain a first left channel input audio and a first right channel input audio, the method further includes: obtaining the first beam, the second beam, and the third beam respectively according to the formula $y_1(\omega) = \Sigma_{i=1}^{M} w_{1i}(\omega) x_{i1}(\omega)$, the formula $y_2(\omega) = \Sigma_{i=1}^{M} w_{2i}(\omega) x_{i1}(\omega)$, and the formula $y_3(\omega) = \Sigma_{i=1}^{M} w_{3i}(\omega) x_{i1}(\omega)$, where $y_1(\omega)$ represents the first beam, $y_2(\omega)$ represents the second beam, $y_3(\omega)$ represents the third beam, $w_{1i}(\omega)$ represents a first filter coefficient corresponding to the $i^{th}$ microphone in a first direction, $w_{2i}(\omega)$ represents a second filter coefficient corresponding to the $i^{th}$ microphone in a second direction, $w_{3i}(\omega)$ represents a third filter coefficient corresponding to the $i^{th}$ microphone in a third direction, $x_{i1}(\omega)$ represents the first audio collected by the $i^{th}$ microphone, the first direction is any direction within a range of 10° counterclockwise from the front to 90° counterclockwise from the front of the electronic device, the second direction is any direction within a range of 10° counterclockwise from the front to 10° clockwise from the front of the electronic device, and the third direction is any direction within a range of 10° clockwise from the front to 90° clockwise from the front of the electronic device. In this way, different beams in preset directions can be obtained, so that the first processing (beamforming) is performed on the first audio, thereby implementing audio zooming based on the zoom ratio.

With reference to the first aspect, in a possible implementation, before the fusing the first left channel input audio with a first target sound source to obtain a first left channel audio, the method further includes: calculating a correlation value between the first left channel input audio and the M channels of first sound source audios according to the formula $$\gamma_i = \frac{\phi_{li}}{\sqrt{\phi_{ll\_1} \phi_{ii}}},$$

where $\emptyset_{li}$ represents $\{y_{l1}(\omega)Y_i(\omega)^*\}$, $\emptyset_{ll\_1}$ represents $E\{y_{l1}(\omega)y_{l1}(\omega)^*\}$, $\emptyset_{ii}$ represents $E\{Y_i(\omega)Y_i(\omega)^*\}$, $\gamma_i$ represents a correlation value between the first left channel input audio and the $i^{th}$ channel of first sound source audio, $y_{l1}(\omega)$ represents the first left channel input audio, and $Y_i(\omega)$ represents the $i^{th}$ channel of first sound source audio; if there is only one maximum correlation value among the M correlation values, determining a first sound source audio having the maximum correlation value as the first target audio; and if there are a plurality of maximum correlation values among the M correlation values, calculating an average value of first sound source audios corresponding to the plurality of maximum correlation values to obtain the first target audio. In this way, the electronic device may choose to fuse the first left channel input audio with the sound source audio having highest correlation with the first left channel input audio, to obtain a first left channel audio with less noise, thereby improving accuracy of audio zooming.

With reference to the first aspect, in a possible implementation, the fusing the first left channel input audio with a first target sound source to obtain a first left channel audio specifically includes: obtaining a second left channel audio according to the formula $y_{l1}'(\omega)=\beta_1*y_{l1}(\omega)+(1-\beta_1)*Y_{t1}(\omega)$, where $y_{l1}'(\omega)$ represents the first left channel audio, $\beta_1$ represents the first fusion coefficient, $Y_{t1}(\omega)$ represents the first target audio, and $y_{l1}(\omega)$ represents the first left channel input audio. In this way, the electronic device fuses the first left channel input audio with the sound source audio having highest correlation with the first left channel input audio, to obtain a first left channel audio with less noise, thereby improving accuracy of audio zooming.

With reference to the first aspect, in a possible implementation, before the fusing the first right channel input audio with a second target sound source to obtain a first right channel audio, the method further includes: calculating a correlation value between the first right channel input audio and the M channels of first sound source audios according to the formula $$\gamma_j = \frac{\emptyset_{rj}}{\sqrt{\emptyset_{rr\_1}\emptyset_{jj}}},$$

where $\emptyset_{rj}$ represents $\{y_{r1}(\omega)Y_j(\omega)^*\}$, $\emptyset_{rr\_1}$ represents $E\{y_{r1}(\omega)y_{r1}(\omega)^*\}$, $\emptyset_{jj}$ represents $E\{Y_j(\omega)Y_j(\omega)^*\}$, $\gamma_j$ represents a correlation value between the first right channel input audio and the $j^{th}$ channel of first sound source audio, $y_{r1}(\omega)$ represents the first right channel input audio, and $Y_j(\omega)$ represents the $j^{th}$ channel of first sound source audio; and determining a first sound source audio having a maximum correlation value among the M correlation values as the second target audio. In this way, the electronic device may choose to fuse the first right channel input audio with the sound source audio having highest correlation with the first right channel input audio, to obtain a first right channel audio with less noise, thereby improving accuracy of audio zooming.

With reference to the first aspect, in a possible implementation, the fusing the first right channel input audio with a second target sound source to obtain a first right channel audio specifically includes: obtaining a first right channel audio according to the formula $y_{r1}'(\omega)=\beta_1*y_{r1}(\omega)+(1-\beta_1)*Y_{t2}(\omega)$, where $y_{r1}'(\omega)$ represents the first right channel audio, $\beta_1$, represents the first fusion coefficient, $Y_{t2}(\omega)$ represents the second target audio, and $y_{r1}(\omega)$ represents the first right channel input audio. In this way, the electronic device fuses the first right channel input audio with the sound source audio having highest correlation with the first right channel input audio, to obtain a first right channel audio with less noise, thereby improving accuracy of audio zooming.

With reference to the first aspect, in a possible implementation, the performing first processing on the second audio based on the second zoom ratio to obtain a second left channel input audio and a second right channel input audio specifically includes: obtaining the second left channel audio according to the formula $y_{l2}(\omega)=\alpha_2*y_4(\omega)+(1-\alpha_2)*y_5(\omega)$; and obtaining the second right channel audio according to the formula $y_{r2}(\omega)=\alpha_2*y_6(\omega)+(1-\alpha_2)*y_5(\omega)$, where $y_{l2}$ represents the second left channel input audio, $y_{r2}(\omega)$ represents the second right channel input audio, $\alpha_2$ represents a fusion coefficient obtained based on the second zoom ratio, $y_4(\omega)$ represents a fourth beam obtained based on the second audio and a first filter coefficient, $y_5(\omega)$ represents a fifth beam obtained based on the second audio and a second filter coefficient, and $y_6(\omega)$ represents a sixth beam obtained based on the second audio and a third filter coefficient. In this way, the electronic device performs the first processing (beamforming) on the second audio by using the beam obtained based on the zoom ratio, to obtain the second left channel input audio and the second right channel input audio for which the sound of the photographed object becoming larger in the photographed image is enhanced, and the sound of the photographed object becoming smaller in the photographed image or the sound of the photographed object absent from the photographed image is suppressed, thereby implementing audio zooming based on the zoom ratio.

With reference to the first aspect, in a possible implementation, before the performing first processing on the second audio based on the second zoom ratio to obtain a second left channel input audio and a second right channel input audio, the method further includes: obtaining the fourth beam, the fifth beam, and the sixth beam respectively according to the formula $y_4(\omega)=\Sigma_{i=1}^{M}w_{1i}(\omega)x_{i2}(\omega)$, the formula $y_5(\omega)=\Sigma_{i=1}^{M}w_{2i}(\omega)x_{i2}(\omega)$, and the formula $y_6(\omega)=\Sigma_{i=1}^{M}w_{3i}(\omega)x_{i2}(\omega)$, where $y_4(\omega)$ represents the fourth beam, $y_5(\omega)$ represents the fifth beam, $y_6(\omega)$ represents the sixth beam, $w_{1i}(\omega)$ represents a first filter coefficient corresponding to the $i^{th}$ microphone in a first direction, $w_{2i}(\omega)$ represents a second filter coefficient corresponding to the $i^{th}$ microphone in a second direction, $w_{3i}(\omega)$ represents a third filter coefficient corresponding to the $i^{th}$ microphone in a third direction, $x_{i2}(\omega)$ represents the second audio collected by the $i^{th}$ microphone, the first direction is any direction within a range of 10° counterclockwise from the front to 90° counterclockwise from the front of the electronic device, the second direction is any direction within a range of 10° counterclockwise from the front to 10° clockwise from the front of the electronic device, and the third direction is any direction within a range of 10° clockwise from the front to 90° clockwise from the front of the electronic device. In this way, different beams in preset directions can be obtained, so that the first processing (beamforming) is performed on the second audio, thereby implementing audio zooming based on the zoom ratio.

With reference to the first aspect, in a possible implementation, before the fusing the second left channel input audio with a third target sound source to obtain a second left channel audio, the method further includes: calculating a correlation value between the second left channel input audio and the M channels of second sound source audios according to the formula $$\gamma_k = \frac{\emptyset_{lk}}{\sqrt{\emptyset_{ll\_2}\emptyset_{kk}}},$$

where $\emptyset_{lk}$ represents $E\{y_{l2}(\omega)Y_k(\omega)^*\}$, $\emptyset_{ll\_2}$ represents $E\{y_{l2}(\omega)y_{l2}(\omega)^*\}$, $\emptyset_{kk}$ represents $E\{Y_k(\omega)Y_k(\omega)^*\}$, $\gamma_k$ represents a correlation value between the second left channel input audio and the i$^{th}$ channel of second sound source audio, $y_{l2}(\omega)$ represents the second left channel input audio, and $Y_k(\omega)$ represents the i$^{th}$ channel of second sound source audio; and determining a second sound source audio having a maximum correlation value among the M correlation values as the third target audio. In this way, the electronic device may fuse the second left channel input audio with the sound source audio having highest correlation with the second left channel input audio, to obtain a second left channel audio with less noise, thereby improving accuracy of audio zooming.

With reference to the first aspect, in a possible implementation, the fusing the second left channel input audio with a third target sound source to obtain a second left channel audio specifically includes: obtaining a second left channel audio according to the formula $y_{l2}'(\omega)=\beta_2*y_{l2}(\omega)+(1-\beta_2)*Y_{t3}(\omega)$, where $y_{l2}'(\omega)$ represents the second left channel audio, $\beta_2$ represents the second fusion coefficient, $Y_{t3}(\omega)$ represents the third target audio, and $y_{l2}(\omega)$ represents the second left channel input audio. In this way, the electronic device fuses the second left channel input audio with the sound source audio having highest correlation with the second left channel input audio, to obtain a second left channel audio with less noise, thereby improving accuracy of audio zooming.

With reference to the first aspect, in a possible implementation, before the fusing the second right channel input audio with a fourth target sound source to obtain a second right channel audio, the method further includes: calculating a correlation value between the second right channel input audio and the M channels of second sound source audios according to the formula $$\gamma_t = \frac{\emptyset_{rt}}{\sqrt{\emptyset_{rr\_2}\emptyset_{tt}}},$$

where $\emptyset_{rt}$ represents $E\{y_{r2}(\omega)Y_t(\omega)^*\}$, $\emptyset_{rr\_2}$ represents $E\{y_{r2}(\omega)y_{r2}(\omega)^*\}$, $\emptyset_{tt}$ represents $E\{Y_t(\omega)Y_t(\omega)^*\}$, $\gamma_t$ represents a correlation value between the second right channel input audio and the t$^{th}$ channel of second sound source audio, $y_{r2}(\omega)$ represents the second right channel input audio, and $Y_t(\omega)$ represents the t$^{th}$ channel of second sound source audio; and determining a second sound source audio having a maximum correlation value among the M correlation values as the fourth target audio. In this way, the electronic device may choose to fuse the second right channel input audio with the sound source audio having highest correlation with the second right channel input audio, to obtain a second right channel audio with less noise, thereby improving accuracy of audio zooming.

With reference to the first aspect, in a possible implementation, the fusing the second right channel input audio with a fourth target sound source to obtain a second right channel audio specifically includes: obtaining a second right channel audio according to the formula $y_{r2}'(\omega)=\beta_2*y_{r2}(\omega)+(1-\beta_2)*Y_{t4}(\omega)$, where $y_{r2}'(\omega)$ represents the second right channel audio, $\beta_2$ represents the second fusion coefficient, $Y_{t4}(\omega)$ represents the fourth target audio, and $y_{r2}(\omega)$ represents the second right channel input audio. In this way, the electronic device fuses the second right channel input audio with the sound source audio having highest correlation with the second right channel input audio, to obtain a second right channel audio with less noise, thereby improving accuracy of audio zooming.

According to a second aspect, an embodiment of this application provides an electronic device. The electronic device includes one or more processors and a memory. The memory is coupled to the one or more processors, the memory is configured to store computer program code, the computer program code includes computer instructions, and the one or more processors invoke the computer instructions to enable the electronic device to perform the following operations: starting a camera; displaying a preview interface, where the preview interface includes a first control; detecting a first operation with respect to the first control; starting photographing in response to the first operation; displaying a photographing interface, where the photographing interface includes a second control and the second control is used to adjust a zoom ratio; displaying a first photographed image at a first moment when the zoom ratio is a first zoom ratio; collecting a first audio by using a microphone at the first moment; detecting a third operation with respect to a third control; and stopping photographing and saving a first video in response to the third operation.

The one or more processors invoke the computer instructions to enable the electronic device to perform the following operations: processing the first audio to obtain a first left channel output audio and a first right channel output audio, where the processing the first audio to obtain a first left channel output audio and a first right channel output audio includes performing first processing on the first audio based on the first zoom ratio to obtain a first left channel input audio and a first right channel input audio; performing second processing on the first audio to obtain M channels of first sound source audios, where M represents a quantity of microphones of the electronic device; fusing the first left channel input audio with a first target audio to obtain a first left channel audio, where the first target audio is a sound source audio having highest correlation with the first left channel input audio among the M channels of first sound source audios; fusing the first right channel input audio with a second target audio to obtain a first right channel audio, where the second target audio is a sound source audio having highest correlation with the first right channel input audio among the M channels of first sound source audios; and performing enhancement processing on the first left channel audio and the first right channel audio to obtain the first left channel output audio and the first right channel output audio.

With reference to the second aspect, in a possible implementation, the one or more processors are further configured to invoke the computer instructions to enable the electronic device to perform the following operations: detecting a second operation with respect to the second control; adjusting the zoom ratio to be a second zoom ratio in response to the second operation, where the second zoom ratio is greater than the first zoom ratio; displaying a second photographed image at a second moment, where the second photographed image includes the first target object and does not include the second target object; the microphone collects a second audio at the second moment, where the second audio includes a first sound corresponding to the first target object and a second sound corresponding to the second target object; and processing the second audio to obtain a second left channel output audio and a second right channel output audio, where the second left channel output audio and the second right channel output audio include a third sound and a fourth sound, the third sound corresponds to the first target object, the fourth sound corresponds to the second target object, the third sound is enhanced with respect to the first sound, and the fourth sound is suppressed with respect to the second sound.

With reference to the second aspect, in a possible implementation, the one or more processors are further configured to invoke the computer instructions to enable the electronic device to perform the following operations: performing first processing on the second audio based on the second zoom ratio to obtain a second left channel input audio and a second right channel input audio; performing second processing on the second audio to obtain M channels of second sound source audios, where M represents a quantity of microphones of the electronic device; fusing the second left channel input audio with a third target audio to obtain a second left channel audio, where the third target audio is a sound source audio having highest correlation with the second left channel input audio among the M channels of second sound source audios; fusing the second right channel input audio with a fourth target audio to obtain a second right channel audio, where the fourth target audio is a sound source audio having highest correlation with the second right channel input audio among the M channels of second sound source audios; and performing enhancement processing on the second left channel audio and the second right channel audio to obtain the second left channel output audio and the second right channel output audio.

With reference to the second aspect, in a possible implementation, the one or more processors are further configured to invoke the computer instructions to enable the electronic device to perform the following operation: obtaining the M channels of first sound source audios through calculation according to the formula $Y(\omega)=\Sigma_{i=1}^{M}W_i(\omega)x_i(\omega)$, where $x_i(\omega)$ represents an audio signal of a first audio collected by the $i^{th}$ microphone in frequency domain, $W_i(\omega)$ represents a first non-negative matrix corresponding to the $i^{th}$ microphone, $Y(\omega)$ represents a first matrix whose size is M*L, and each row vector of the first matrix is one channel of first sound source audio.

With reference to the second aspect, in a possible implementation, the one or more processors are further configured to invoke the computer instructions to enable the electronic device to perform the following operation: obtaining the M channels of second sound source audios through calculation according to the formula $Y'(\omega)=\Sigma_{i=1}^{M}W_i'(\omega)x_i'(\omega)$, where $x_i'(\omega)$ represents an audio signal of a second audio collected by the $i^{th}$ microphone in frequency domain, $W_i'(\omega)$ represents a second non-negative matrix corresponding to the $i^{th}$ microphone, $Y'(\omega)$ represents a second matrix whose size is M*L, and each row vector of the second matrix is one channel of second sound source audio.

With reference to the second aspect, in a possible implementation, the one or more processors are further configured to invoke the computer instructions to enable the electronic device to perform the following operations: obtaining the first left channel audio according to the formula $y_{l1}(\omega)=\alpha_1*y_1(\omega)+(1-\alpha_1)*y_2(\omega)$; and obtaining the first right channel audio according to the formula $y_{r1}((\omega)=\alpha_1*y_3(\omega)+(1-\alpha_1)*y_2(\omega)$, where $y_{l1}$ represents the first left channel input audio, $y_{r1}((\omega)$ represents the first right channel input audio, $\alpha_1$ represents a fusion coefficient obtained based on the first zoom ratio, $y_1(\omega)$ represents a first beam obtained based on the first audio and a first filter coefficient, $y_2(\omega)$ represents a second beam obtained based on the first audio and a second filter coefficient, and $y_3(\omega)$ represents a third beam obtained based on the first audio and a third filter coefficient.

With reference to the second aspect, in a possible implementation, the one or more processors are further configured to invoke the computer instructions to enable the electronic device to perform the following operation: obtaining the first beam, the second beam, and the third beam respectively according to the formula $y_1(\omega)=\Sigma_{i=1}^{M}w_{1i}(\omega)x_{i1}(\omega)$, the formula $y_2(\omega)=\Sigma_{i=1}^{M}w_{2i}(\omega)x_{i1}(\omega)$, and the formula $y_3(\omega)=\Sigma_{i=1}^{M}w_{3i}(\omega)x_{i1}(\omega)$, where $y_1(\omega)$ represents the first beam, $y_2(\omega)$ represents the second beam, $y_3(\omega)$ represents the third beam, $w_{1i}(\omega)$ represents a first filter coefficient corresponding to the $i^{th}$ microphone in a first direction, $w_{2i}(\omega)$ represents a second filter coefficient corresponding to the $i^{th}$ microphone in a second direction, $w_{3i}(\omega)$ represents a third filter coefficient corresponding to the $i^{th}$ microphone in a third direction, $x_{i1}(\omega)$ represents the first audio collected by the $i^{th}$ microphone, the first direction is any direction within a range of 10° counterclockwise from the front to 90° counterclockwise from the front of the electronic device, the second direction is any direction within a range of 10° counterclockwise from the front to 10° clockwise from the front of the electronic device, and the third direction is any direction within a range of 10° clockwise from the front to 90° clockwise from the front of the electronic device.

With reference to the second aspect, in a possible implementation, the one or more processors are further configured to invoke the computer instructions to enable the electronic device to perform the following operations: calculating a correlation value between the first left channel input audio and the M channels of first sound source audios according to the formula $$\gamma_i = \frac{\phi_{li}}{\sqrt{\phi_{ll\_1}\phi_{ii}}},$$

where $\phi_{li}$ represents $E\{y_{l1}(\omega)Y_i(\omega)^*\}$, $\phi_{ll\_1}$ represents $E\{y_{l1}(\omega)y_{l1}(\omega)^*\}$, $\phi_{ii}$ represents $E\{Y_1(\omega)Y_1(\omega)^*\}$, $\gamma_1$ represents a correlation value between the first left channel input audio and the $i^{th}$ channel of first sound source audio, $y_{l1}(\omega)$ represents the first left channel input audio, and $Y_i(\omega)$ represents the $i^{th}$ channel of first sound source audio; if there is only one maximum correlation value among the M correlation values, determining a first sound source audio having the maximum correlation value as the first target audio; and if there are a plurality of maximum correlation values among the M correlation values, calculating an average value of first sound source audios corresponding to the plurality of maximum correlation values to obtain the first target audio.

With reference to the second aspect, in a possible implementation, the one or more processors are further configured to invoke the computer instructions to enable the electronic device to perform the following operation: obtaining a second left channel audio according to the formula $y_{l1}'(\omega)=\beta_1*y_{l1}(\omega)+(1-\beta_1)*Y_{l1}(\omega)$, where $y_{l1}'(\omega)$ represents the first left channel audio, $\beta_1$ represents the first fusion coefficient, $Y_{l1}(\omega)$ represents the first target audio, and $y_{l1}(\omega)$ represents the first left channel input audio.

With reference to the second aspect, in a possible implementation, the one or more processors are further configured to invoke the computer instructions to enable the electronic device to perform the following operations: calculating a correlation value between the first right channel input audio and the M channels of first sound source audios according to the formula $$\gamma_j = \frac{\phi_{rj}}{\sqrt{\phi_{rr\_1}\phi_{jj}}},$$

where $\phi_{rj}$ represents $E\{y_{r1}(\omega)Y_j(\omega)^*\}$, $\phi_{rr\_1}$ represents $E\{y_{r1}(\omega)y_{r1}(\omega)^*\}$, $\phi_{jj}$ represents $E\{Y_j(\omega)Y_j(\omega)^*\}$, $\gamma_j$ represents a correlation value between the first right channel input audio and the $j^{th}$ channel of first sound source audio, $y_{r1}(\omega)$ represents the first right channel input audio, and $Y_j(\omega)$ represents the $j^{th}$ channel of first sound source audio; and determining a first sound source audio having a maximum correlation value among the M correlation values as the second target audio.

With reference to the second aspect, in a possible implementation, the one or more processors are further configured to invoke the computer instructions to enable the electronic device to perform the following operation: obtaining a first right channel audio according to the formula $y_{r1}'(\omega)=\beta_1*y_{r1}(\omega)+(1-\beta_1)*Y_{r2}(\omega)$, where $y_{r1}'(\omega)$ represents the first right channel audio, $\beta_1$ represents the first fusion coefficient, $Y_{r2}(\omega)$ represents the second target audio, and $y_{r1}(\omega)$ represents the first right channel input audio.

With reference to the second aspect, in a possible implementation, the one or more processors are further configured to invoke the computer instructions to enable the electronic device to perform the following operations: obtaining the second left channel audio according to the formula $y_{l2}(\omega)=\alpha_2*y_4(\omega)+(1-\alpha_2)*y_5(\omega)$; and obtaining the second right channel audio according to the formula $y_{r2}(\omega)=\alpha_2*y_6(\omega)+(1-\alpha_2)*y_5(\omega)$, where $y_{l2}$ represents the second left channel input audio, $y_{r2}(\omega)$ represents the second right channel input audio, $\alpha_2$ represents a fusion coefficient obtained based on the second zoom ratio, $y_4(\omega)$ represents a first beam obtained based on the second audio and a first filter coefficient, $y_5(\omega)$ represents a second beam obtained based on the second audio and a second filter coefficient, and $y_6(\omega)$ represents a third beam obtained based on the second audio and a third filter coefficient.

With reference to the second aspect, in a possible implementation, the one or more processors are further configured to invoke the computer instructions to enable the electronic device to perform the following operation: obtaining the fourth beam, the fifth beam, and the sixth beam respectively according to the formula $y_4(\omega)=\Sigma_{i=1}^{M}w_{1i}(\omega)x_{i2}(\omega)$, the formula $y_5(\omega)=\Sigma_{i=1}^{M}w_{2i}(\omega)x_{2i}(\omega)$, and the formula $y_6(\omega)=\Sigma_{i=1}^{M}w_{3i}(\omega)x_{i2}(\omega)$, where $y_4(\omega)$ represents the fourth beam, $y_5(\omega)$ represents the fifth beam, $y_6(\omega)$ represents the sixth beam, $w_{1i}(\omega)$ represents a first filter coefficient corresponding to the $i^{th}$ microphone in a first direction, $w_{2i}(\omega)$ represents a second filter coefficient corresponding to the $i^{th}$ microphone in a second direction, $w_{3i}(\omega)$ represents a third filter coefficient corresponding to the $i^{th}$ microphone in a third direction, $x_{i2}(\omega)$ represents the second audio collected by the $i^{th}$ microphone, the first direction is any direction within a range of 10° counterclockwise from the front to 90° counterclockwise from the front of the electronic device, the second direction is any direction within a range of 10° counterclockwise from the front to 10° clockwise from the front of the electronic device, and the third direction is any direction within a range of 10° clockwise from the front to 90° clockwise from the front of the electronic device.

With reference to the second aspect, in a possible implementation, the one or more processors are further configured to invoke the computer instructions to enable the electronic device to perform the following operations: calculating a correlation value between the second left channel input audio and the M channels of second sound source audios according to the formula $$\gamma_k = \frac{\phi_{lk}}{\sqrt{\phi_{ll\_2}\phi_{kk}}},$$

where $\phi_{lk}$ represents $E\{y_{l2}(\omega)Y_k(\omega)^*\}$, $\phi_{ll\_2}$ represents $E\{y_{l2}(\omega)y_{l2}(\omega)^*\}$, $\phi_{kk}$ represents $E\{Y_k(\omega)Y_k(\omega)^*\}$, $\gamma_k$ represents a correlation value between the second left channel input audio and the $i^{th}$ channel of second sound source audio, $y_{l2}(\omega)$ represents the second left channel input audio, and $Y_k(\omega)$ represents the $i^{th}$ channel of second sound source audio; and determining a second sound source audio having a maximum correlation value among the M correlation values as the third target audio.

With reference to the second aspect, in a possible implementation, the one or more processors are further configured to invoke the computer instructions to enable the electronic device to perform the following operation: obtaining a second left channel audio according to the formula $y_{l2}'(\omega)=\beta_2*y_{l2}(\omega)+(1-\beta_2)*Y_{r3}(\omega)$, where $y_{l2}'(\omega)$ represents the second left channel audio, $\beta_2$ represents the second fusion coefficient, $Y_{r3}(\omega)$ represents the third target audio, and $y_{l2}(\omega)$ represents the second left channel input audio.

With reference to the second aspect, in a possible implementation, the one or more processors are further configured to invoke the computer instructions to enable the electronic device to perform the following operations: calculating a correlation value between the second right channel input audio and the M channels of second sound source audios according to the formula $$\gamma_t = \frac{\phi_{rt}}{\sqrt{\phi_{rr\_2}\phi_{tt}}},$$

where $\phi_{rt}$ represents $E\{y_{r2}(\omega)Y_t(\omega)^*\}$, $\phi_{rr\_2}$ represents $E\{y_{r2}(\omega)y_{r2}(\omega)^*\}$, $\phi_{tt}$ represents $E\{Y_t(\omega)Y_t(\omega)^*\}$, $\gamma_t$ represents a correlation value between the second right channel input audio and the $t^{th}$ channel of second sound source audio, $y_{r2}(\omega)$ represents the second right channel input audio, and $Y_t(\omega)$ represents the $t^{th}$ channel of second sound source audio; and determining a second sound source audio having a maximum correlation value among the M correlation values as the fourth target audio.

With reference to the second aspect, in a possible implementation, the one or more processors are further configured to invoke the computer instructions to enable the electronic device to perform the following operation: obtaining a second right channel audio according to the formula $y_{r2}'(\omega)=\beta_2*y_{r2}(\omega)+(1-\beta_2)*Y_{r4}(\omega)$, where $y_{r2}'(\omega)$ represents the second right channel audio, $\beta_2$ represents the second fusion coefficient, $Y_{r4}(\omega)$ represents the fourth target audio, and $y_{r2}(\omega)$ represents the second right channel input audio.

According to a third aspect, an embodiment of this application provides an electronic device, including a touchscreen, a camera, one or more processors, and one or more memories. The one or more processors are coupled to the touchscreen, the camera, and the one or more memories. The one or more memories are configured to store computer program code. The computer program code includes computer instructions. When the one or more processors execute the computer instructions, the electronic device is enabled to perform the method according to any one of the first aspect or the possible implementations of the first aspect.

According to a fourth aspect, an embodiment of this application provides a chip system. The chip system is applied to an electronic device and the chip system includes one or more processors. The processors are configured to invoke computer instructions to enable the electronic device to perform the method according to any one of the first aspect or the possible implementations of the first aspect.

According to a fifth aspect, an embodiment of this application provides a computer program product including instructions. When the computer program product runs on an electronic device, the electronic device is enabled to perform the method according to any one of the first aspect or the possible implementations of the first aspect.

According to a sixth aspect, an embodiment of this application provides a computer-readable storage medium including instructions. When the instructions are run on an electronic device, the electronic device is enabled to perform the method according to any one of the first aspect or the possible implementations of the first aspect.

DESCRIPTION OF EMBODIMENTS

Figure 1B:
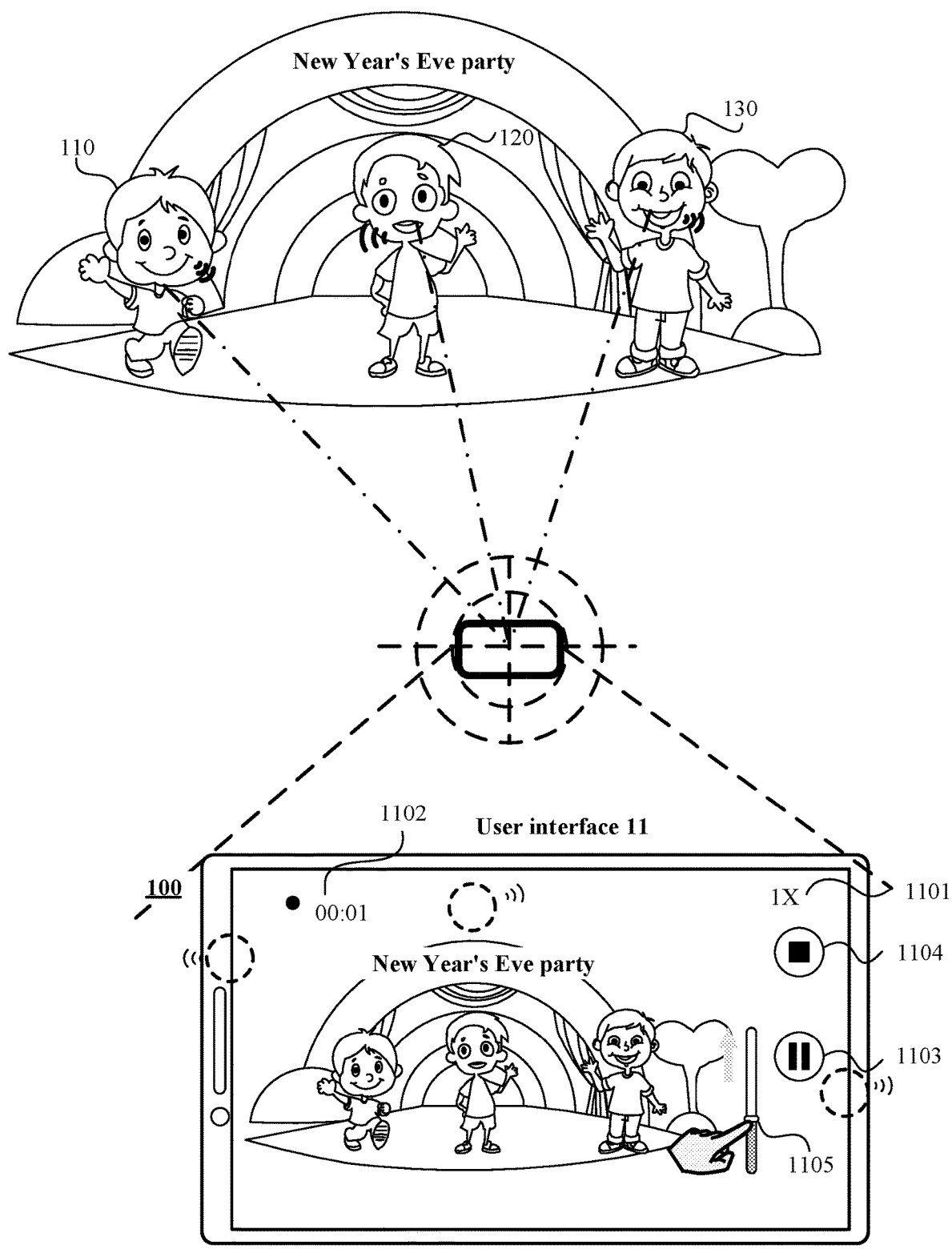
FIG. 1A(a) to FIG. 1E are a group of user interface diagrams when an electronic device performs image zooming according to an embodiment of this application.

The following clearly and completely describes the technical solutions in embodiments of this application with reference to the accompanying drawings in embodiments of this application. Clearly, the described embodiments are merely some rather than all of embodiments of this application. Mentioning an "embodiment" in this specification means that a specific feature, structure, or characteristic described with reference to this embodiment may be included in at least one embodiment of this application. The word appearing at different locations in this specification does not necessarily refer to the same embodiment, and is not an independent or alternate embodiment exclusive of another embodiment. A person skilled in the art may explicitly and implicitly understand that the embodiments described in this specification may be combined with another embodiment. Based on embodiments of this application, all other embodiments obtained by a person of ordinary skill in the art without creative efforts fall within the protection scope of this application.

In the specification, claims, and accompanying drawings of this application, the terms "first", "second", "third", and the like are intended to distinguish between different objects, but are not intended to describe a particular order. In addition, the terms "include" and "have", and any variations thereof, are intended to cover non-exclusive inclusion. For example, a series of steps or units are included, or optionally, steps or units not listed are further included, or optionally other steps or units inherent in these processes, methods, products, or devices are further included.

The accompanying drawings show only some content related to this application but not all content. Before discussing example embodiments in more detail, it should be mentioned that some example embodiments are described as processes or methods depicted as flowcharts. Although the flowchart describes operations (or steps) as sequential processing, many of these operations may be implemented in parallel, concurrently, or simultaneously. In addition, a sequence of operations may be rescheduled. The processing may be terminated when its operations are completed, but additional steps not included in the accompanying drawings may be included. The processing may correspond to a method, a function, a procedure, a subroutine, a subprogram, and the like.

The terms "component", "module", "system", "unit", and the like used in this specification are used to represent computer-related entities, hardware, firmware, a combination of hardware and software, software, or software in execution. For example, the unit may be but is not limited to a process running on a processor, a processor, an object, an executable file, an execution thread, a program, and/or distributed between two or more computers. In addition, these units may be executed by various computer-readable media on which various data structures are stored. For example, a unit may communicate through local and/or remote processes based on a signal with one or more data packets (for example, second unit data exchanged by another unit from a local system, a distributed system, and/or a network, for example, an internet that interacts with another system by using a signal).

The term "user interface (user interface, UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (extensible markup language, XML). Interface source code is parsed and rendered on an electronic device, and is finally presented as content that can be identified by the user. The user interface is usually in a representation form of a graphic user interface (graphic user interface, GUI), and the graphic user interface is a user interface that is related to a computer operation and that is displayed in a graphical manner. The user interface may be a visual interface element such as a text, an icon, a button, a menu, a tab, a text box, a dialog box, a status bar, a navigation bar, or a widget displayed on a display screen of the electronic device.

The following describes related technical terms in embodiments of this application.

(1) Focal Length and Angle of View

In embodiments of this application, the focal length is a focal length used by the electronic device during video recording or photographing.

The angle of view is an included angle formed, by using a lens of the electronic device as a vertex, by two edges of a maximum range that a photographed object can pass through the lens. A magnitude of the angle of view determines a field-of-view range of the electronic device. To be specific, a photographed object within the angle of view may also be displayed in the image, but a photographed object outside the field-of-view range cannot be displayed in the image.

Specifically, when the electronic device records a video or shoots an image, for a same photographed object whose location relative to the electronic device is not changed, the electronic device can obtain different images by using different focal lengths. For example, in one case, a larger focal length used by the electronic device leads to a smaller angle of view of the electronic device. In this case, the photographed object is larger in the image obtained by the electronic device. Because the display screen of the electronic device is limited, only a part of the photographed object can be displayed sometimes. In another case, a smaller focal length used by the electronic device leads to a larger angle of view of the electronic device. The photographed object is smaller in the image obtained by the electronic device. Generally, a larger angle of view of the electronic device indicates a larger quantity of other photographed objects to be displayed in the obtained image.

In some embodiments, when the electronic device records a video or shoots an image, the focal length may be changed based on a user setting.

In some other embodiments, when the electronic device records a video or shoots an image, the focal length may be changed according to some preset rules. For example, when recording an interesting video, the electronic device may change the focal length according to a preset rule.

The change of the focal length includes increasing the focal length and decreasing the focal length. In some embodiments, the electronic device can change the focal length by adjusting the zoom ratio. The user may adjust the zoom ratio by using a zoom ratio control in the user interface, or may input a gesture command in the user interface to select the zoom ratio.

The zoom ratio control may be shown in FIG. 1B as the zoom ratio control 1105 shown in the user interface 11. Reference may be made to the following related descriptions of the zoom ratio control 1105. By adjusting the zoom ratio, the user continuously enlarges the photographed object in the preview interface. The user may select the zoom ratio by using a zoom ratio button on a photographing device, or may input a gesture command on a display screen of the photographing device to select the zoom ratio. Generally, zoom photographing includes two manners: optical zoom photographing and digital zoom photographing. Both of these two manners can change a size of an object in the preview image displayed by the electronic device.

(2) Image Zooming and Audio Zooming

Image zooming means that the electronic device changes the focal length in the photographing process, and the electronic device can change the focal length by adjusting the zoom ratio to complete image zooming. For example, when the user photographs an object at a distance by using the electronic device, the object displayed in the displayed preview image is definitely small. Without changing the position of the user, the user may choose to increase the zoom ratio so that the object displayed in the interface of the electronic device becomes larger, thereby implementing image zooming. In embodiments of this application, it may also be understood that adjusting the zoom ratio so that the object displayed in the interface of the electronic device becomes larger or smaller may be applied to the process of recording a video or the process of playing a video.

Audio zooming may be similar to image zooming. When the zoom ratio increases, and when the photographed object displayed by the electronic device in a video becomes larger, the user has a feeling that the photographed object is relatively closer. In this case, a sound of the photographed object displayed by the electronic device becomes larger accordingly. When the zoom ratio decreases, and when the photographed object displayed by the electronic device in the video becomes smaller, the user has a feeling that the photographed object is far away. In this case, a sound of the photographed object may become smaller accordingly. If both the image and the corresponding audio can be zoomed, an effect of audio zooming and image zooming can be achieved, thereby improving sensory experience of the user and increasing enjoyment.

(3) Suppression and Enhancement

In embodiments of this application, suppression means that energy of an audio signal is reduced so that the audio signal sounds smaller or is even inaudible. Suppression of the audio signal can be implemented by reducing an amplitude of the audio signal.

Enhancement means that energy of an audio signal is increased so that the audio signal sounds larger. Enhancement of the audio signal can be implemented by increasing the amplitude of the audio signal.

The amplitude is used to represent a magnitude of a voltage corresponding to the audio signal, or may be used to represent a magnitude of the energy or a magnitude of decibel of the audio signal.

(4) Beamforming and Gain Coefficient

In embodiments of this application, beamforming may be used to describe a correspondence between an audio collected by a microphone of the electronic device and transmission of the audio to a speaker for playing. The correspondence is a group of gain coefficients for indicating a degree of suppression of the audio signal in each direction collected by the microphone. Suppression means that energy of an audio signal is reduced so that the audio signal sounds smaller or is even inaudible. The degree of suppression is used to describe an extent to which the audio signal is reduced. A greater degree of suppression indicates a larger amount of reduced energy of the audio signal. For example, a gain coefficient of 0.0 indicates that the audio signal is completely removed, and a gain coefficient of 1.0 indicates that no suppression is performed. A gain coefficient closer to 0.0 indicates a greater degree of suppression, and a gain coefficient closer to 1.0 indicates a lesser degree of suppression.

Figure 1C:
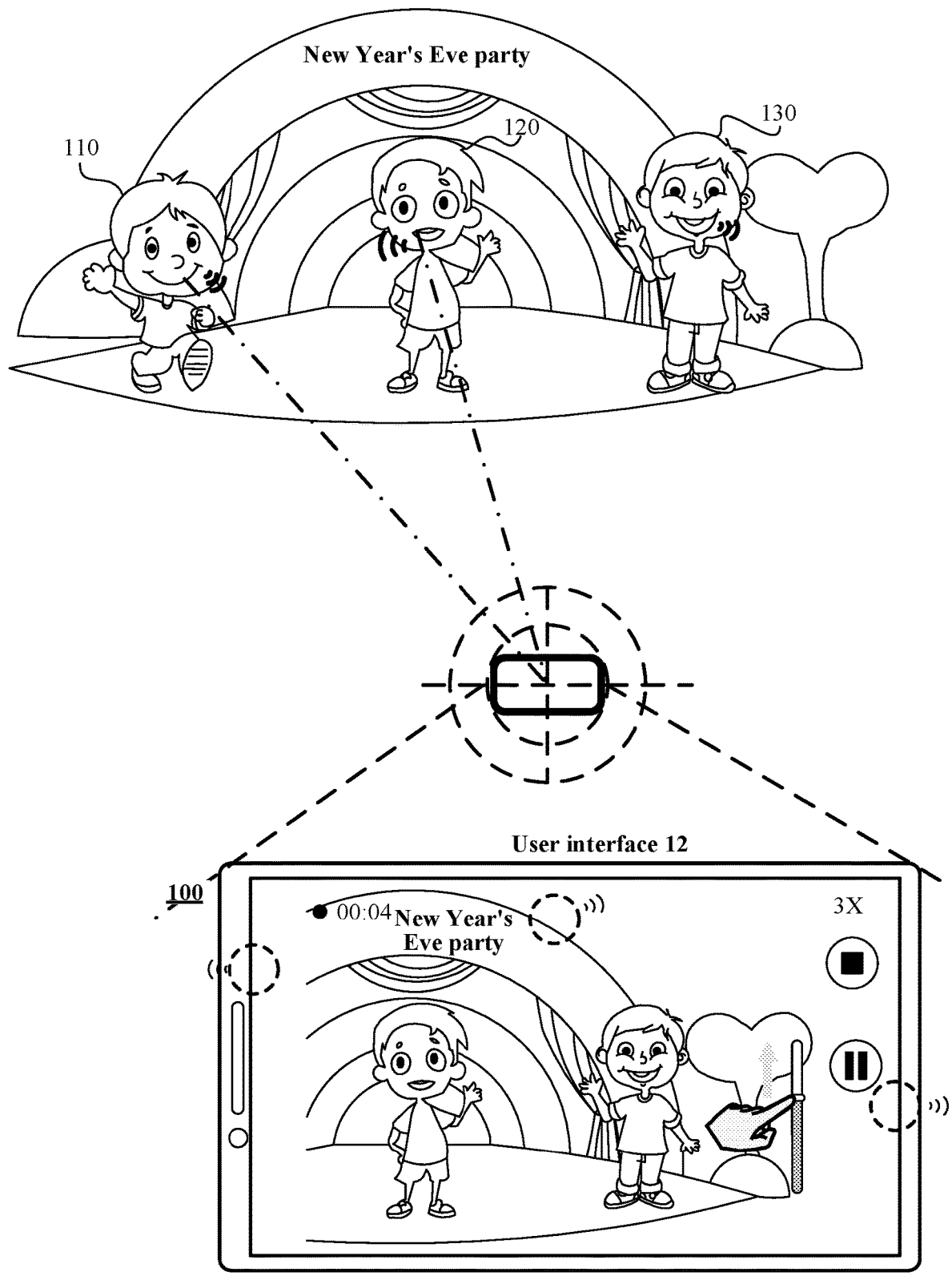
Figure 1D:
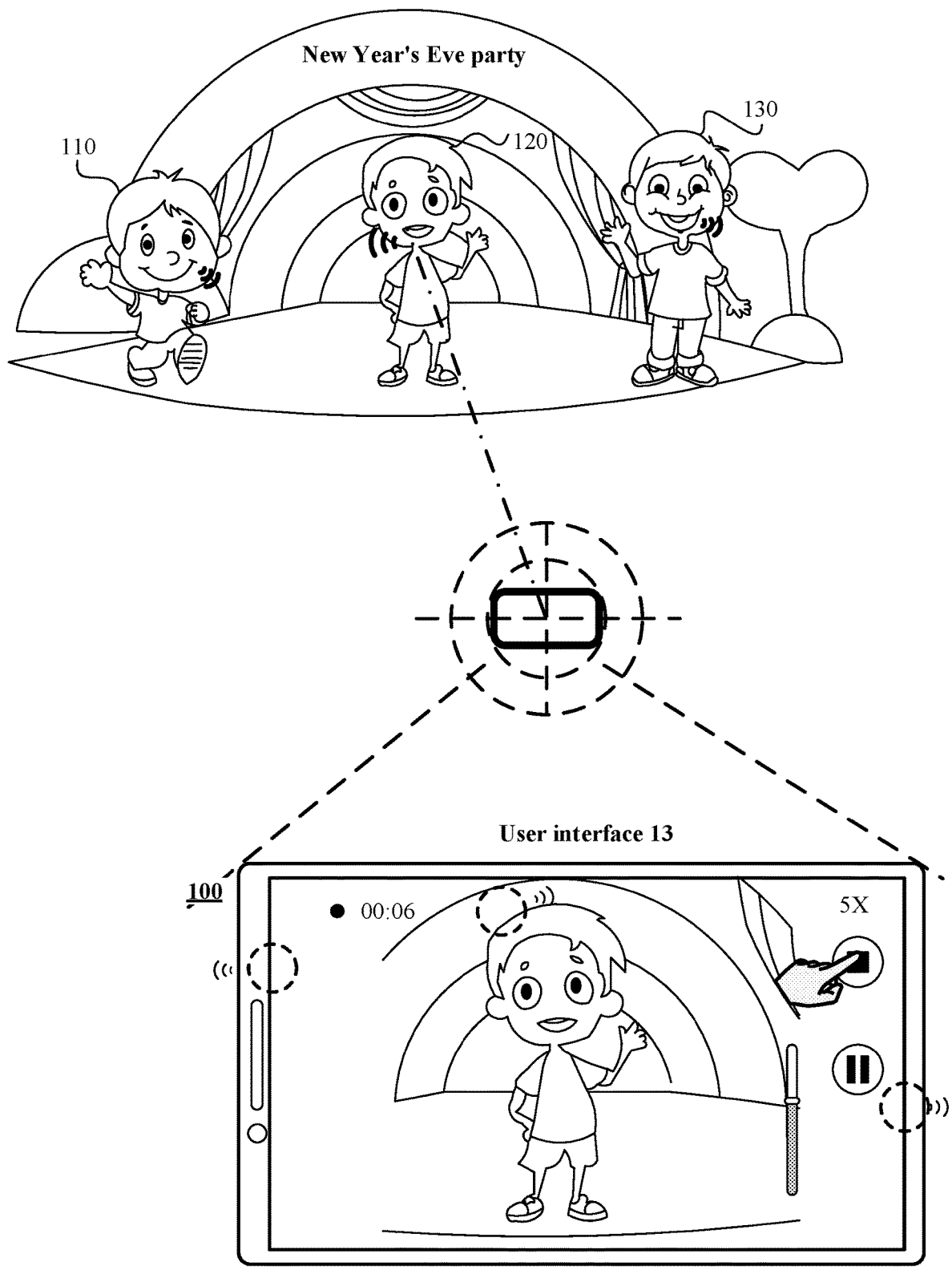
Figure 1E:
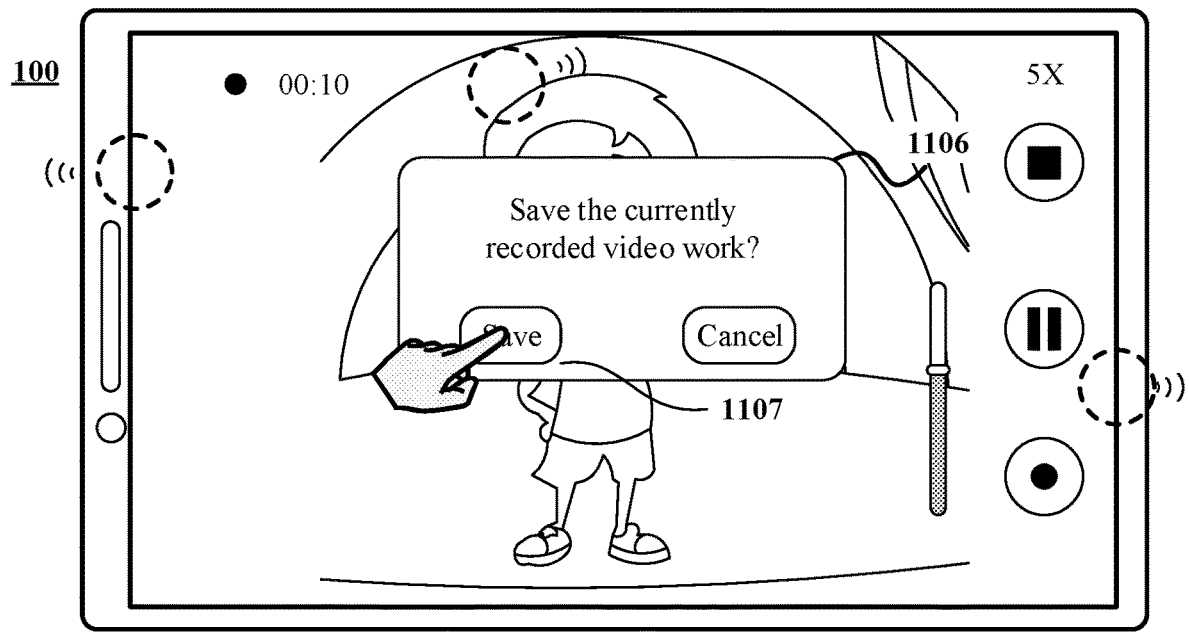

With reference to FIG. 1A(a) to FIG. 1E, the following describes an application scenario in which image zooming is performed when a user uses an electronic device to record a video. FIG. 1A(a) to FIG. 1E are a group of example user interface diagrams of performing image zooming during video recording according to an embodiment of this application.

In FIG. 1A(a) to FIG. 1E, an electronic device 100 includes three microphones. FIG. 1A(a) and FIG. 1A(b) are used as an example for description. The electronic device 100 includes a first microphone 101, a second microphone 102, and a third microphone 103. During recording of a video by the electronic device 100, the three microphones receive audio signals of a photographing environment and process the received audio signals to generate an audio stream. Meanwhile, a camera of the electronic device obtains a plurality of frames of images and processes the plurality of frames of images to obtain an image stream, and the electronic device mixes the image stream and the audio stream to obtain a recorded video.

It may be understood that, the microphones used by the electronic device 100 in the video recording process may include N microphones, where N may be an integer greater than or equal to 2, and is not limited to the first microphone, the second microphone, and the third microphone described above.

In FIG. 1A(a) to FIG. 1D, the photographed objects may include a first photographed object 110, a second photographed object 120, and a third photographed object 130. This embodiment of this application is described by using an example in which the electronic device 100 records a video by using a rear-facing camera and records a video. It is assumed that distances between the electronic device 100 and the foregoing three photographed objects do not change in the video recording process, and volumes of the photographed objects do not change either throughout the recording process.

As shown in FIG. 1A(a) and FIG. 1A(b), a user interface 10 displayed on a screen of the electronic device 100 is a preview interface for recording a video, and the preview interface includes a recording control 104. The recording control 104 is configured to record a video after receiving an input operation of a user for recording a video. When the electronic device 100 detects an input operation (for example, tapping) of the user with respect to the recording control 104, the electronic device 100 displays a user interface 11 shown in FIG. 1B in response to the operation.

As shown in FIG. 1B, the user interface 11 is an interface for currently recording a video, including a focal length display icon 1101, a recording time display icon 1102, a pause control 1103, a stop control 1104, and a zoom ratio control 1105. The focal length display icon 1101 is configured to display a zoom ratio of a current image. For example, 1× indicates a zoom ratio of one fold, and 3× indicates a zoom ratio of three folds. The recording time display icon 1102 is configured to display a time of current video recording, the pause control 1103 is configured to pause the recording of the video in response to a pause instruction, and the stop control 1104 is configured to end the recording of the video in response to a recording stopping instruction. The zoom ratio control 1105 is configured to increase or decrease the zoom ratio used when the video is recorded in response to a focal length adjustment instruction. For example, when the user slides the zoom ratio control 1105 upward, the electronic device 100 increases the zoom ratio of the image in response to the operation of the user for sliding the zoom ratio control 1105 upward. When the user slides the zoom ratio control 1105 downward, the electronic device 100 decreases the zoom ratio of the image in response to the operation of the user for sliding the zoom ratio control 1105 downward. The focal length display icon 1101 displays the zoom ratio of the video image in real time during adjustment of the zoom ratio of the image by the electronic device 100. As can be seen from the recording time display icon 1102, the time of the current video recording is the first second. At this time, the electronic device 100 obtains an image and an audio signal corresponding to the first second of the video. As can be seen from the focal length display icon 1101, the zoom ratio of the currently recorded video is the 1× zoom ratio, and the user interface 11 includes a first photographed object, a second photographed object, and a third photographed object. When the electronic device 100 detects an operation of the user for sliding the zoom ratio control 1105 upward, the electronic device 100 increases the focal length of the video image in response to the operation, and displays a user interface 12 shown in FIG. 1C.

As shown in FIG. 1C, the user interface 12 is an interface for currently recording a video. As can be seen from the recording time display icon, the time of the current video recording is the fourth second. At this time, the electronic device 100 obtains an image and an audio signal corresponding to the fourth second of the video. As can be seen from the focal length display icon, the zoom ratio of the currently recorded video is the 3× zoom ratio, and the user interface 12 includes the second photographed object and the third photographed object. At this time, it can be seen that the user interface 12 no longer displays the first photographed object. In addition, compared with the second photographed object and the third photographed object displayed in the user interface 11, the second photographed object and the third photographed object displayed in the user interface 12 are enlarged. When the electronic device 100 detects an operation of the user for sliding the zoom ratio control upward, the electronic device 100 increases the focal length for recording the video image in response to the operation, and displays a user interface 13 shown in FIG. 1D.

As shown in FIG. 1D, the user interface 13 is an interface for currently recording a video. As can be seen from the recording time display icon, the time of the current video recording is the sixth second. At this time, the electronic device 100 obtains an image and an audio signal corresponding to the sixth second of the video. As can be seen from the focal length display icon, the zoom ratio of the currently recorded video is the 5× zoom ratio, and the user interface 13 includes the second photographed object. At this time, it can be seen that the user interface 13 does not display the first photographed object and the third photographed object, and displays only the second photographed object. Compared with the second photographed object displayed in the user interface 12, the second photographed object displayed in the user interface 13 is enlarged. After detecting an input operation of the user with respect to the stop control, the electronic device 100 displays a user interface 14 shown in FIG. 1E.

As shown in FIG. 1E, the user interface 14 is a user interface after the electronic device 100 stops video recording. The user interface 14 includes a video work saving prompt box 1106 and the video work saving prompt box 1106 is configured to prompt the user whether to save the currently recorded video. After the electronic device 100 detects an input operation (for example, tapping) with respect to a save control 1107, the electronic device 100 saves the recorded video in response to the input operation.

It should be understood that FIG. 1A(a) to FIG. 1E show a group of example user interfaces in which the angle of view is changed due to a change in the focal length, and consequently the obtained image is changed in the video recording process of the electronic device, and should not impose a limitation on embodiments of this application. The electronic device may alternatively change the focal length in another manner. This is not limited in this embodiment of this application.

In some embodiments, the electronic device may perform zooming on the image according to a change in the zoom ratio during recording of the video, but does not perform audio zooming on the audio according to the change in the zoom ratio. As a result, when the electronic device plays the recorded video, and when a picture of a photographed object in the display screen becomes larger, a sound volume of the photographed object does not increase accordingly. In addition, in a process of viewing the video by the user, a sound of a photographed object that does not appear in the display screen is also heard, interfering with the sound of the photographed object in the displayed picture and bringing poor viewing experience to the user. With reference to FIG. 2A to FIG. 4B, the following describes an application scenario in which image zooming is performed but no audio zooming is performed in a video recorded by an electronic device. For the process of recording a video by the electronic device, refer to related descriptions in FIG. 1A(a) to FIG. 1E. FIG. 2A to FIG. 4B are a group of example user interfaces when an electronic device plays a recorded video. The video is a video for which only image zooming is performed and no audio zooming is performed.

Figure 2A:
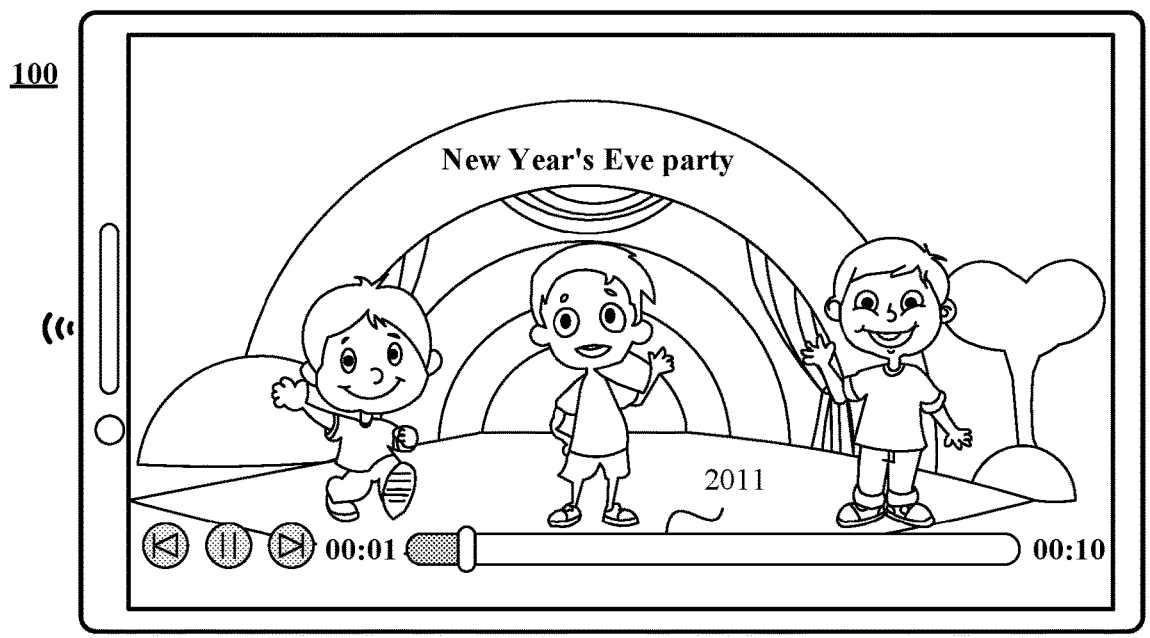
FIG. 2A and FIG. 2B are a group of user interface diagrams and audio beamforming diagrams when an electronic device plays a video according to an embodiment of this application.
Figure 2B:
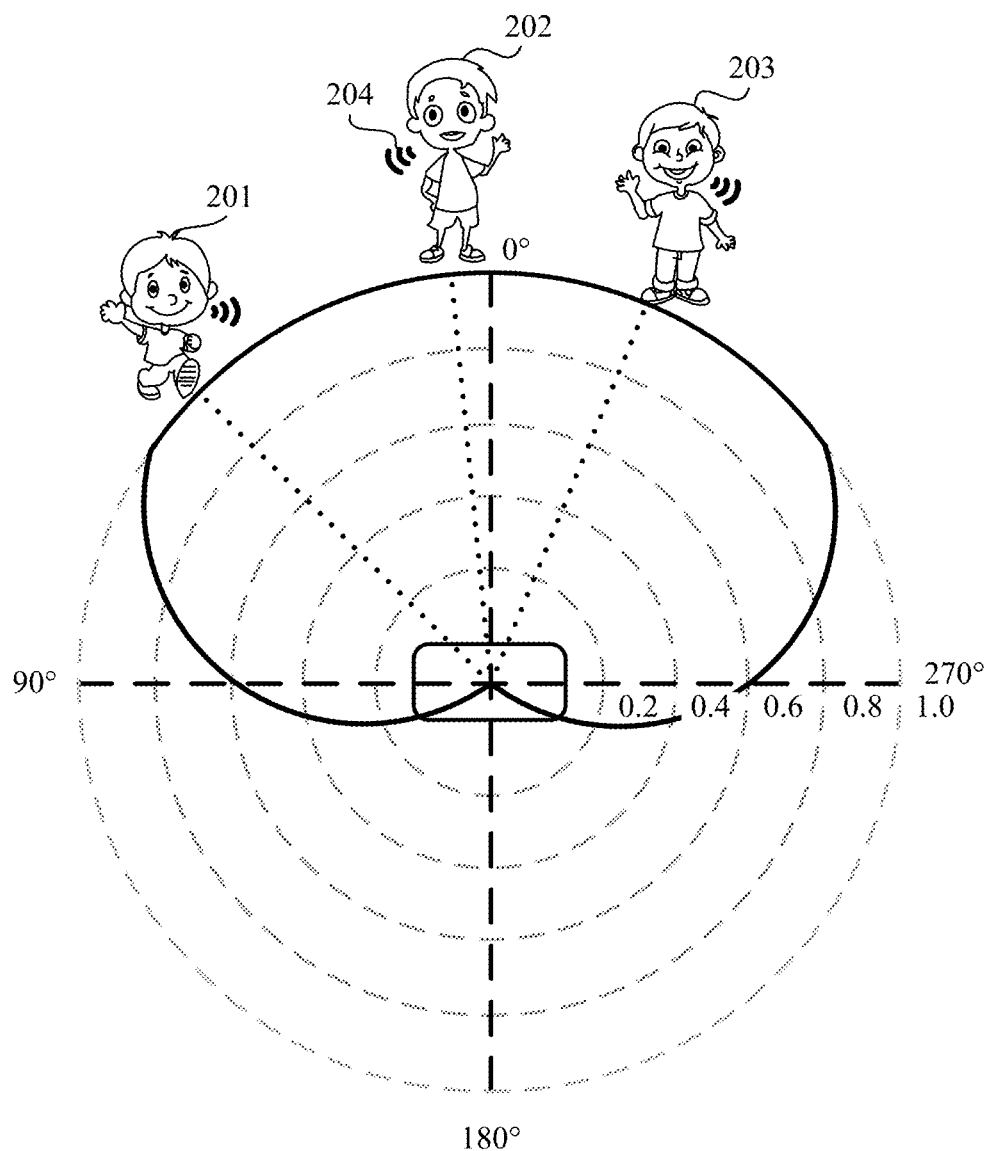
Figure 3A:
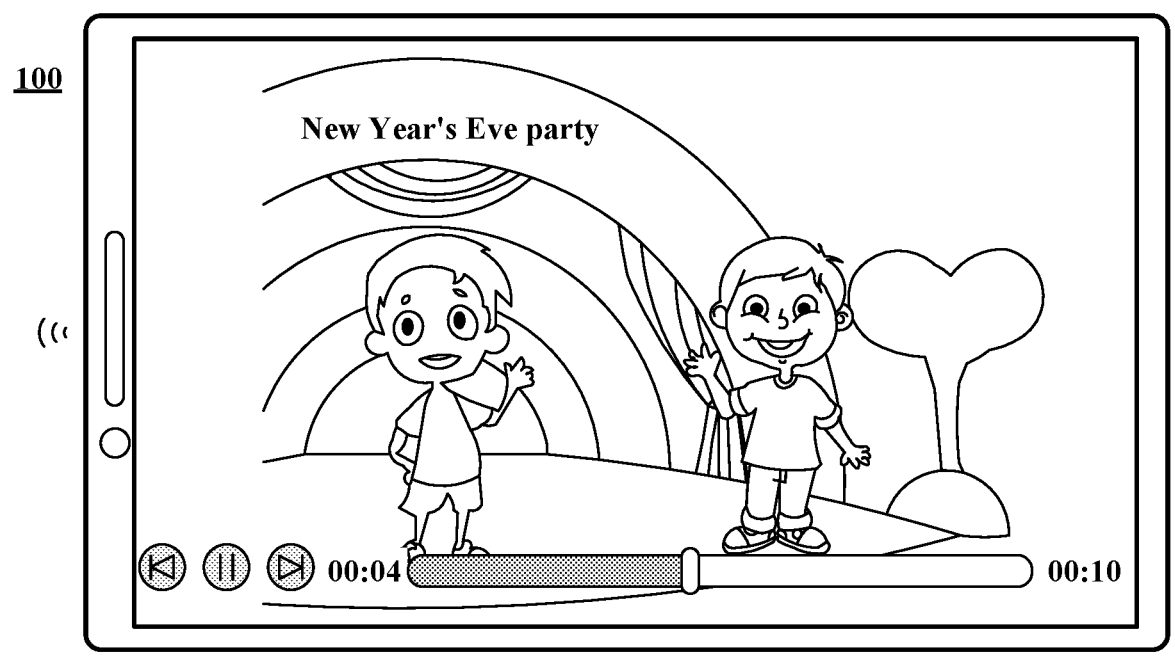
FIG. 3A and FIG. 3B are another group of user interface diagrams and audio beamforming diagrams when an electronic device plays a video according to an embodiment of this application.
Figure 3B:
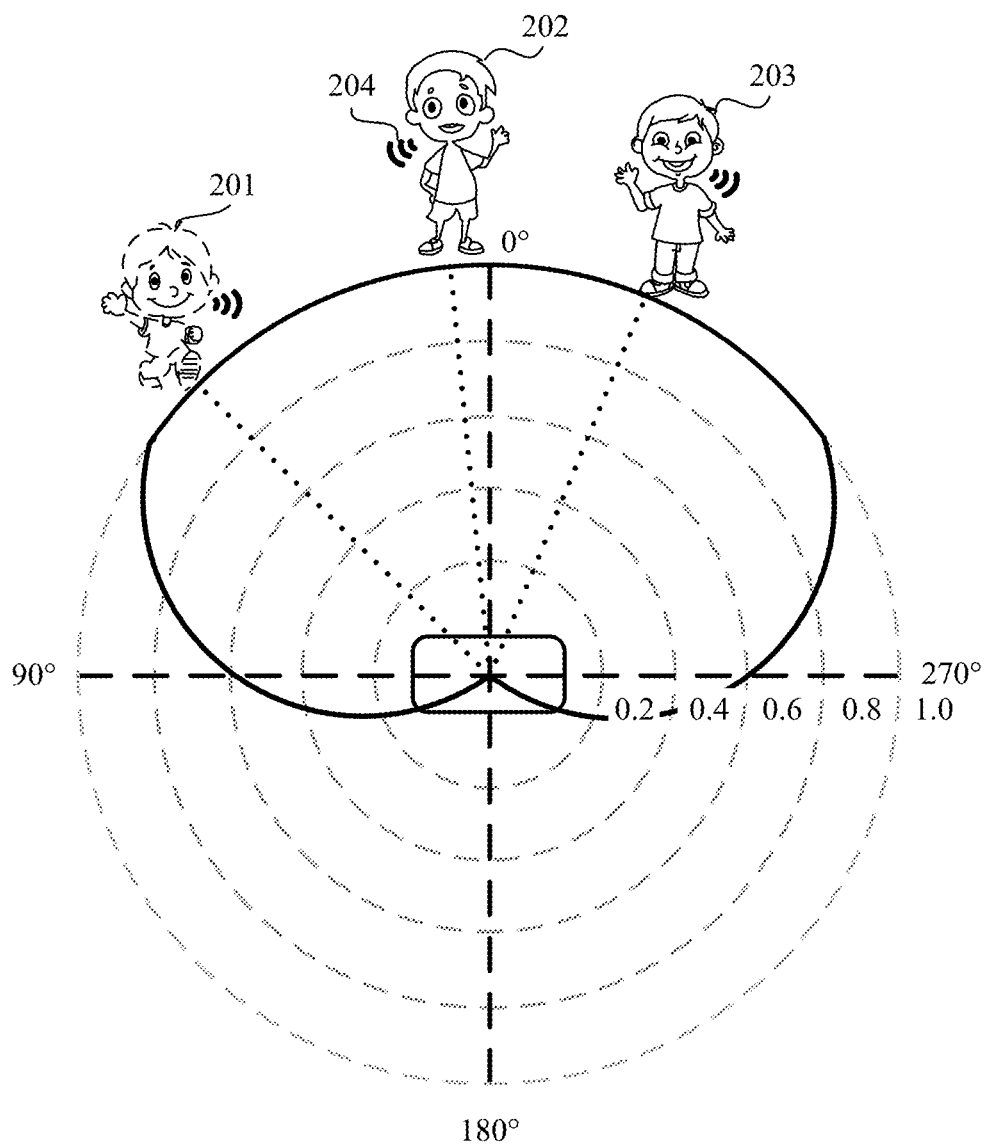
Figure 4A:
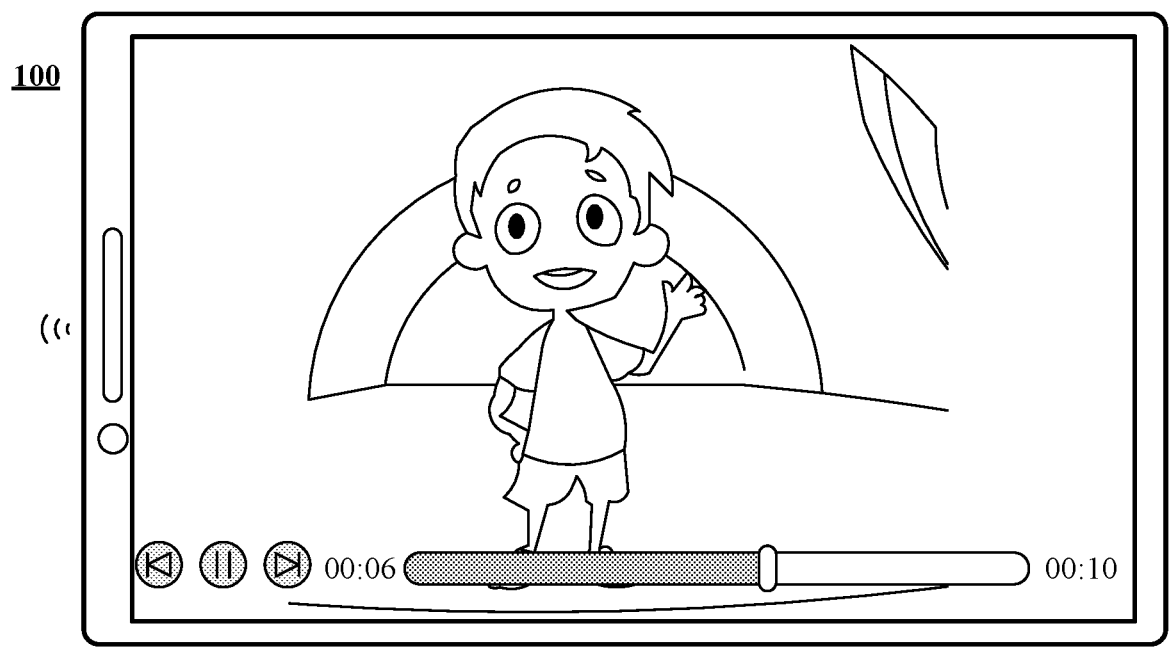
FIG. 4A and FIG. 4B are another group of user interface diagrams and audio beamforming diagrams when an electronic device plays a video according to an embodiment of this application.
Figure 4B:
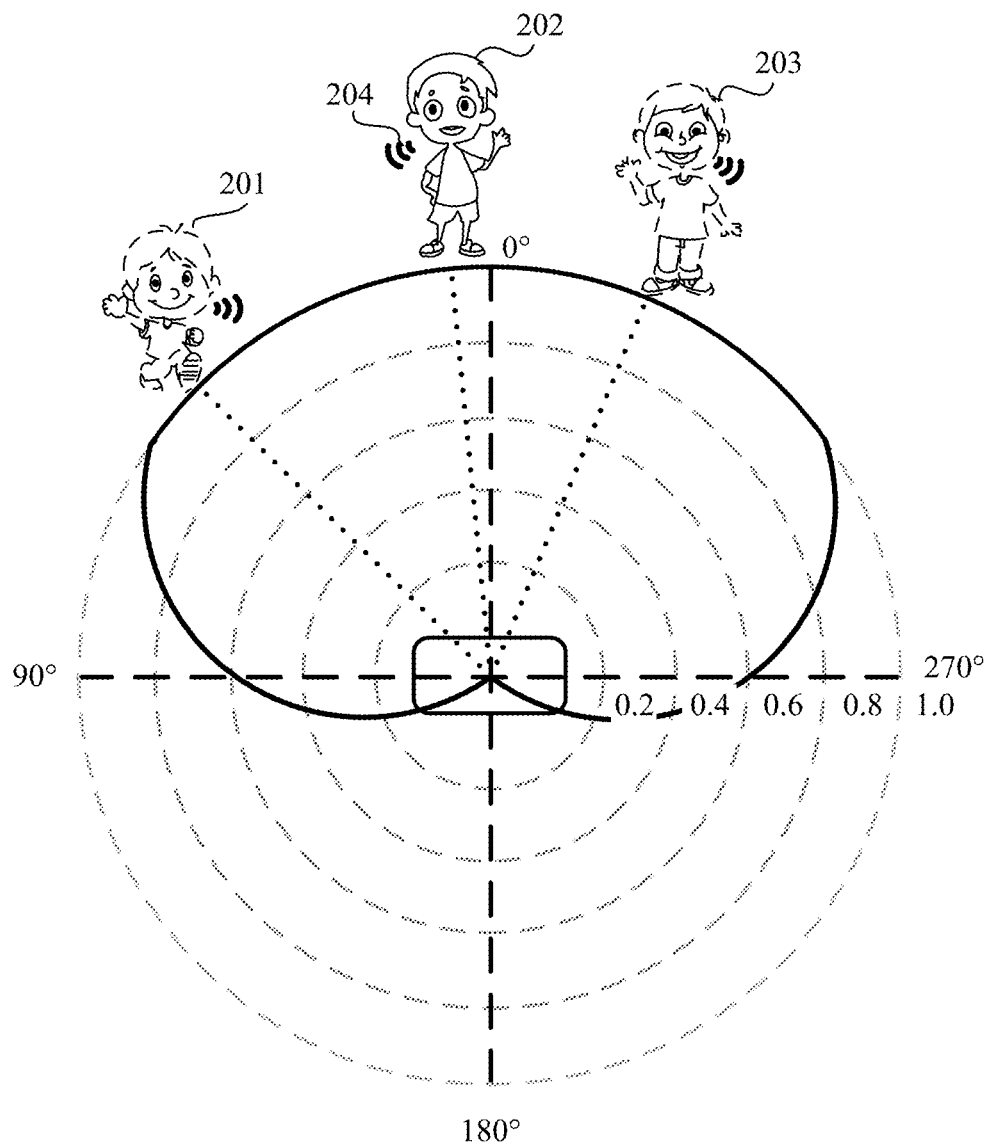

In FIG. 2B, FIG. 3B, and FIG. 4B, the icon 201 is the first photographed object in the embodiment of FIG. 1A(a) to FIG. 1D, the icon 202 is the second photographed object in the embodiment of FIG. 1A(a) to FIG. 1D, and the icon 203 is the third photographed object in the embodiment of FIG. 1A(a) to FIG. 1D. A photographed object corresponding to an icon whose outline is drawn by using a solid line is a target photographed object (for example, an icon 201 in FIG. 3B), and a photographed object corresponding to an icon whose outline is drawn by using a dashed line is a non-target photographed object (for example, an icon 203 in FIG. 4B). The target photographed object is a photographed object displayed on the display screen of the electronic device in the process of playing the video, and the non-target photographed object is a photographed object not displayed on the display screen of the electronic device in the process of playing the video. For example, the user interface 21 in FIG. 3A displays the second photographed object and the third photographed object, and does not display the first photographed object. Therefore, the second photographed object and the third photographed object are target photographed objects, and the first photographed object is a non-target photographed object.

In addition, in FIG. 2B, FIG. 3B, and FIG. 4B, the icon of each photographed object includes a sound icon 204 shown in FIG. 2B, and the sound icon is configured to represent that the photographed object is making a sound.

It should be understood that FIG. 2B, FIG. 3B, and FIG. 4B include icons having similar shapes. These icons have the same meaning, and are not explained one by one. For example, when a photographed object is drawn by using a dashed line, it means that the photographed object does not appear in a picture of a video and is a non-target photographed object.

As shown in FIG. 2A, a user interface 20 is an interface for playing a video by an electronic device. The user interface 20 includes a progress bar 2011, and the progress bar 2011 is configured to indicate playing progress of the current video. As can be seen from FIG. 2A, an image currently played by the electronic device is a photographed image corresponding to the first second in the embodiment of FIG. 1B, and a zoom ratio of the photographed image is the 1× zoom ratio. The user interface 20 displays the first photographed object, the second photographed object, and the third photographed object.

FIG. 2B is a beamforming diagram of a mono audio corresponding to the first second in the video content of FIG. 2A played by the electronic device. The beamforming diagram may be used to describe a correspondence between an audio collected by a microphone of the electronic device and transmission of the audio to a speaker for playing. The correspondence is a group of gain coefficients for indicating a degree of suppression of the audio signal in each direction collected by the microphone. The electronic device may suppress, based on the gain coefficient, the audio signal collected by the microphone, and then transmit the audio signal to the speaker for playing.

The following describes in detail a beamforming diagram of an audio signal in embodiments of this application with reference to FIG. 2B. For understanding of beamforming diagrams of all audios appearing in embodiments of this application, refer to the following description. As shown in the beamforming diagram of a mono audio in FIG. 2B, the beamforming diagram represents a direction by using an angle, and a direction range of the beamforming diagram is 0° to 360°. In embodiments of this application, the front of a center point of a plane on which a rear-facing camera of the electronic device is located is used as the 0° (360°) direction of the beamforming diagram. The beamforming diagram includes a plurality of circular dashed curves (only five circular dashed curves are listed in FIG. 2B) using a video shooting point (a video shooting point in FIG. 2B is a center point of a rectangle, and the rectangle is a simplified diagram of the electronic device) as a center of a circle and having different radii. Each circular dashed curve is an equipotential line of one gain coefficient. In other words, gain coefficients corresponding to all points on the circular dashed curve are the same, and a gain coefficient corresponding to the video shooting point is 0. Expansion is performed outward from the center of the circle, and gain coefficients corresponding to all circular dashed curves are sequentially increased (for example, in FIG. 2B, the gain coefficients corresponding to the circular curves expanded outward from the center of the circle are 0.2, 0.4, 0.6, 0.8, and 1.0, respectively). The gain coefficient represents a degree of suppression of energy of an audio signal. When the gain coefficient is equal to 1, the energy of the audio signal is almost not suppressed, and there is no change in intensity (a volume) of the voice in terms of an auditory sense of the user. When the gain coefficient is less than 1, it indicates that the electronic device suppresses the energy of the audio signal, and the intensity (the volume) of the sound in terms of the auditory sense of the user is reduced. In addition, a smaller gain coefficient indicates a greater degree of suppression of the energy of the audio signal. When the gain coefficient is 0, it indicates that the energy of the audio signal is completely suppressed, and the suppressed audio is not heard in terms of the auditory sense of the user. In addition, a solid curve in the beamforming diagram is a function curve of the gain coefficient, and the function curve represents a mapping relationship between the direction in which the audio signal is located and the gain coefficient. From the video shooting point, straight lines are drawn along the directions of the icon 201, the icon 202, and the icon 203, respectively, and gain coefficients at intersections of the straight lines and the function curve are the gain coefficients of the audio signal in the directions corresponding to the first photographed object, the second photographed object, and the third photographed object.

For understanding and explanation of compositional elements in the beamforming diagram used in embodiments of this application, refer to the foregoing description of the beamforming diagram in FIG. 2B. Detailed explanations are not provided one by one.

As can be seen from FIG. 2B, in the beamforming diagram of a mono audio in the first second of audio, the gain coefficient is 1 (or close to 1) in each of the direction corresponding to the first photographed object, the direction corresponding to the second photographed object, and the direction corresponding to the third photographed object. Therefore, the electronic device does not suppress the audio signals of the first photographed object, the second photographed object, and the third photographed object. When the electronic device plays the video work corresponding to the first second, the user can clearly hear the sounds of the first photographed object, the second photographed object, and the third photographed object.

The electronic device continues to play the video after playing the content of the first second of the video.

As shown in FIG. 3A, the user interface 21 is an interface in which the electronic device plays the recorded video work. As can be seen from the user interface 21, the image currently played by the electronic device is the photographed image and audio corresponding to the fourth second in the embodiment of FIG. 1C, and the zoom ratio is the 3× zoom ratio. The user interface 21 no longer displays the first photographed object, but displays the second photographed object and the third photographed object. Compared with the second photographed object and the third photographed object in the user interface 20, the second photographed object and the third photographed object in the user interface 21 are enlarged.

FIG. 3B is a beamforming diagram of a mono audio of an audio corresponding to the fourth second in the video content of FIG. 3A played by the electronic device. In the beamforming diagram, the gain coefficient is 1 (or close to 1) in each of the direction corresponding to the first photographed object, the direction corresponding to the second photographed object, and the direction corresponding to the third photographed object. Therefore, the electronic device does not suppress the audio signals of the first photographed object, the second photographed object, and the third photographed object. When the electronic device plays the video work corresponding to the fourth second, the user can hear the sounds of the first photographed object, the second photographed object, and the third photographed object even if the first photographed object does not appear in the user interface 21.

The electronic device continues to play the video after playing the content of the fourth second of the video.

As shown in FIG. 4A, the user interface 22 is an interface of the video played by the electronic device, and it can be seen from the user interface 22 that the image currently played by the electronic device is the photographed image and audio corresponding to the sixth second in the embodiment of FIG. 1D, and the zoom ratio of the photographed image is the 5× zoom ratio. The user interface 21 no longer displays the first photographed object and the third photographed object, but displays the second photographed object. Compared with the second photographed object displayed in the user interface 20 and the user interface 21, the second photographed object in the user interface 22 is enlarged.

FIG. 4B is a beamforming diagram of a mono audio of an audio corresponding to the sixth second in the video content of FIG. 4A played by the electronic device. In the audio beamforming diagram, the gain coefficient is 1 (or close to 1) in each of the direction corresponding to the first photographed object, the direction corresponding to the second photographed object, and the direction corresponding to the third photographed object. Therefore, the electronic device does not suppress the audio signals of the first photographed object, the second photographed object, and the third photographed object. When the electronic device plays the video work corresponding to the sixth second, the user can hear the sounds of the first photographed object, the second photographed object, and the third photographed object even if the first photographed object and the third photographed object do not appear in the user interface 22.

In the foregoing embodiment of FIG. 2A to FIG. 4B, during zooming of the video image, zooming is not performed on the audio signal corresponding to the image at the same time. Consequently, during watching of the video, the image of the target photographed object is enlarged, but the volume of the target photographed object is not increased. In addition, during watching of the video, the sound of the non-target object can also be heard.

An embodiment of this application provides an audio zooming method. The method specifically includes: An electronic device performs zooming on an audio signal corresponding to a video image based on a focal length of the image, suppresses a sound of a photographed object (a non-target photographed object) outside a photographing range when a zoom ratio increases and an angle of view decreases, and enhances or retains a sound of the photographed object (a target photographed object) within the photographing range. The photographing range is a range corresponding to a photographing scene displayed in the user interface of the electronic device during video shooting, and enhancement means that energy of an audio signal is increased so that the audio signal sounds larger. Suppression means that energy of an audio signal is reduced so that the audio signal sounds smaller or is even inaudible. The energy of the audio signal may be changed by adjusting an amplitude of the audio signal.

In this way, in the process of recording or playing the video by the electronic device, the volume of the target photographed object changes with a change in a size of the picture of the target photographed object. In addition, in the process of recording or playing the video, the sound of the non-target photographed object is hardly heard. This resolves a problem that the sound of the non-target photographed object interferes with the sound of the target photographed object during video playing, thereby providing the user with good video watching experience.

With reference to FIG. 5A to FIG. 7B, the following describes an application scenario in which image zooming is performed while audio zooming is performed in a video recorded by an electronic device. For the process of recording a video by the electronic device, refer to related descriptions in FIG. 1A(a) to FIG. 1E. FIG. 5A to FIG. 7B are a group of example user interfaces when an electronic device plays a recorded video. The recorded video is a video for which image zooming is performed while audio zooming is performed.

Figure 5A:
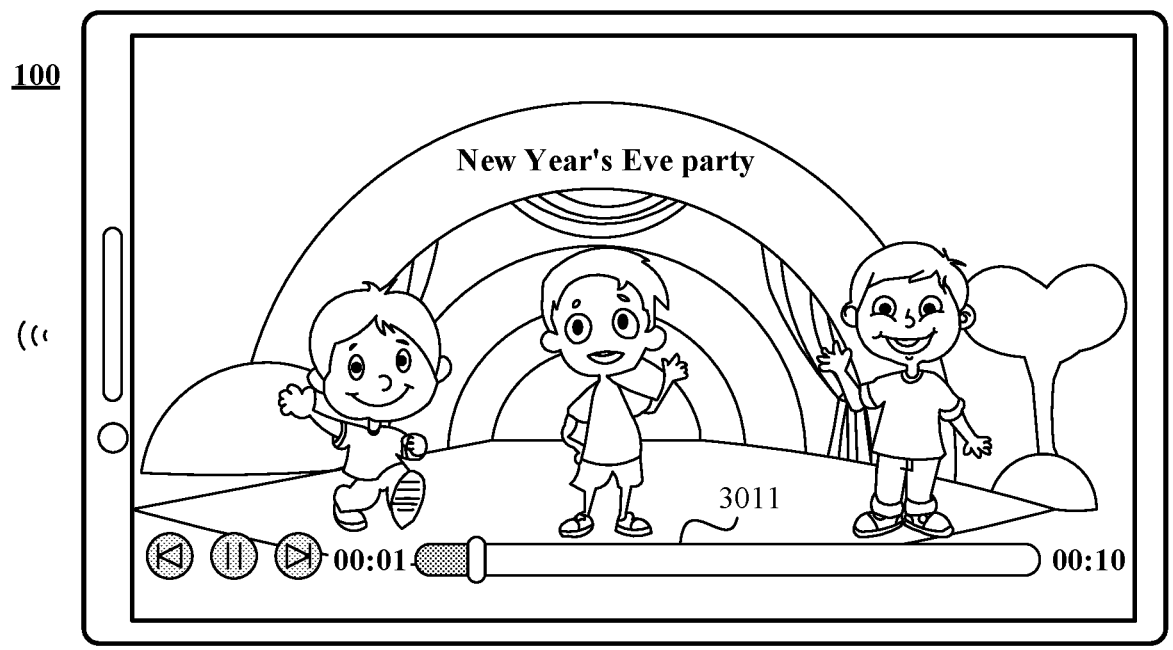
FIG. 5A is a user interface diagram when an electronic device plays a video according to an embodiment of this application.
Figure 5B:
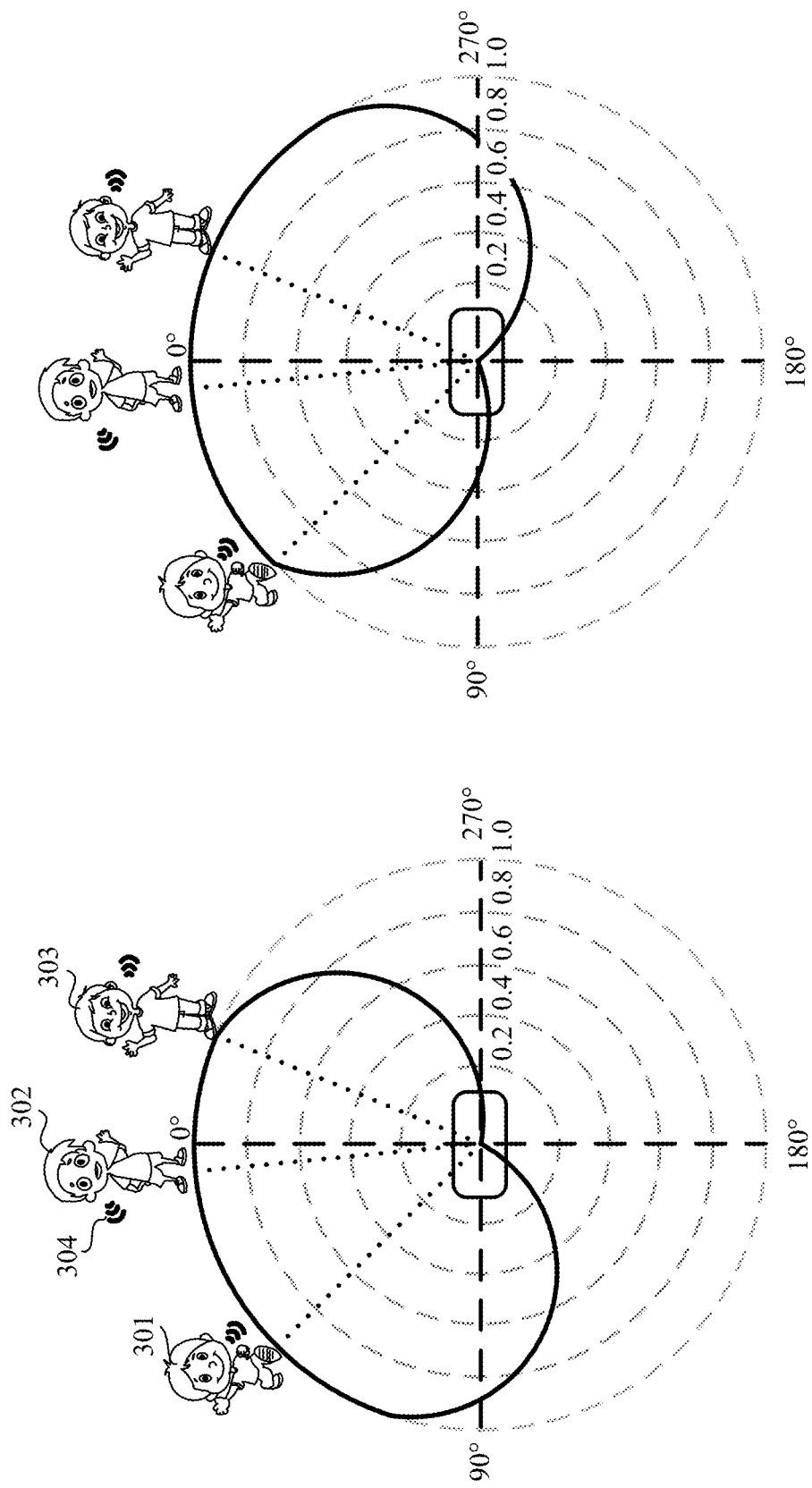
FIG. 5B is a beamforming diagram of a left channel audio and a right channel audio according to an embodiment of this application.

In FIG. 5B, the icon 301 is the first photographed object in the embodiment of FIG. 1A(a) to FIG. 1D, the icon 302 is the second photographed object in the embodiment of FIG. 1A(a) to FIG. 1D, and the icon 303 is the third photographed object in the embodiment of FIG. 1A(a) to FIG. 1D.

It should be understood that FIG. 5B, FIG. 5C, FIG. 6B, FIG. 6C, FIG. 7B, and FIG. 7C include icons having similar shapes. These icons have the same meaning, and are not explained one by one. A photographed object corresponding to an icon whose outline is drawn by using a solid line is a target photographed object, and a photographed object corresponding to an icon whose outline is drawn by using a dashed line is a non-target photographed object. The target photographed object is a photographed object displayed on the display screen of the electronic device in the process of playing the video, and the non-target photographed object is a photographed object not displayed on the display screen of the electronic device in the process of playing the video. For example, the user interface 31 in FIG. 6A displays the second photographed object and the third photographed object, and does not display the first photographed object. Therefore, the second photographed object and the third photographed object are target photographed objects, and the first photographed object is a non-target photographed object.

In addition, in FIG. 5B, FIG. 5C, FIG. 6B, FIG. 6C, FIG. 7B, and FIG. 7C, the icon of each photographed object includes a sound icon 304 shown in FIG. 5B, and the sound icon is configured to represent that the photographed object is making a sound.

As shown in FIG. 5A, a user interface 30 is an interface for playing a video by an electronic device. The user interface 30 includes a progress bar 3011, and the progress bar 3011 is configured to indicate playing progress of the video. As can be seen from FIG. 5A, an image currently played by the electronic device is a photographed image corresponding to the first second in the embodiment of FIG. 1B, and a zoom ratio of the current video image is the 1× zoom ratio. The user interface 30 displays the first photographed object, the second photographed object, and the third photographed object.

If an output audio corresponding to the photographed image in FIG. 5A is a dual-channel audio (including a left channel output audio and a right channel output audio), the electronic device may generate a left channel audio signal and a right channel audio signal by using a beamforming diagram of a left channel audio and a beamforming diagram of a right channel audio shown in FIG. 5B, respectively. FIG. 5B is a beamforming diagram of a left channel audio and a beamforming diagram of a right channel audio of the photographed image corresponding to FIG. 5A.

Figure 5C:
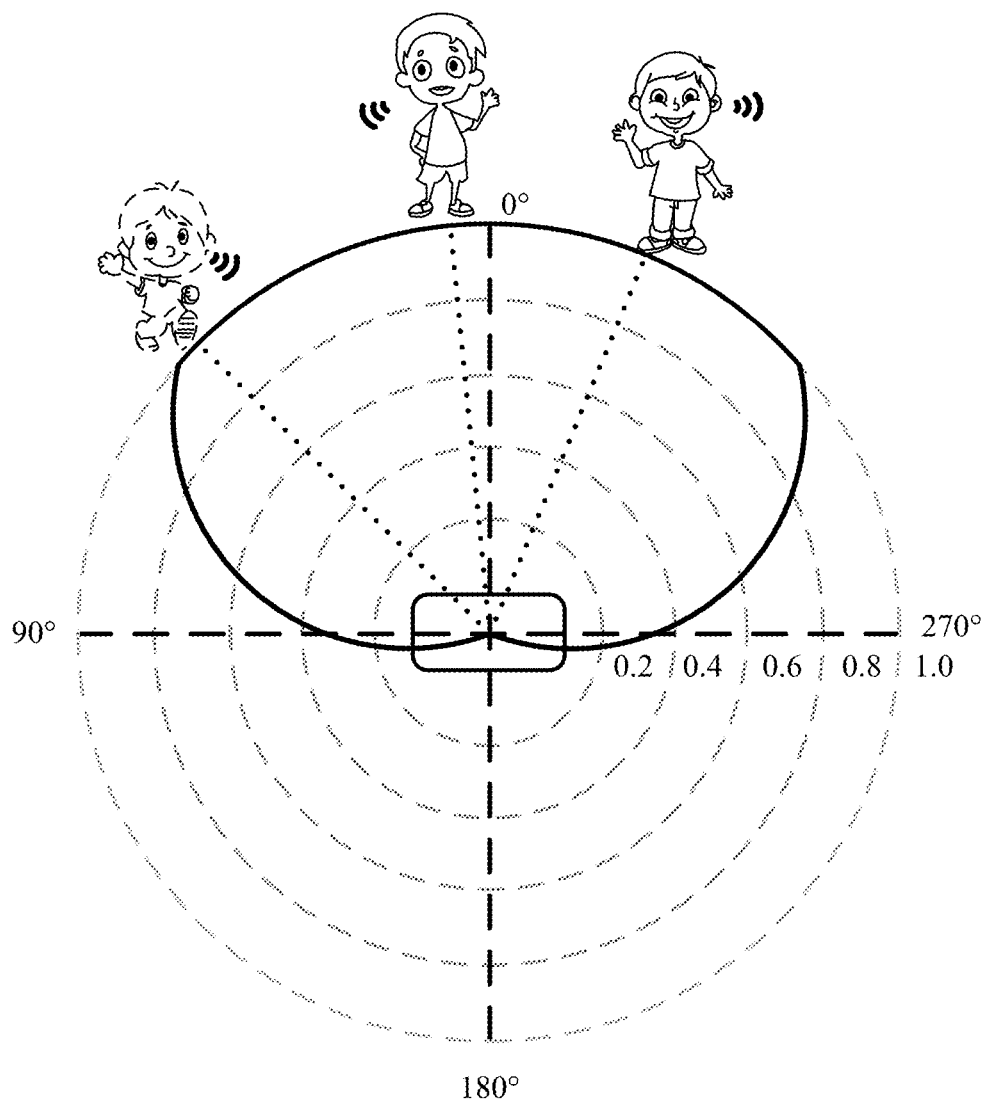
FIG. 5C is a beamforming diagram of a mono audio according to an embodiment of this application.

If the output audio corresponding to the photographed image in FIG. 5A is a mono audio, the electronic device may fuse the beamforming diagram of a left channel audio and the beamforming diagram of a right channel audio in FIG. 5B to obtain a beamforming diagram of a mono audio shown in FIG. 5C. The electronic device may generate a mono audio based on the beamforming diagram of a mono audio. FIG. 5C is a beamforming diagram of a mono audio corresponding to the photographed image in FIG. 5A according to an embodiment of this application. As shown in FIG. 5C, when the zoom ratio of the photographed image corresponding to the first second is the 1× zoom ratio, the gain coefficients corresponding to the directions in which the first photographed object, the second photographed object, and the third photographed object are located are 1 (or close to 1), and the electronic device does not suppress the sounds of the first photographed object, the second photographed object, and the third photographed object. When the electronic device plays the audio corresponding to the first second of the video, the user can hear the sounds of the first photographed object, the second photographed object, and the third photographed object.

The electronic device continues to play the video after playing the content of the first second of the video.

Figure 6A:
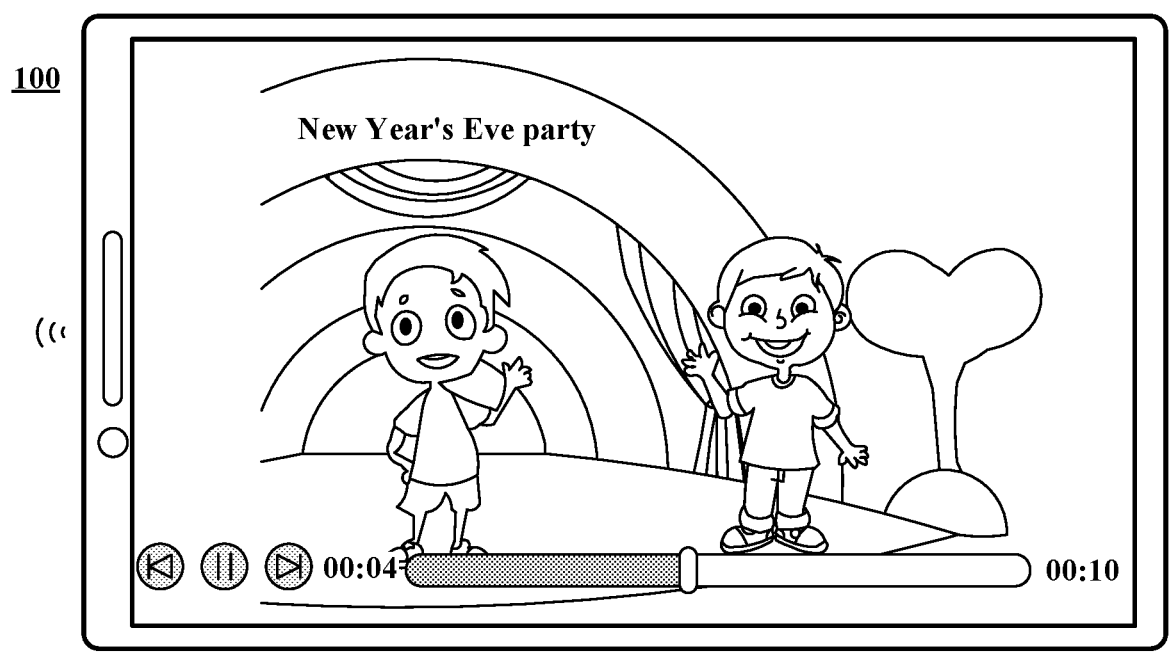
FIG. 6A is another user interface diagram when an electronic device plays a video according to an embodiment of this application.

As shown in FIG. 6A, the user interface 31 is an interface in which the electronic device plays the video. As can be seen from the user interface 31, the image currently played by the electronic device is the photographed image and audio corresponding to the fourth second in the embodiment of FIG. 1C, and the zoom ratio of the photographed image is the 3× zoom ratio. The user interface 31 no longer displays the first photographed object, but displays the second photographed object and the third photographed object. Compared with the second photographed object and the third photographed object in the user interface 30, the second photographed object and the third photographed object in the user interface 31 are enlarged.

Figure 6B:
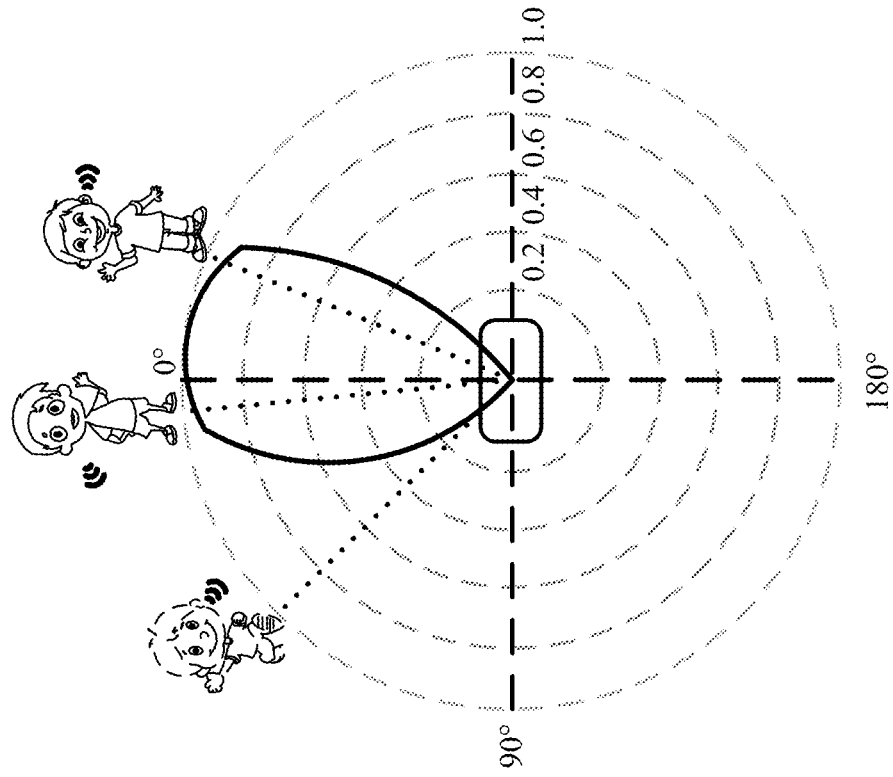
FIG. 6B is another beamforming diagram of a left channel audio and a right channel audio according to an embodiment of this application.
Figure 6B:
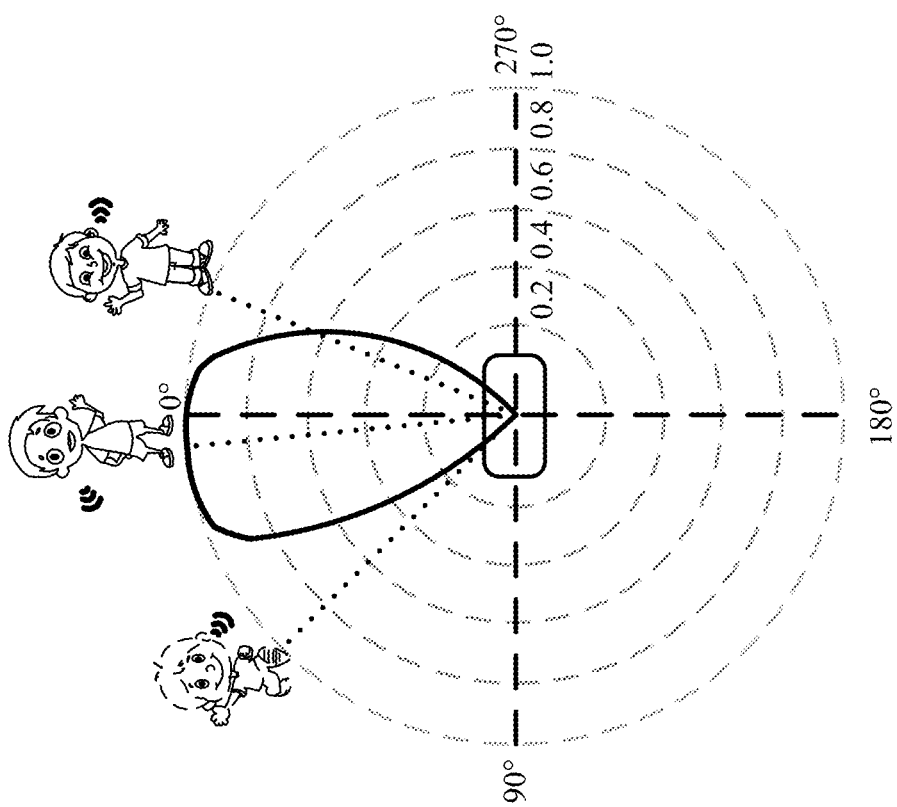

If an output audio corresponding to the photographed image in FIG. 6A is a dual-channel audio (including a left channel output audio and a right channel output audio), a left channel audio signal and a right channel audio signal may be generated by using a beamforming diagram of a left channel audio and a beamforming diagram of a right channel audio shown in FIG. 6B, respectively. FIG. 6B is a beamforming diagram of a left channel audio and a beamforming diagram of a right channel audio of the photographed image corresponding to FIG. 6A.

Figure 6C:
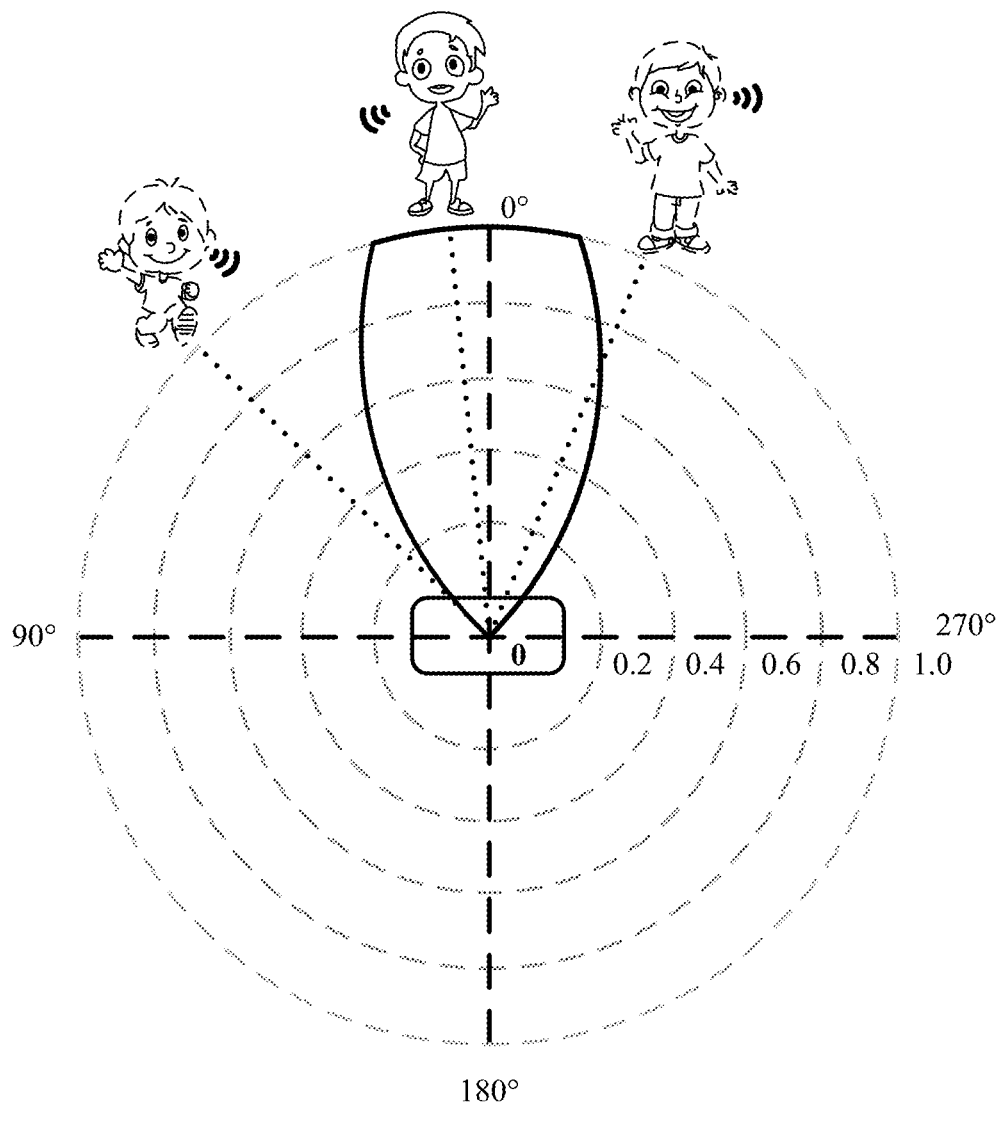
FIG. 6C is another beamforming diagram of a mono audio according to an embodiment of this application.

If the output audio corresponding to the photographed image in FIG. 6A is a mono audio, the electronic device may fuse the beamforming diagram of a left channel audio and the beamforming diagram of a right channel audio in FIG. 6B to obtain a beamforming diagram of a mono audio shown in FIG. 6C. The electronic device may generate a mono audio based on the beamforming diagram of a mono audio. FIG. 6C is a beamforming diagram of a mono audio corresponding to the photographed image in FIG. 6A according to an embodiment of this application. As shown in FIG. 6C, when the zoom ratio of the photographed image corresponding to the fourth second is the 3× zoom ratio, the gain coefficient corresponding to the direction in which the second photographed object is located is 1 (or close to 1), the gain coefficient corresponding to the direction in which the third photographed object is located is approximately 0.7, and the gain coefficient corresponding to the direction in which the first photographed object is located is approximately 0. Therefore, the electronic device does not suppress the sound of the second photographed object, but suppresses the sound of the first photographed object and the sound of the third photographed object, and suppresses the sound of the first photographed object to a greater extent. Therefore, although the audio signal collected by the microphone of the electronic device includes the sounds of the first photographed object, the second photographed object, and the third photographed object, the sounds of the first photographed object and the third photographed object are suppressed in the actually played audio, and in terms of the auditory sense, the sound of the third photographed object is reduced, the sound of the first photographed object is hardly heard, and voice intensity of the second photographed object remains unchanged.

Figure 7A:
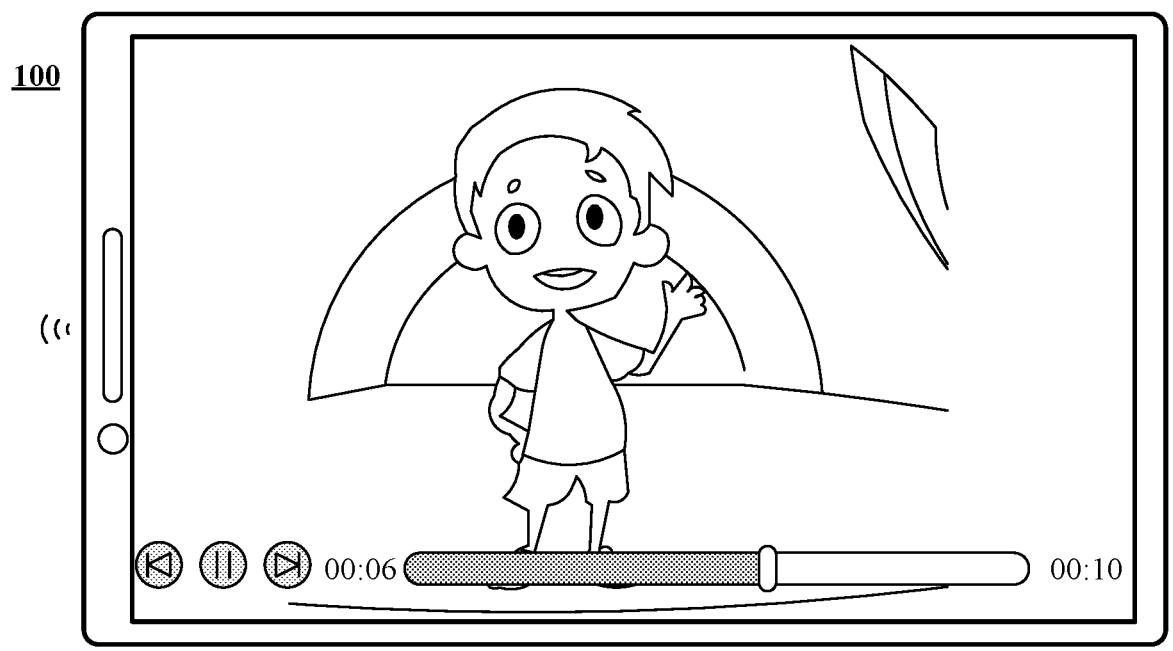
FIG. 7A is another user interface diagram when an electronic device plays a video according to an embodiment of this application.

As shown in FIG. 7A, the user interface 32 is an interface in which the electronic device plays a video. It can be seen from the user interface 32 that the image currently played by the electronic device is the photographed image and audio corresponding to the sixth second in the embodiment of FIG. 1D, and the zoom ratio of the photographed image is the 5× zoom ratio. The user interface 32 no longer displays the first photographed object and the third photographed object, but displays the second photographed object. Compared with the second photographed object in the user interface 31, the second photographed object in the user interface 31 is enlarged.

Figure 7B:
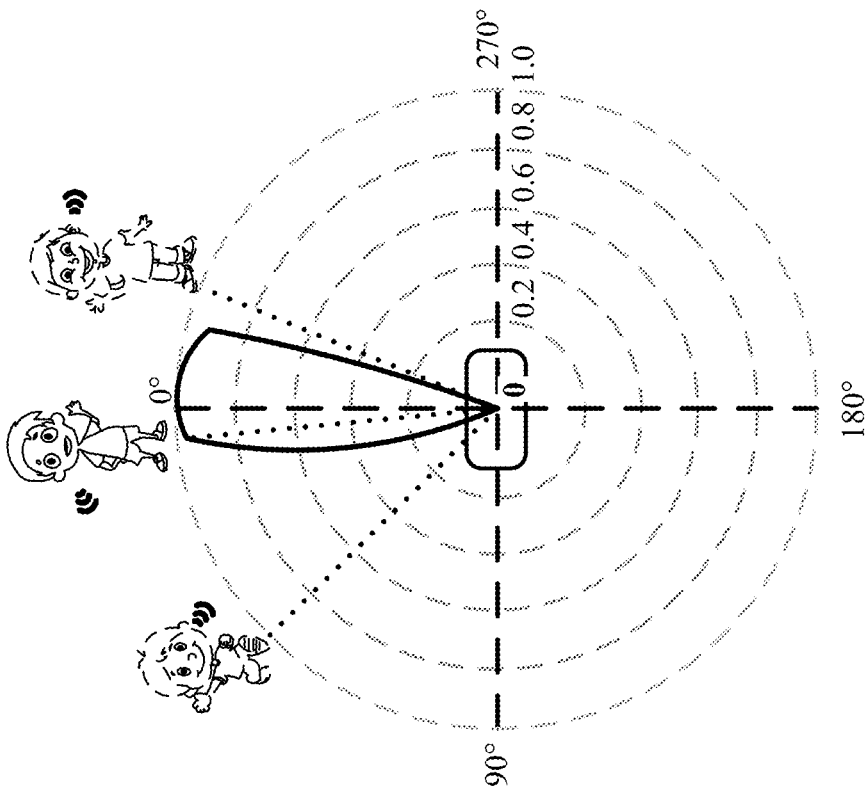
FIG. 7B is another beamforming diagram of a left channel audio and a right channel audio according to an embodiment of this application.
Figure 7B:
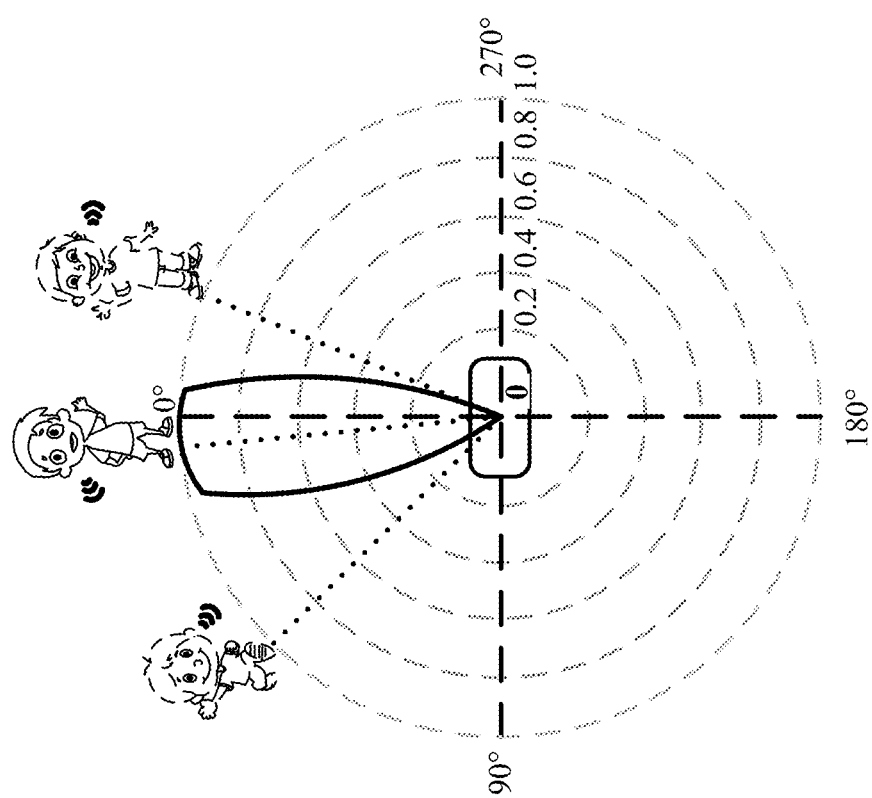

If an output audio corresponding to the photographed image in FIG. 7A is a dual-channel audio (including a left channel output audio and a right channel output audio), a left channel audio signal and a right channel audio signal may be generated by using a beamforming diagram of a left channel audio and a beamforming diagram of a right channel audio shown in FIG. 7B, respectively. FIG. 7B is a beamforming diagram of a left channel audio and a beamforming diagram of a right channel audio of the photographed image corresponding to FIG. 7A.

Figure 7C:
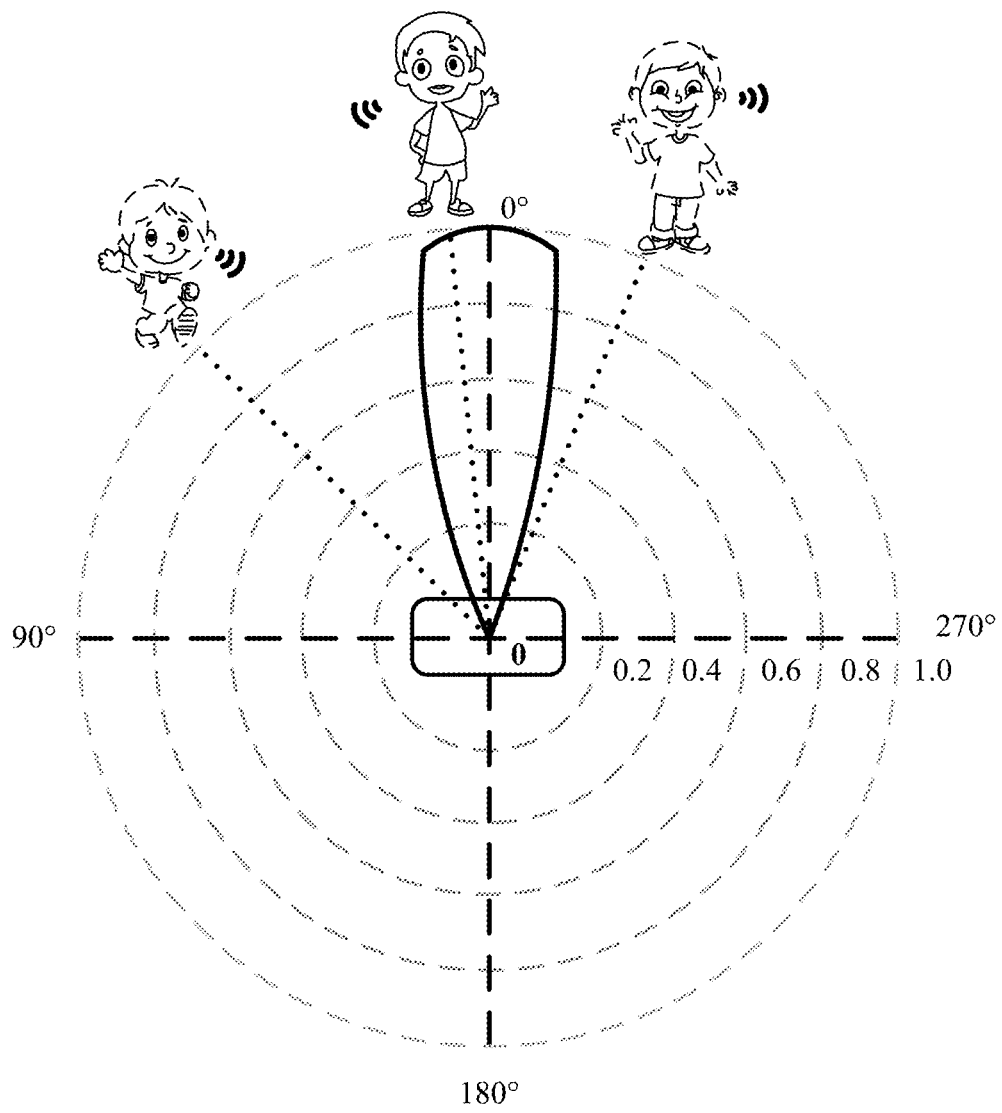
FIG. 7C is another beamforming diagram of a mono audio according to an embodiment of this application.

If the output audio corresponding to the photographed image in FIG. 7A is a mono audio, the electronic device may fuse the beamforming diagram of a left channel audio and the beamforming diagram of a right channel audio in FIG. 7B to obtain a beamforming diagram of a mono audio shown in FIG. 7C. The electronic device may generate a mono audio signal based on the beamforming diagram of a mono audio. FIG. 7C is a beamforming diagram of a mono audio corresponding to the photographed image in FIG. 7A according to an embodiment of this application. As shown in FIG. 7C, when the zoom ratio of the photographed image is the 5× zoom ratio, the gain coefficient corresponding to the direction in which the second photographed object is located is 1 (or close to 1), and the electronic device does not suppress the sound of the second photographed object. However, because the gain coefficients corresponding to the directions in which the first photographed object and the third photographed object are located are close to 0, the electronic device may suppress the sounds of the first photographed object and the third photographed object. Therefore, although the audio signal collected by the microphone of the electronic device includes the sounds of the first photographed object, the second photographed object, and the third photographed object, the sounds of the first photographed object and the third photographed object are suppressed in the actually played audio, and in terms of the auditory sense, the sounds of the first photographed object and the third photographed object are quite small or hardly heard.

The following describes three use scenarios related to embodiments of this application.

Scenario 1: In a process of recording a video, an electronic device performs, based on a change in a focal length, real-time zooming on each frame of image collected by a camera, and at the same time, performs, based on a change in a zoom ratio, real-time audio zooming on each frame of audio collected by a microphone. Finally, the electronic device generates an image stream based on a plurality of frames of images and generates an audio stream based on a plurality of frames of audios, and then mixes the image stream and the audio stream to obtain a recorded video and save the recorded video.

For a group of example user interfaces related to recording a video scenario 1, refer to related descriptions in the foregoing embodiment of FIG. 1A(a) to FIG. 1E. For a group of example user interfaces related to playing the video, refer to related descriptions in the foregoing embodiment of FIG. 5A to FIG. 7C. Details are not described herein again.

Scenario 2: The electronic device is connected to a headset. In the process of recording a video, the camera of the electronic device collects an image in real time and processes each frame of image in real time. At the same time, the electronic device performs zooming processing on an audio corresponding to the image in real time based on a zoom ratio of the image and a change in the zoom ratio. Then, the electronic device plays each frame of processed image through a display screen in real time, and plays each frame of processed audio through the headset at the same time.

Figure 8B:
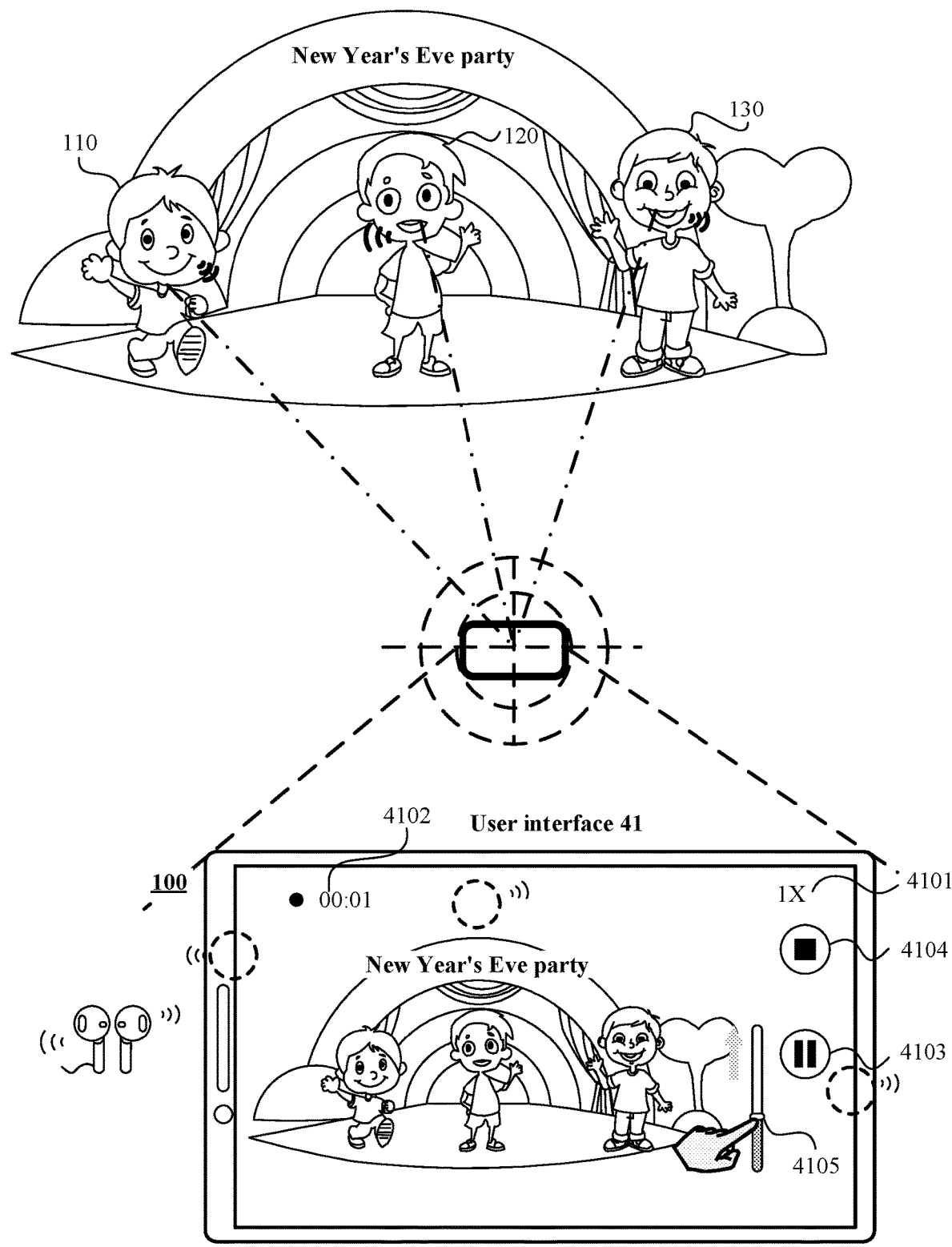
FIG. 8A(a) to FIG. 8D are a group of user interface diagrams when an electronic device performs audio zooming in a video recording process according to an embodiment of this application.
Figure 8C:
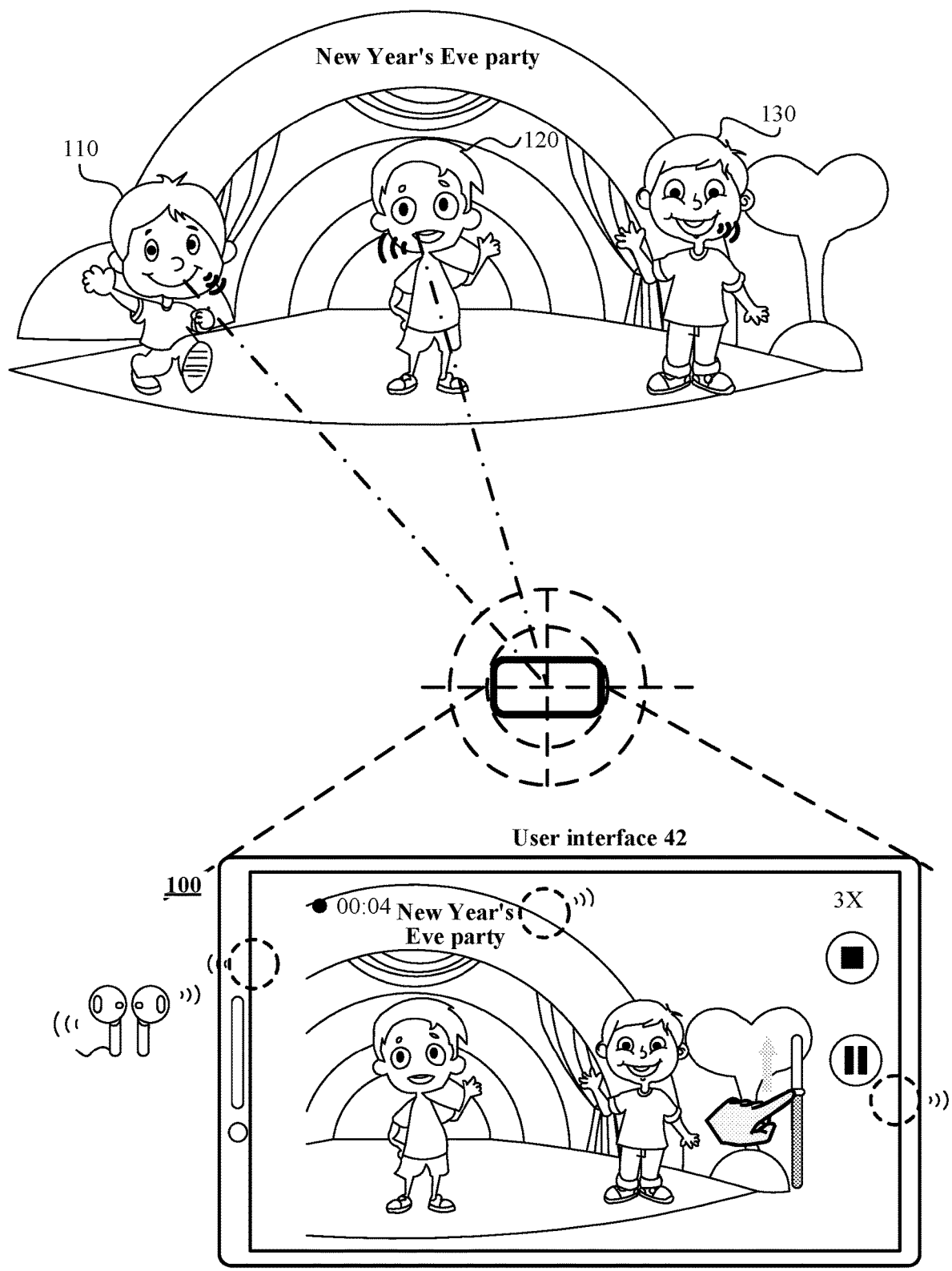
Figure 8D:
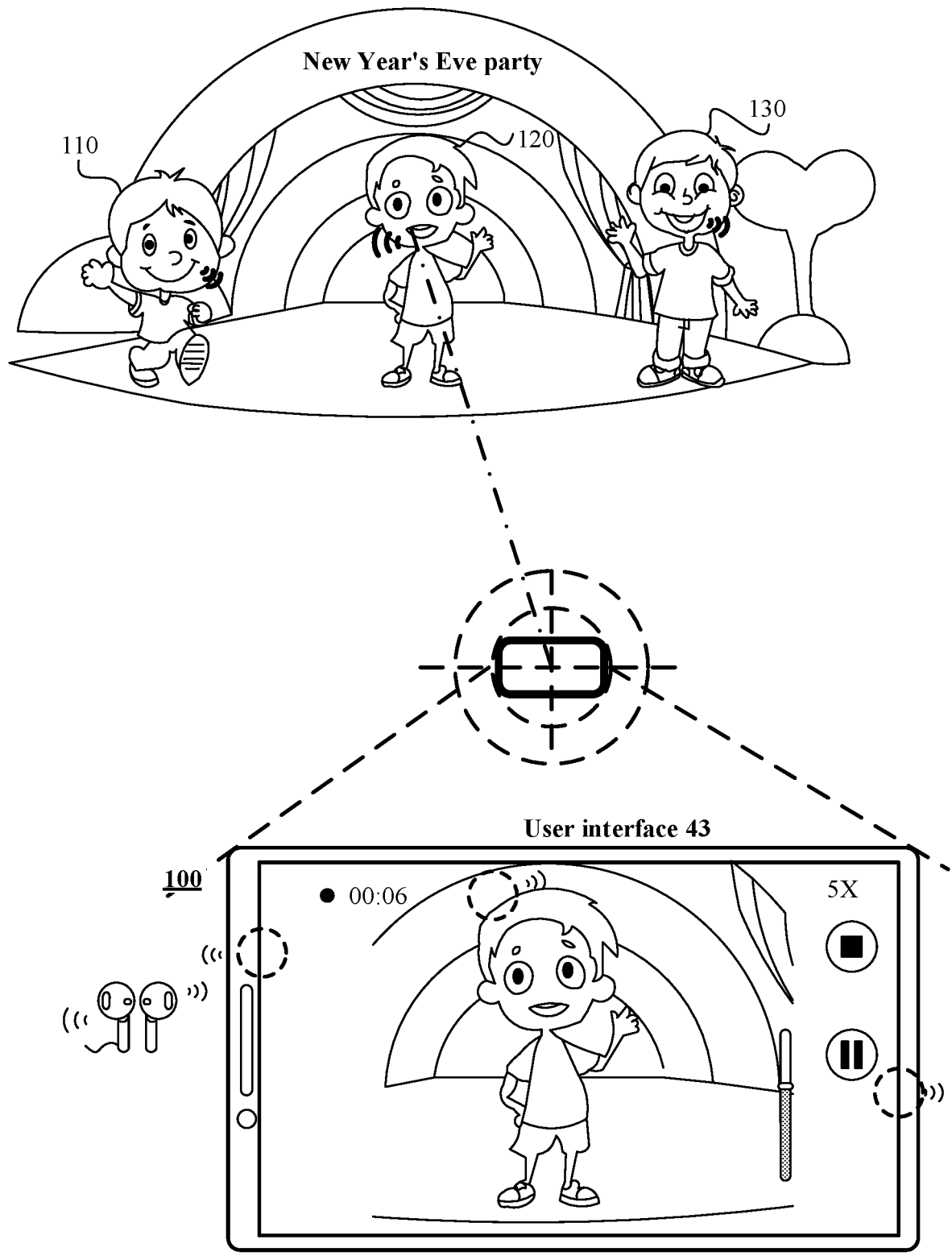

For a group of example user interfaces related to scenario 2, refer to the following descriptions of FIG. 8A(a) to FIG. 8D.

In FIG. 8A(a) to FIG. 8D, the photographed objects may include a first photographed object 110, a second photographed object 120, and a third photographed object 130. This embodiment of this application is described by using an example in which the electronic device 100 records a video by using a rear-facing camera and records a video. It is assumed that distances between the electronic device 100 and the foregoing three photographed objects do not change in the video recording process, and volumes of the photographed objects do not change either throughout the recording process. To prevent a played audio from being collected by the electronic device during previewing of a video and to avoid impact on an audio that needs to be collected subsequently, the electronic device may play the audio through a connected headset.

In some embodiments, the electronic device may play the audio without using the headset, but may directly play the audio by using a local speaker, and then cancel the audio played by the speaker of the electronic device through acoustic echo cancellation (acoustic echo cancellation, AEC).

As shown in FIG. 8A(a) and FIG. 8A(b), a user interface 40 displayed on a screen of the electronic device 100 is a preview interface for recording a video, and the preview interface includes a recording control 401. The recording control 401 is configured to receive an instruction for recording a video. When the electronic device 100 detects an input operation (for example, tapping) with respect to the recording control 401, the electronic device 100 displays a user interface 41 shown in FIG. 8B in response to the operation.

As shown in FIG. 8B, the user interface 41 is an interface for currently recording a video, including a focal length display icon 4101, a recording time display icon 4102, a pause control 4103, a stop control 4104, and a zoom ratio control 4105. The focal length display icon 4101 is configured to display a zoom ratio of a current image. For example, 1× indicates a zoom ratio of one fold, and 3× indicates a zoom ratio of three folds. The recording time display icon 4102 is configured to display a time of current video recording, the pause control 4103 is configured to pause the recording of the video in response to a pause instruction, and the stop control 4104 is configured to end the recording of the video in response to a recording stopping instruction. The zoom ratio control 4105 is configured to increase or decrease the zoom ratio used when the video is recorded in response to a zoom ratio adjustment instruction. For example, when the user slides the zoom ratio control 4105 upward, the electronic device 100 increases the zoom ratio of the image in response to the operation of the user for sliding the zoom ratio control 4105 upward. When the user slides the zoom ratio control 4105 downward, the electronic device 100 decreases the zoom ratio of the image in response to the operation of the user for sliding the zoom ratio control 4105 downward. As can be seen from the recording time display icon 4102, the time of the current video recording is the first second. At this time, the electronic device 100 obtains an image and an audio signal corresponding to the first second of the video. As can be seen from the focal length display icon 4101, the zoom ratio of the currently recorded video is the 1× zoom ratio, and the user interface 41 includes a first photographed object, a second photographed object, and a third photographed object. When the electronic device 100 detects an operation of the user for sliding the zoom ratio control 4105 upward, the electronic device 100 changes the zoom ratio at the time of recording the video in response to the operation, and displays a user interface 42 shown in FIG. 8C.

As shown in FIG. 8C, the user interface 42 is an interface for recording a video. As can be seen from the recording time display icon, the time of the current video recording is the fourth second. At this time, the electronic device 100 obtains an image and an audio signal corresponding to the fourth second of the video. As can be seen from the focal length display icon, the zoom ratio of the currently recorded video is the 3× zoom ratio, and the user interface 42 includes the second photographed object and the third photographed object. At this time, it can be seen that the user interface 42 no longer displays the first photographed object. In addition, compared with the second photographed object and the third photographed object displayed in the user interface 41, the second photographed object and the third photographed object displayed in the user interface 42 are enlarged. When the electronic device 100 detects an operation of the user for sliding the zoom ratio control upward, the electronic device 100 changes the zoom ratio at the time of recording the video in response to the operation, and displays a user interface 43 shown in FIG. 8D.

As shown in FIG. 8D, the user interface 43 is an interface for recording a video. As can be seen from the recording time display icon, the time of the current video recording is the sixth second. At this time, the electronic device 100 obtains an image and an audio signal corresponding to the sixth second of the video. As can be seen from the focal length display icon, the zoom ratio of the currently recorded video is the 5× zoom ratio, and the user interface 43 includes the second photographed object. At this time, it can be seen that the user interface 43 does not display the first photographed object and the third photographed object, and displays only the second photographed object. Compared with the second photographed object displayed in the user interface 42, the second photographed object displayed in the user interface 43 is enlarged.

In this way, by previewing the video recorded by the electronic device, the electronic device can obtain, through debugging, the optimum zoom ratio at the time of recording the video.

In some embodiments, in addition to being able to play each frame of generated image and each frame of generated audio in real time, the electronic device may further transmit each frame of processed image and each frame of processed audio signal to another electronic device, so as to implement real-time playing of the recorded video among a plurality of devices.

Scenario 3: The electronic device may process the audio stream in the recorded video. The electronic device obtains an audio signal corresponding to each frame of image and focal length information corresponding to the audio signal, performs audio zooming processing on the audio signal based on the focal length of the frame of image, and recodes the processed audio to obtain a new audio stream. The electronic device mixes the new audio stream and the image stream to generate a new video.

For a process in which the electronic device records a video and saves the video, refer to related descriptions in FIG. 1A(a) to FIG. 1E. With reference to FIG. 9A to FIG. 9E, the following describes in detail a group of example user interfaces related to performing audio zooming on a recorded video by an electronic device.

Figure 9A:
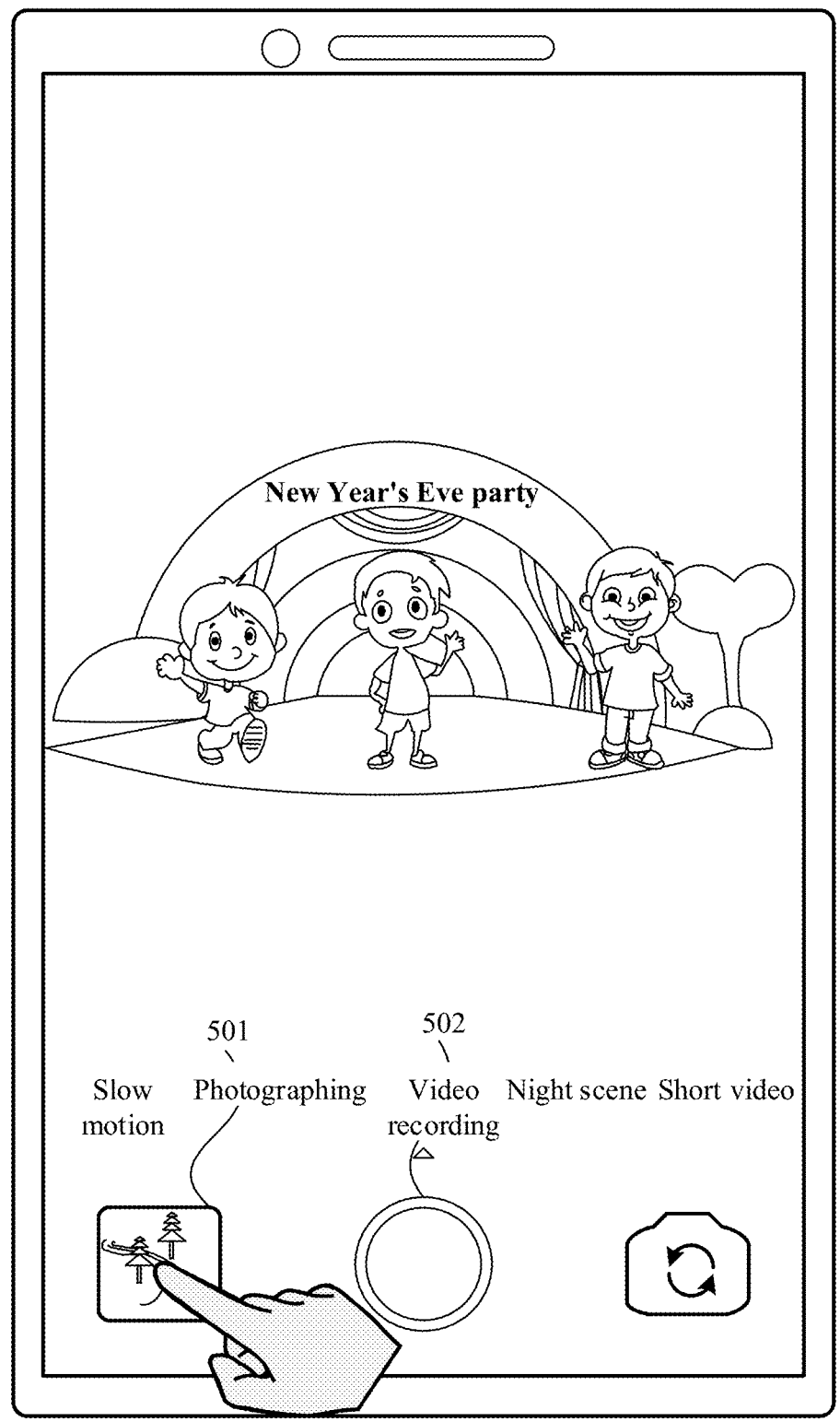
FIG. 9A to FIG. 9E are a group of user interface diagrams when an electronic device performs audio zooming on a recorded video according to an embodiment of this application.

After completing the video recording, the electronic device 100 displays a user interface 50 shown in FIG. 9A. The user interface 50 includes an echo control 501 and a photographing control 502. The echo control 501 is configured to display a recorded video work after receiving an echo instruction, and the photographing control 502 is configured to record a video after receiving a photographing instruction. After the electronic device 100 detects an input operation (for example, tapping) with respect to the echo control 501, the electronic device 100 displays a user interface 51 shown in FIG. 9B in response to the input operation.

Figure 9B:
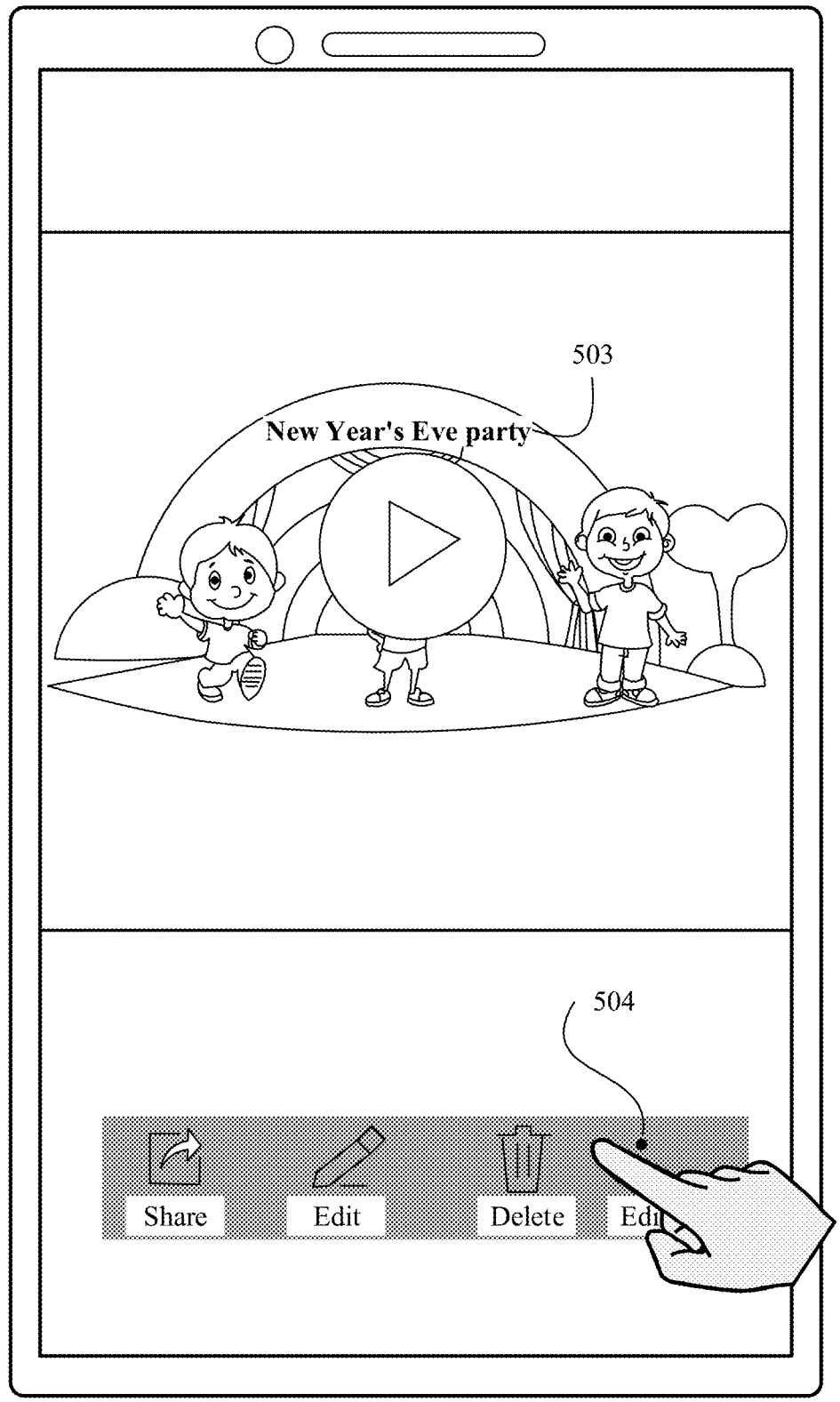

As shown in FIG. 9B, the user interface 51 is an interface for editing a video work, and includes other functional controls such as a play control 503 and an edit control 504. After the electronic device 100 detects an input operation (for example, tapping) with respect to the edit control 504, the electronic device 100 displays a user interface 52 shown in FIG. 9C.

Figure 9C:
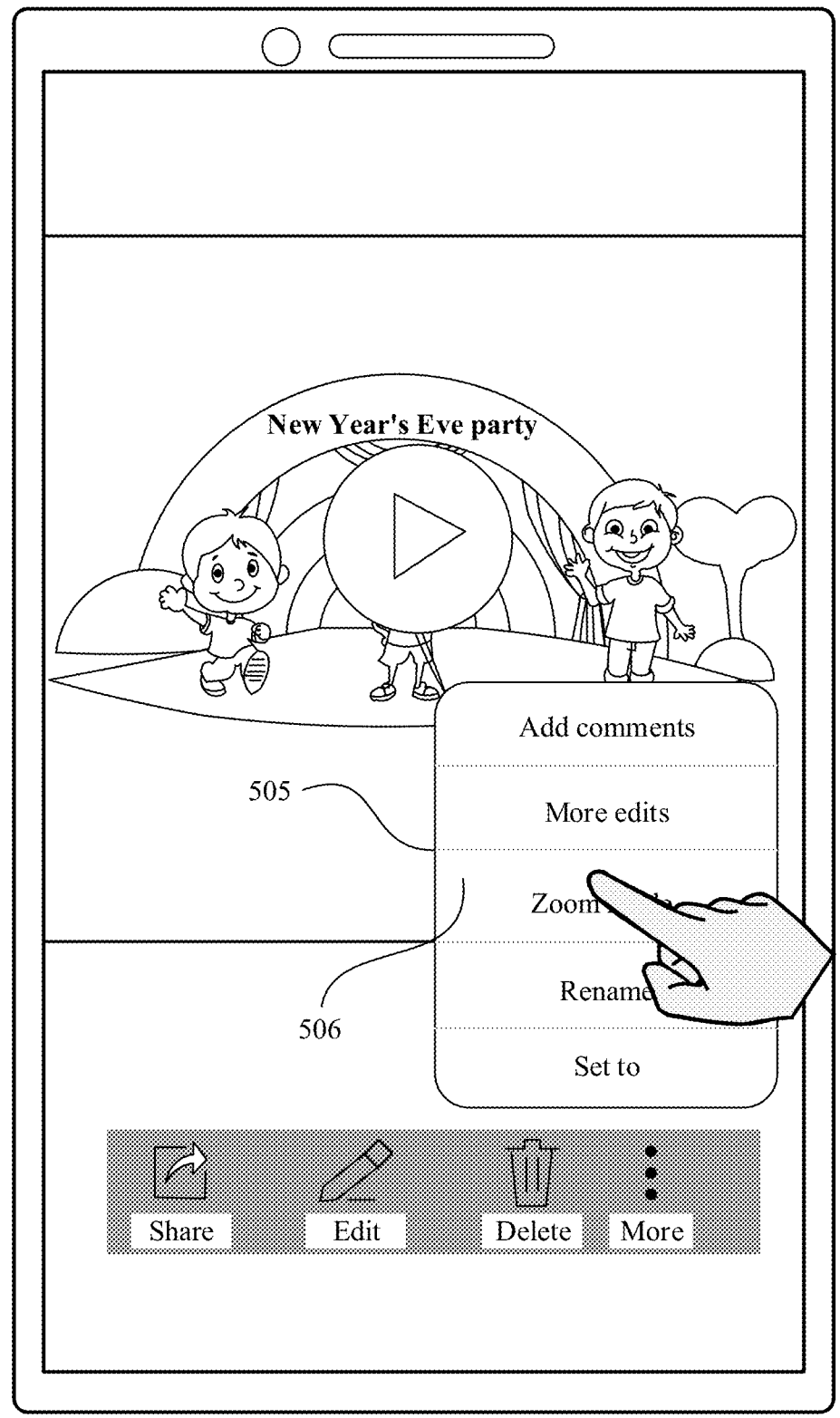

As shown in FIG. 9C, the user interface 52 is an interface for editing a video work, and includes an editing function block 505. The editing function block 505 includes a zoom mode control 506. The zoom mode control 506 is configured to perform zooming on an audio in the video based on a focal length of the image in the video after receiving an audio zoom instruction. After the electronic device 100 detects an input operation (for example, tapping) with respect to the zoom mode control 506, the electronic device 100 displays a user interface 53 shown in FIG. 9D in response to the operation.

Figure 9D:
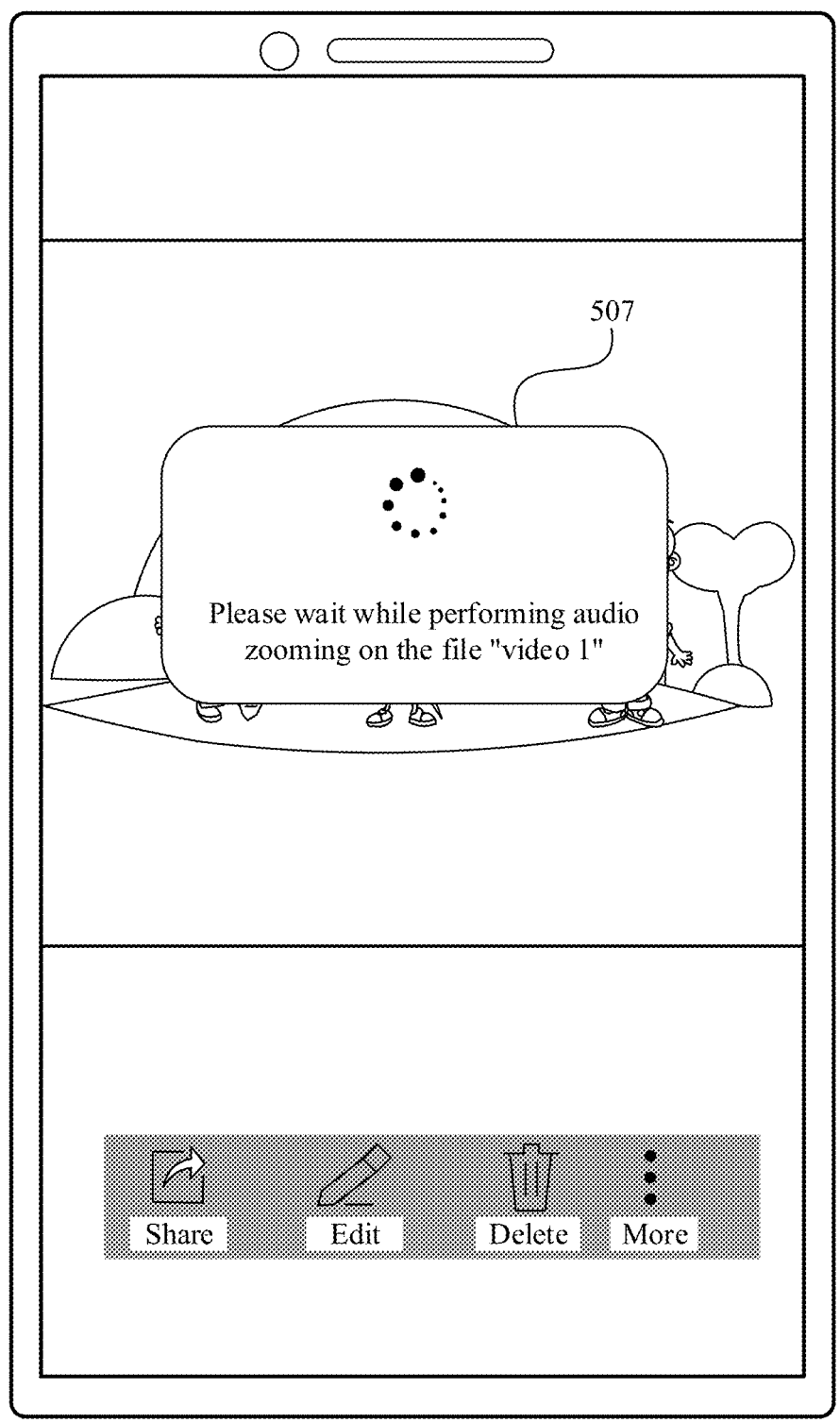

As shown in FIG. 9D, the user interface 53 is an interface for editing a video work, and includes an audio zoom processing information box 507. The audio zoom processing information box 507 includes audio zoom information, and the audio zoom information is used to prompt a user that the electronic device 100 is currently performing audio zooming on the video work. For example, the audio zoom information may be text information, and content of the text information may be "please wait while performing audio zooming on the video". This embodiment of this application provides only an example of the content of the text information for description. The content of the text information is not limited in this embodiment of this application. After the electronic device 100 completes the audio zooming of the recorded video work, the electronic device 100 displays a user interface 54 shown in FIG. 9E.

Figure 9E:
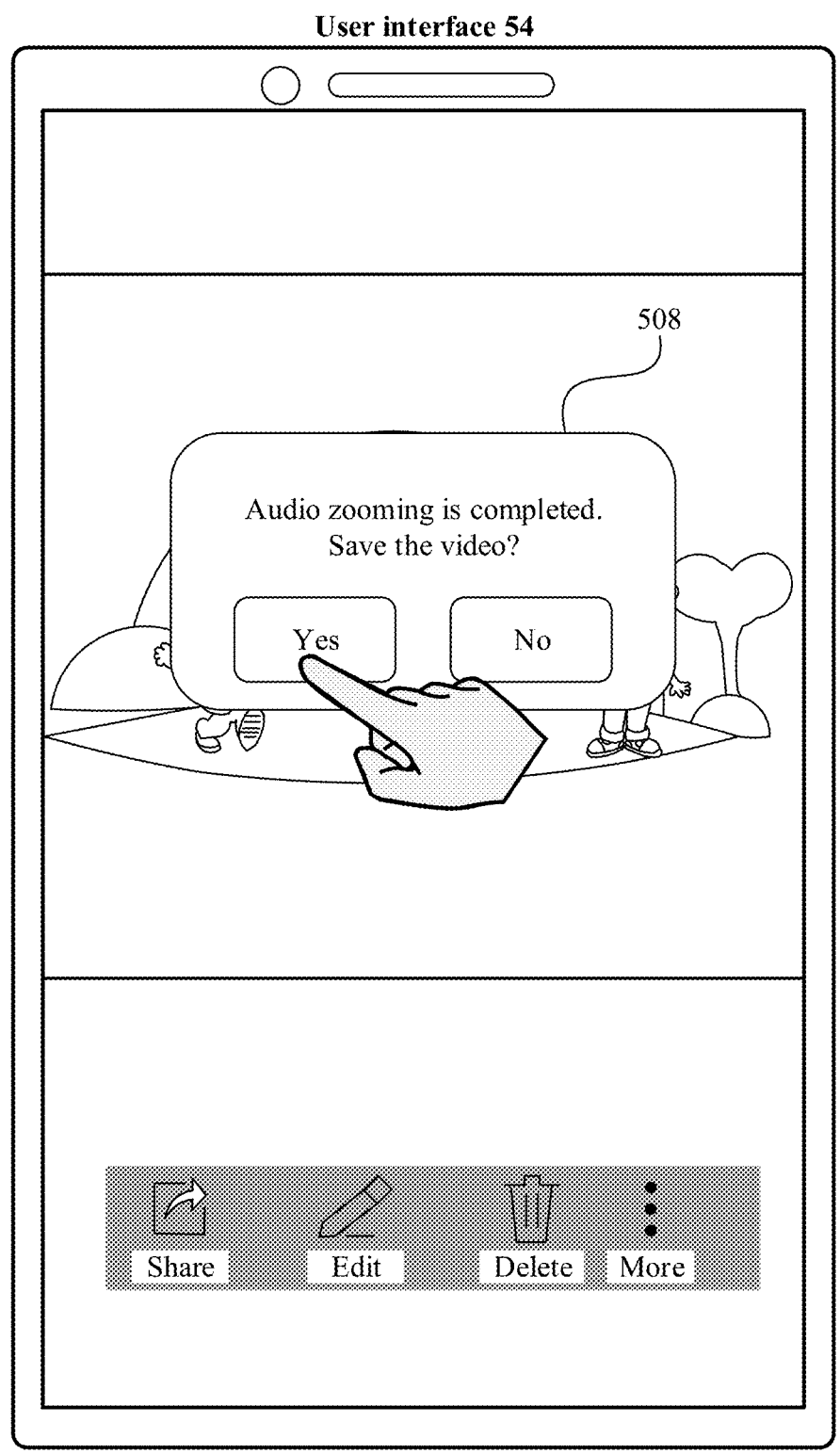

As shown in FIG. 9E, the user interface 54 is an interface for editing a video work, and includes an audio zoom completion prompt box 508. The audio zoom completion prompt box 508 includes text prompt information, and the text prompt information is used to prompt the user that the audio zooming is completed.

For example, content of the text prompt information may be "audio zooming of the video work has been completed". This embodiment of this application provides only an example of the content of the text prompt for description, and imposes no limitation. After the electronic device 100 completes the operation of performing audio zooming on the video work, a new video work is generated. The electronic device 100 may use the new video work to substitute the original video work on which no audio zooming is performed, thereby deleting the original video work. Alternatively, the electronic device 100 may store both the newly generated video work and the original video work on which no audio zooming is performed. This is not limited in this embodiment of this application.

The audio zooming method described in this embodiment of this application is applicable to an electronic device having N microphones, where N is an integer greater than or equal to 2. The following describes in detail the procedure of the video processing method used in the foregoing three scenarios by using an example in which the electronic device has three microphones.

For a group of user interfaces of the electronic device that are related to using the audio zooming method according to embodiments of this application in scenario 1, refer to the foregoing descriptions of the interfaces in FIG. 1A(a) to FIG. 1D. According to the audio zooming method used in scenario 1, in the process in which the electronic device records a video, the camera collects frames of images to form an image stream, the microphone collects audio signals to form an audio stream, and the electronic device processes the frames of images in real time in the process in which the camera collects the frames of images and the microphone collects the audio signals. In addition, the electronic device performs zooming on the audio signals based on a change in a focal length of the frames of images. Then, the electronic device mixes the processed image stream and the processed audio stream to generate a video.

Figure 10A:
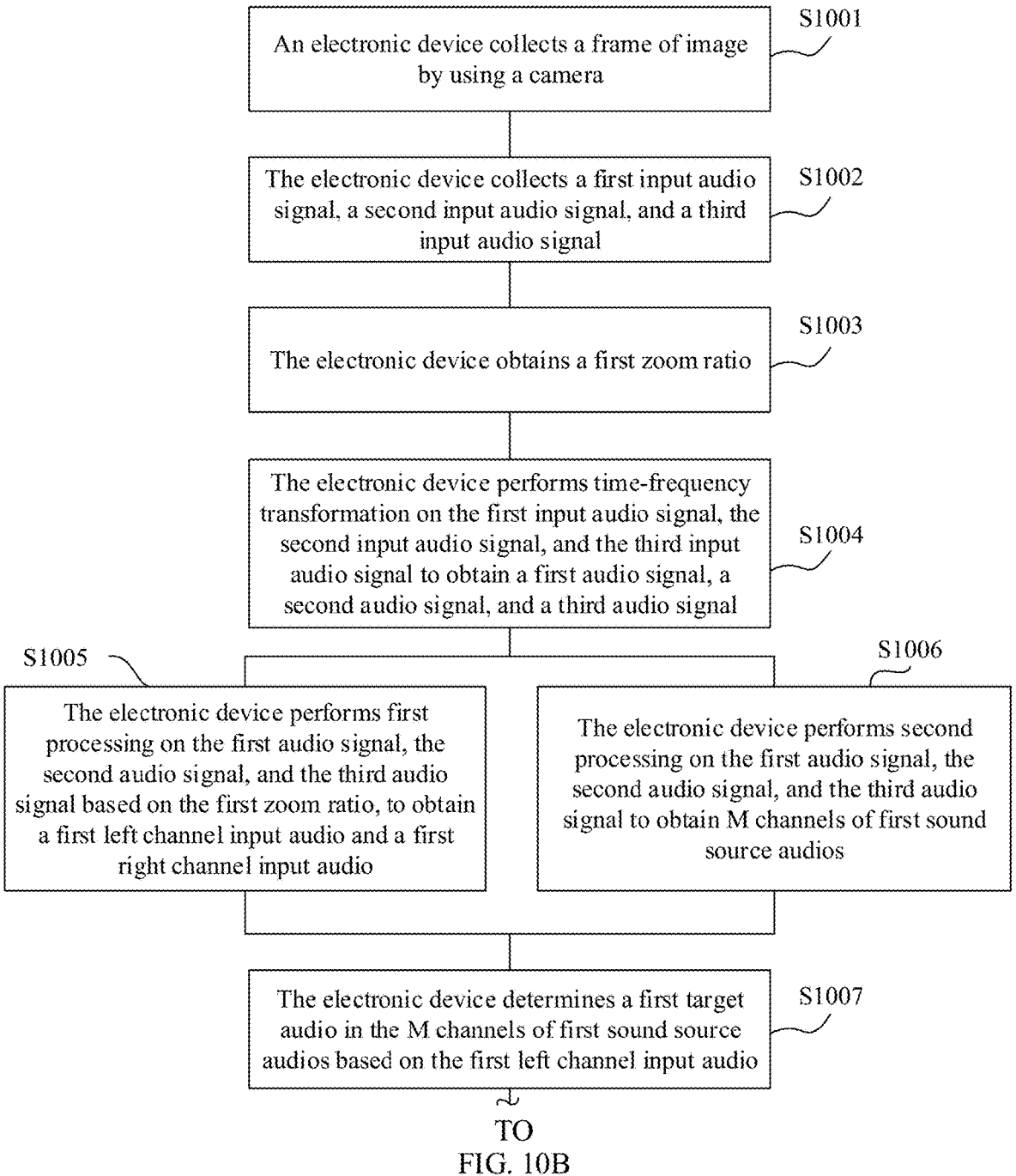
FIG. 10A and FIG. 10B are a flowchart of performing audio zooming by an electronic device in a video recording process according to an embodiment of this application.
Figure 10B:
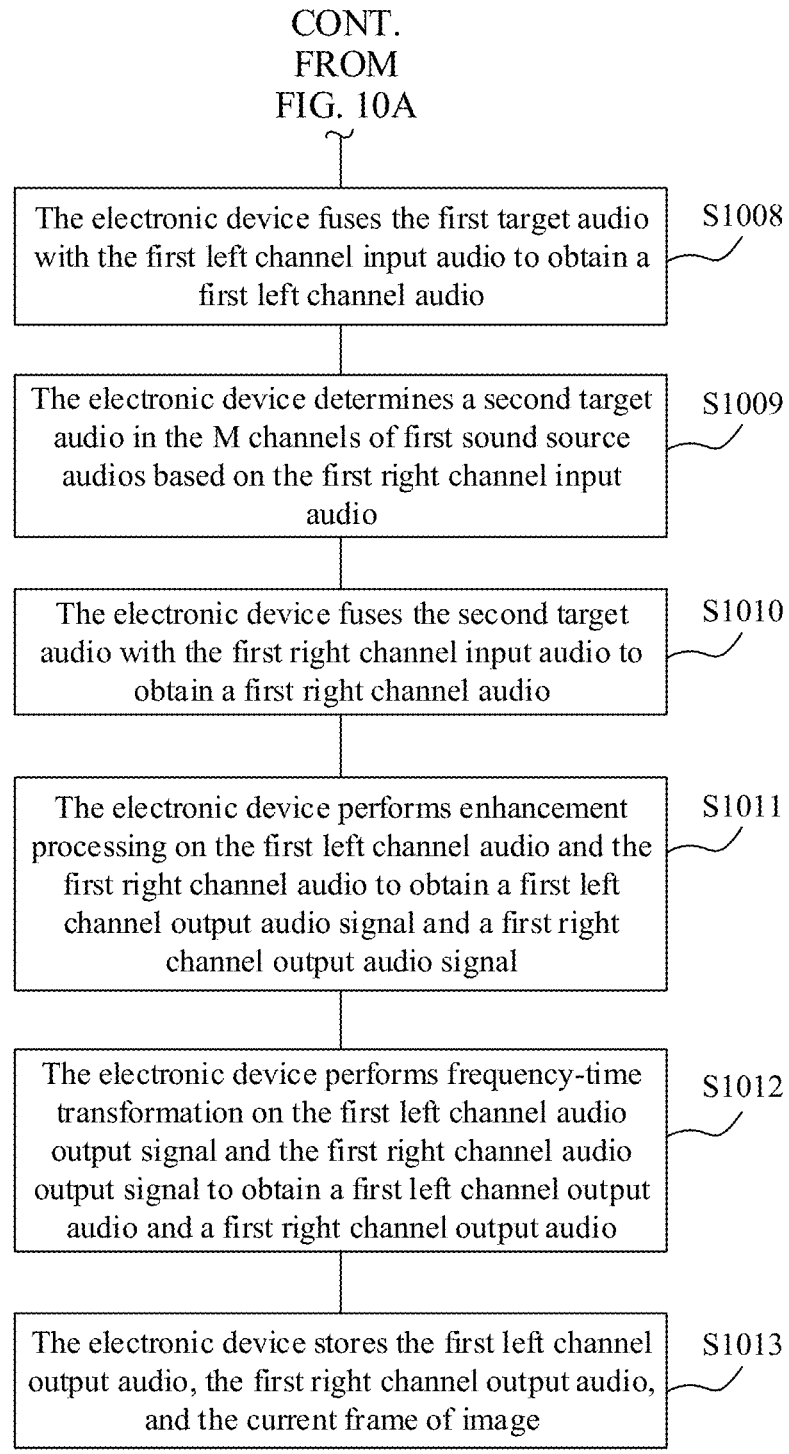

The following describes the procedure of the audio zooming method used in scenario 1. FIG. 10A and FIG. 10B are a flowchart of performing real-time zooming on an audio based on a zoom ratio of a video image in a process of recording a video by an electronic device according to an embodiment of this application. A specific processing procedure of the electronic device is as follows:

Step S1001: The electronic device collects a frame of image by using a camera.

Step S1002: The electronic device collects a first input audio signal, a second input audio signal, and a third input audio signal.

Specifically, for a group of example interfaces in which the electronic device collects the first input audio signal, the second input audio signal, and the third input audio signal, refer to related descriptions in FIG. 1B to FIG. 1D. Details are not described herein again in this embodiment of this application.

The first input audio signal is a current frame of audio signal obtained by converting a sound signal collected by a first microphone of the electronic device in a first time period.

The second input audio signal is a current frame of audio signal obtained by converting a sound signal collected by a second microphone of the electronic device in the first time period.

The third input audio signal is a current frame of audio signal obtained by converting a sound signal collected by a third microphone of the electronic device in the first time period.

For example, the electronic device collects the first input audio signal.

Specifically, during the first time period, the first microphone of the electronic device may collect a sound signal and then convert the sound signal into an analog electrical signal. Then, the electronic device samples the analog electrical signal and converts a sampled analog electrical signal into an audio signal in time domain. The audio signal in time domain is a digital audio signal, which includes W sampling points of analog electrical signals. The electronic device may use an array to represent the first input audio signal. Any element in the array is used to represent a sampling point, and any element includes two values. One value represents a time and the other value represents an amplitude of an audio signal corresponding to the time. The amplitude is used to represent a magnitude of a voltage corresponding to the audio signal.

It may be understood that, for a process in which the electronic device collects the second input audio signal and the third input audio signal, reference may be made to the description of the first input audio signal, and details are not described herein again.

Step S1003: The electronic device obtains a first zoom ratio.

Specifically, the first zoom ratio is a zoom ratio used when the electronic device collects a current frame of image. When the electronic device starts to record a video, the default zoom ratio used is the 1× zoom ratio, and the electronic device can change, based on a user setting, the zoom ratio used when collecting the current frame of image. For example, when the electronic device detects an operation of the user for adjusting the zoom ratio, in response to the operation, the electronic device changes the zoom ratio of the current frame of image, thereby implementing zooming of a video image. For a group of example interfaces in which the electronic device changes the zoom ratio, refer to the foregoing description of the interfaces in FIG. 1B to FIG. 1D. Details are not described again in this embodiment of this application. For a description of the zoom ratio, refer to the foregoing description of the term (1).

Step S1004: The electronic device performs time-frequency transformation on the first input audio signal, the second input audio signal, and the third input audio signal to obtain the first audio signal, the second audio signal, and the third audio signal.

Specifically, the electronic device may perform time-frequency transformation on the first input audio signal, the second input audio signal, and the third input audio signal through discrete Fourier transform (Discrete Fourier Transform, DFT) or fast Fourier transform (Fast Fourier Transform, FFT), to obtain the first audio signal, the second audio signal, and the third audio signal, respectively. The first audio signal is a signal of the first input audio signal in frequency domain, the second audio signal is a signal of the second input audio signal in frequency domain, and the third audio signal is a signal of the third input audio signal in frequency domain.

In some embodiments, the electronic device may divide the input audio signal into audio signals corresponding to L frequency channel numbers through 2L-point FFT. L is an integer power of 2, a value of L is determined by a computing capability of the electronic device, and a higher computing processing capability of the electronic device indicates a larger value of L. For example, the first input audio signal may be divided into a first audio signal corresponding to 1024 frequency channel numbers through 2048-point DFT, and then an array may be used to represent the first audio signal. The array includes 1024 elements. Each element is used to represent one frequency channel number, and includes two values. One value represents a frequency (Hz) of an audio signal corresponding to the frequency channel number and the other value represents an amplitude of the audio signal corresponding to the frequency channel number. The amplitude is measured in decibels (decibel, dB), and represents a magnitude of the decibels of the audio signal corresponding to the time. It should be understood that, in addition to an array, the electronic device may express the first audio signal in another manner, for example, by using a matrix. This is not limited in this embodiment of this application.

Step S1005: The electronic device performs first processing on the first audio signal, the second audio signal, and the third audio signal based on the first zoom ratio, to obtain a first left channel input audio and a first right channel input audio.

Specifically, the first processing is performing beamforming on the first audio signal, the second audio signal, and the third audio signal. A purpose of performing beamforming on the first audio signal, the second audio signal, and the third audio signal by the electronic device is to suppress a sound signal strength of a non-target photographed object in the first audio signal, the second audio signal, and the third audio signal, and enhance a sound strength of a target photographed object, so that a sound of the target photographed object is enhanced and a sound of the non-target photographed object is suppressed in the generated first left channel input audio and first right channel input audio. The target photographed object is a sound-emitting object within an angle of view of a camera of the electronic device during video recording, and the non-target photographed object is a sound-emitting object outside the angle of view of the camera of the electronic device.

Figure 11:
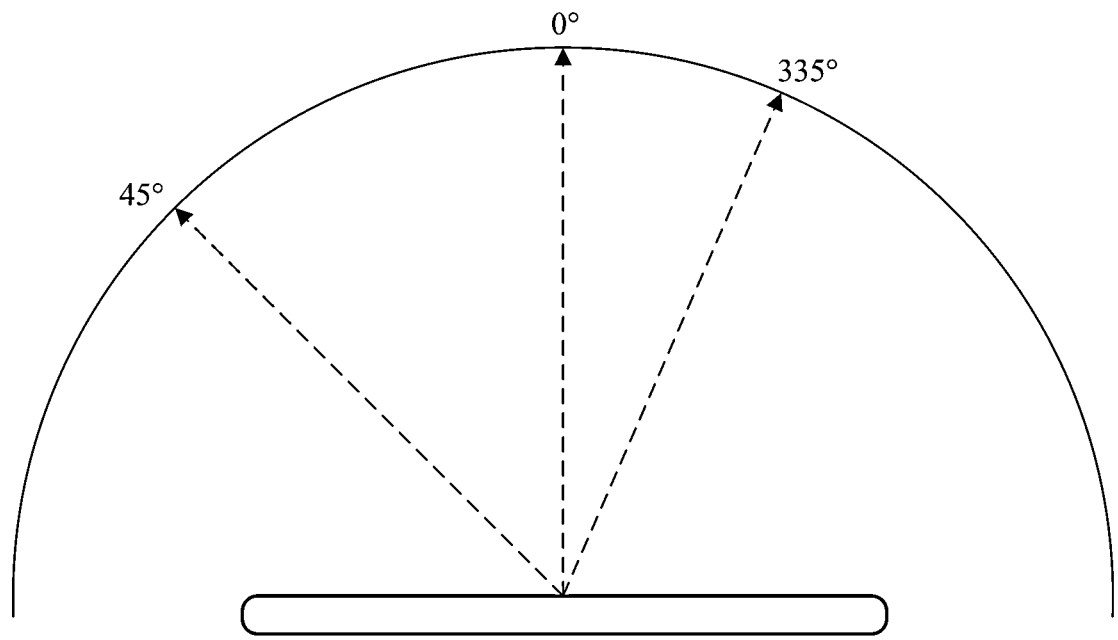
FIG. 11 is a top view when an electronic device records a video according to an embodiment of this application.

The following describes an example of the first direction, the second direction, and the third direction with reference to FIG. 11. FIG. 11 is a top view of recording a video by an electronic device. As shown in FIG. 11, a direction that a rear-facing camera of the electronic device faces is a front direction. The first direction may be any direction within a range of 10° counterclockwise from the front (0°) to 90° counterclockwise from the front. The second direction may be any direction within a range of 10° counterclockwise from the front to 10° clockwise from the front. The third direction may be any direction within a range of 10° clockwise from the front to 90° clockwise from the front. Description is provided by using an example in which the first direction is 45° counterclockwise from the front direction, the second direction is the front direction, and the third direction is 25° clockwise from the front direction (marked as 335° in FIG. 11). It can be learned from FIG. 11 that, the front direction is a direction corresponding to 0°, the first direction is a direction corresponding to 45°, and the third direction is a direction corresponding to 335°.

A specific process in which the electronic device performs beamforming on the first audio signal, the second audio signal, and the third audio signal is as follows:

1. The electronic device generates a first beam based on the first audio signal, the second audio signal, and the third audio signal.

The first beam is a beam corresponding to the first direction, and the first beam is an audio signal obtained after the electronic device combines the first audio signal, the second audio signal, and the third audio signal. During signal combination, the electronic device retains or enhances audio components in the first audio signal, the second audio signal, and the third audio signal in the first direction and a direction near the first direction, and suppresses audio components in other directions. Because the microphone collects an audio signal of a photographing environment in an omnidirectional direction (directions from 0° to 360°), the first audio signal, the second audio signal, and the third audio signal may include audio signals in all directions (directions from 0° to 360°). As shown in FIG. 11, if the first direction is a direction corresponding to 45°, a direction near the first direction may be a direction corresponding to a range of 20° to 45°. During signal combination, the electronic device may retain or enhance audio signals in the first audio signal, the second audio signal, and the third audio signal in the direction corresponding to the range of 20° to 45°, and suppress audio signals in other directions.

The electronic device may obtain the first beam according to a formula (1). The formula (1) is shown as follows:

$$y_1(\omega) = \sum_{i=1}^{M} w_{1i}(\omega) x_i(\omega) \quad (1)$$

$y_1(\omega)$ represents the first beam, which includes L elements. Each element is used to represent one frequency channel number. A quantity of frequency channel numbers corresponding to the first beam is the same as a quantity of frequency channel numbers corresponding to the first audio signal, the second audio signal, and the third audio signal. N represents a quantity of microphones. $w_{1i}(\omega)$ represents a first filter coefficient corresponding to the $i^{th}$ microphone in the first direction. The $j^{th}$ element in $w_{1i}(\omega)$ represents a degree to which an audio signal corresponding to the $j^{th}$ frequency channel number in the audio signal is suppressed. $x_i(\omega)$ represents an audio signal collected by the $i^{th}$ microphone. The $j^{th}$ element in $x_i(\omega)$ represents a complex field of the $j^{th}$ frequency channel number, and represents an amplitude and phase information of a sound signal corresponding to the frequency channel number. M represents a quantity of microphones of the electronic device.

2. The electronic device generates a second beam based on the first audio signal, the second audio signal, and the third audio signal.

The second beam is a beam corresponding to the second direction, and the second beam is an audio signal obtained after the electronic device combines the first audio signal, the second audio signal, and the third audio signal. During signal combination, the electronic device retains or enhances audio components in the first audio signal, the second audio signal, and the third audio signal in the second direction and a direction near the second direction, and suppresses audio components in other directions. The electronic device may obtain the second beam according to a formula (2). The formula (2) is shown as follows:

$$y_2(\omega) = \Sigma_{i=1}^{M} w_{2i}(\omega) x_i(\omega) \tag{2}$$

$y_2(\omega)$ represents the second beam, which includes L elements. Each element is used to represent one frequency channel number. A quantity of frequency channel numbers corresponding to the second beam is the same as a quantity of frequency channel numbers corresponding to the first audio signal, the second audio signal, and the third audio signal. $w_{2i}(\omega)$ represents a second filter coefficient corresponding to the $i^{th}$ microphone in the second direction. The $j^{th}$ element in $w_{2i}(\omega)$ represents a degree to which an audio signal corresponding to the $j^{th}$ frequency channel number in the audio signal is suppressed. $x_i(\omega)$ represents an audio signal corresponding to the $i^{th}$ microphone. The $j^{th}$ element in $x_i(\omega)$ represents a complex field of the $j^{th}$ frequency channel number, and represents an amplitude and phase information of a sound signal corresponding to the frequency channel number. M represents a quantity of microphones of the electronic device.

3. The electronic device generates a third beam based on the first audio signal, the second audio signal, and the third audio signal.

The third beam is a beam corresponding to the third direction, and the third beam is an audio signal obtained after the electronic device combines the first audio signal, the second audio signal, and the third audio signal. During signal combination, the electronic device retains or enhances audio components in the first audio signal, the second audio signal, and the third audio signal in the second direction and a direction near the second direction, and suppresses audio components in other directions. The electronic device may obtain the third beam according to a formula (3). The formula (3) is shown as follows:

$$y_3(\omega) = \Sigma_{i=1}^{M} w_{3i}(\omega) x_i(\omega) \tag{3}$$

$y_3(\omega)$ represents the third beam, which includes L elements. Each element is used to represent one frequency channel number. A quantity of frequency channel numbers corresponding to the third beam is the same as a quantity of frequency channel numbers corresponding to the first audio signal, the second audio signal, and the third audio signal. $w_{3i}(\omega)$ represents a third filter coefficient corresponding to the $i^{th}$ microphone in the third direction. The $j^{th}$ element in $w_{3i}(\omega)$ represents a degree to which an audio signal corresponding to the $j^{th}$ frequency channel number in the audio signal is suppressed. $x_i(\omega)$ represents an audio signal corresponding to the $i^{th}$ microphone. The $j^{th}$ element in $x_i(\omega)$ represents a complex field of the $j^{th}$ frequency channel number, and represents an amplitude and phase information of a sound signal corresponding to the frequency channel number. M represents a quantity of microphones of the electronic device.

4. The electronic device fuses the first beam, the second beam, and the third beam based on focal length information to obtain a first left channel audio signal and a first right channel audio signal.

The electronic device may obtain the first left channel audio signal according to a formula (4). The formula (4) is shown as follows:

$$y_{l1}(\omega) = \alpha_1 * y_1(\omega) + (1 - \alpha_1) * y_2(\omega) \tag{4}$$

$y_{l1}(\omega)$ represents a first left channel input audio, $\alpha_1$ represents a fusion coefficient, a value of $\alpha_1$ is related to a zoom ratio of a current frame of image, and each zoom ratio uniquely corresponds to one first fusion coefficient. The electronic device may determine the first fusion coefficient based on focal length information of the current frame of image, and a value range of the first fusion coefficient is [0, 1]. A higher zoom ratio indicates a smaller first fusion coefficient. For example, when a focal length is the 1× focal length, the first fusion coefficient may be 1. When the focal length is the maximum focal length, the first fusion coefficient may be 0.

The electronic device may obtain the first right channel audio signal according to a formula (5). The formula (5) is shown as follows:

$$y_{r1}(\omega) = \alpha_1 * y_3(\omega) + (1 - \alpha_1) * y_2(\omega) \tag{5}$$

$y_{r1}(\omega)$ represents a first right channel input audio.

It should be understood that the fusion coefficient $\alpha_1$ is used to determine whether the left channel audio signal is more deviated to the left or more deviated to the front, and whether the right channel audio signal is more deviated to the right or more deviated to the front. The value of the first fusion coefficient is directly related to the zoom ratio. A principle is that a higher zoom ratio indicates a smaller angle of view, and in this case, the left channel audio signal and the right channel audio signal should be more concentrated at the front, that is, in the second direction. It can be learned according to the formula (4) and the formula (5) that, $\alpha_1$ should be smaller in this case. It should be understood that a lower zoom ratio indicates a larger angle of view and a larger $\alpha_1$. In this case, the left channel audio signal can retain more audio signals that are deviated to the left relative to the front (to be specific, in the first direction), and the right channel audio signal can retain more audio signals that are deviated to the right relative to the front (to be specific, in the third direction).

It may be understood that different zoom ratios correspond to different fusion coefficients α, so different beamforming diagrams are obtained during fusion. For example, the beamforming diagram of a left channel audio at the 1× zoom ratio shown in FIG. 5B, the beamforming diagram of a left channel audio at the 3× zoom ratio shown in FIG. 6B, and the beamforming diagram of a left channel audio at the 5× zoom ratio shown in FIG. 7B have different shapes. The beamforming diagram of a right channel audio at the 1× zoom ratio shown in FIG. 5B, the beamforming diagram of a right channel audio at the 3× zoom ratio shown in FIG. 6B, and the beamforming diagram of a right channel audio at the 5× zoom ratio shown in FIG. 7B have different shapes. The beamforming diagram of a mono audio at the 1× zoom ratio shown in FIG. 5C, the beamforming diagram of a mono audio at the 3× zoom ratio shown in FIG. 6C, and the beamforming diagram of a mono audio at the 5× zoom ratio shown in FIG. 7C have different shapes.

In some embodiments, the electronic device may alternatively pre-train beams in a plurality of directions, and performs beamforming on the first audio signal, the second audio signal, and the third audio signal by using the beams in the plurality of directions. Description is provided by using an example in which the electronic device uses the first beam, the second beam, the third beam, the fourth beam, and the fifth beam. The first beam $y_{11}(\omega)$ is a beam corresponding to the first direction, the second beam $y_{l2}(\omega)$ is a beam corresponding to the second direction, the third beam $y_{13}(\omega)$ is a beam corresponding to the third direction, the fourth beam $y_{14}(\omega)$ is a beam corresponding to the fourth direction, and the fifth beam $y_{15}(\omega)$ is a beam corresponding to the fifth direction. Description is provided by using an example in which the first direction is 45° counterclockwise from the front, the second direction is 75° counterclockwise from the front, the third direction is the front, the fourth direction is 45° clockwise from the front, and the fifth direction is 75° clockwise from the front.

The first left channel input audio may be obtained according to the formula $y_{l1}(\omega)=\alpha_1*y_{11}(\omega)+\alpha_2*y_{l2}(\omega)+\alpha_3*y_{13}(\omega)$, where $\alpha_1$, $\alpha_2$, and $\alpha_3$ are fusion coefficients, and $\alpha_1+\alpha_2+\alpha_3=1$.

The first right channel input audio may be obtained according to the formula $y_{r1}(\omega)=\alpha_1*y_{14}(\omega)+\alpha_2*y_1s(\omega)+\alpha_3*y_{13}(\omega)$, where $\alpha_1$, $\alpha_2$, and $\alpha_3$ are fusion coefficients, and $\alpha_1+\alpha_2+\alpha_3=1$.

Step S1006: The electronic device performs second processing on the first audio signal, the second audio signal, and the third audio signal to obtain M channels of first sound source audios.

Specifically, M represents a quantity of microphones, and the second processing may be blind source separation of the first audio signal, the second audio signal, and the third audio signal. The electronic device may obtain the M channels of first sound source audios by using a blind source separation (Blind Signal Separation, BSS) method. The audio signal collected by the microphone includes audio signals of a plurality of target objects, and the first audio signal, the second audio signal, and the third audio signal may be divided into a plurality of channels of sound source audios through BBS.

For example, the electronic device may separate sound sources by using a non-negative matrix decomposition method. Specifically, the electronic device obtains M channels of first sound source audios according to a formula (6). The formula (6) is shown as follows:

$$Y(\omega) = \Sigma_{i=1}^{M} W_i(\omega)x_i(\omega) \quad (6)$$

$x_i(\omega)$ represents an audio signal of the $i^{th}$ microphone in frequency domain, $W_i(\omega)$ represents a non-negative matrix corresponding to the $i^{th}$ microphone, $Y(\omega)$ represents a matrix whose size is M*L, and each row vector of $Y(\omega)$ is one channel of sound source audio. Therefore, the M channels of sound source audios $Y_1(\omega)$ to $Y_M(\omega)$ may be obtained by using $Y(\omega)$.

It should be understood that the electronic device may perform step S1005 first and then perform step S1006. Alternatively, the electronic device may perform step S1006 first and then perform step S1005. Alternatively, the electronic device may perform step S1005 and step S1006 at the same time. This is not limited in this embodiment of this application.

Step S1007: The electronic device determines a first target audio in the M channels of first sound source audios based on the first left channel input audio.

Specifically, the electronic device performs a correlation operation on $y_{l1}(\omega)$ and each of $Y_1(\omega)$ to $Y_M(\omega)$, to obtain M correlation values, and then the electronic device selects a sound source audio having a maximum correlation value as the first target audio. The electronic device may calculate a correlation value according to a formula (7). The formula (7) is shown as follows:

$$\gamma_i = \frac{\emptyset_{li}}{\sqrt{\emptyset_{ll}\emptyset_{ii}}} \quad (7)$$

i=1 ... M, $\gamma_i$ represents a correlation value between the first left channel input audio and $Y_i(\omega)$, $\emptyset_{li}=E\{y_l(\omega)Y_i(\omega)*\}$, $\emptyset_{ii}=E\{Y_i(\omega)Y_i(\omega)*\}$, and $\emptyset_{ii}=E\{Y_i(\omega)Y_i(\omega)*\}$.

Then, the electronic device determines a sound source audio having a maximum correlation value among $\gamma_1$ to $\gamma_M$ as the first target audio $Y_{t1}(\omega)$. The sound source audio having a maximum correlation value is the sound source audio having highest correlation with the first left channel input audio.

In some embodiments, the electronic device may set a first threshold, and when $\gamma_1$ is greater than the first threshold, determine $Y_i(\omega)$ as a target sound source audio. When there are a plurality of target sound source audios, the electronic device may fuse the plurality of target sound source audios in an equiproportional manner, to obtain a fused sound source audio. The fused sound source audio is a first target audio $Y_{t1}(\omega)$, and the first target audio is a sound source audio having highest correlation with the first left channel input audio.

For example, if $\gamma_1$ and $\gamma_2$ are greater than the first threshold, the electronic device may fuse $Y_1(\omega)$ and $Y_2(\omega)$ at a proportion of 1:1 to obtain $Y_{t1}(\omega)$:

$$Y_{t1}(\omega) = \frac{Y_1(\omega) + Y_2(\omega)}{2}$$

Step S1008: The electronic device fuses the first target audio with the first left channel input audio to obtain the first left channel audio.

Specifically, the electronic device may fuse $Y_{t1}(\omega)$ with the first left channel audio signal according to a formula (8) to obtain a second left channel audio signal. The formula (8) is shown as follows:

$$y'_{l1}(\omega) = \beta_1 * y_{l1}(\omega) + (1 - \beta_1) * Y_{t1}(\omega) \quad (8)$$

$y_{l1}'(\omega)$ represents a first left channel audio, $\beta_1$ represents a fusion coefficient, a value of $\beta_1$ is related to a zoom ratio of a current frame of image, and each zoom ratio uniquely corresponds to one $\beta_1$. The electronic device may determine $\beta_1$ based on the zoom ratio of the current frame of image, and a value range of $\beta_1$ is [0, 1]. A higher zoom ratio indicates a smaller $\beta_1$. For example, when the zoom ratio of the current frame of image is the 1× zoom ratio, β1 may be 1. When the zoom ratio of the current frame of image is the maximum zoom ratio, $\beta_1$ may be 0.

Step S1009: The electronic device determines a second target audio in the M channels of first sound source audios based on the first right channel input audio.

Specifically, for a method in which the electronic device determines the second target audio $Y_{r2}(\omega)$ in the M channels of first sound source audios, refer to step S1007. Details are not described herein again.

Step S1010: The electronic device fuses the second target audio with the first right channel input audio to obtain the first right channel audio.

Specifically, for a method in which the electronic device fuses the second target sound source signal with the first right channel audio signal to obtain the second right channel audio signal $y_r'(\omega)$, refer to step S1007. Details are not described herein again.

It should be understood that the electronic device may first process the first left channel input audio to obtain the first left channel audio, and then process the first right channel input audio to obtain the first right channel audio; in other words, the electronic device first performs step S1007 and step S1008, and then performs step S1009 and step S1010.

Alternatively, the electronic device may first process the first right channel input audio to obtain the first right channel audio, and then process the first left channel input audio to obtain the first left channel audio; in other words, the electronic device first performs step S1009 and step S1010, and then performs step S1007 and step S1008. Alternatively, the electronic device may simultaneously process the first left channel input audio and the first right channel input audio, to simultaneously obtain the first left channel audio and the first right channel audio; in other words, the electronic device simultaneously performs step S1007 and step S1009, and then simultaneously performs step S1008 and step S1010. This is not limited in this embodiment of this application.

Step S1011: The electronic device performs enhancement processing on the first left channel audio and the first right channel audio to obtain a first left channel output audio signal and a first right channel output audio signal.

Specifically, the electronic device may process the first left channel audio and the first right channel audio by using a dynamic range control (Dynamic Range Control, DRC) algorithm. A specific method is as follows: The electronic device processes the first left channel audio and the first right channel audio according to a preset DRC adjustment curve to obtain the first left channel output audio signal and the first right channel output audio signal.

Figure 12:
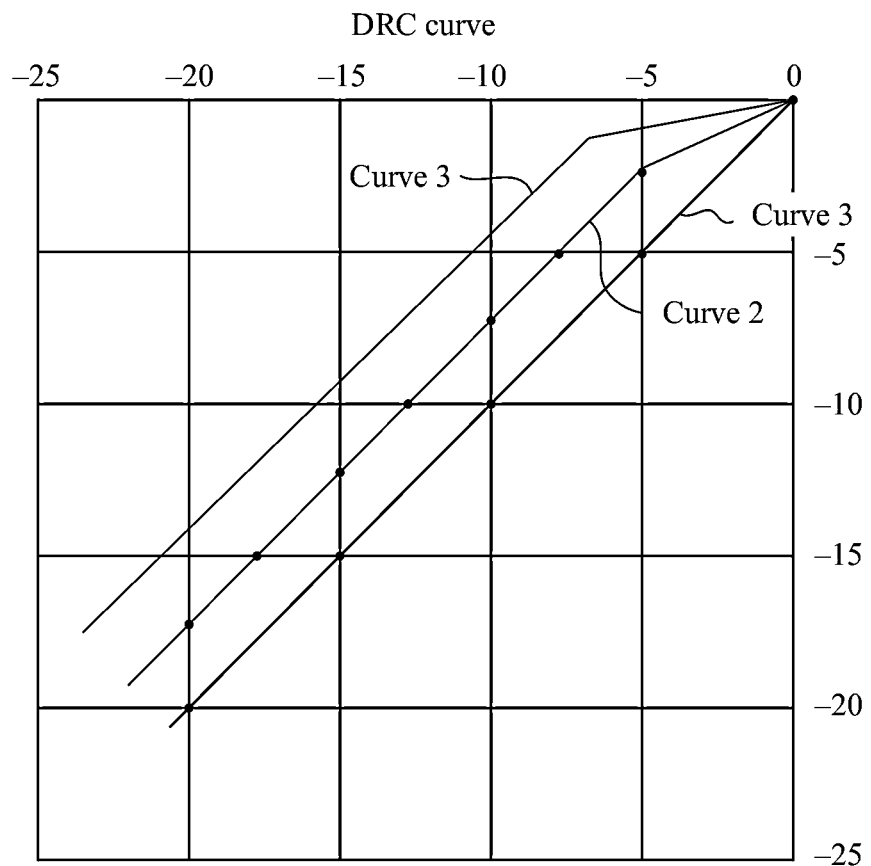
FIG. 12 is a DRC curve diagram according to an embodiment of this application.

For example, as shown in FIG. 12, a plurality of DRC curves are included (only three DCR curves are listed in FIG. 12), and each DRC curve uniquely corresponds to one zoom ratio. A curve 1 is a DRC curve corresponding to the 1× zoom ratio, a curve 1 is a DRC curve corresponding to the 3× zoom ratio, and a curve 3 is a DRC curve corresponding to the 5× zoom ratio. The horizontal axis represents an input signal, that is, a first left channel audio or a first right channel audio. The vertical axis represents an output audio signal, that is, a first left channel output audio signal or a first right channel output audio signal. A higher zoom ratio indicates a larger energy rise of the first left channel audio or the first right channel audio by the electronic device through a DRC curve, that is, energy enhancement of an audio signal. If the zoom ratio of the current frame of image is the 1× zoom ratio or a zoom ratio less than 1×, the electronic device does not perform enhancement processing on the first left channel audio or the first right channel audio.

Description is provided by using an example in which the electronic device processes the first left channel audio based on the DRC curve to obtain the first left channel output audio signal. If the zoom ratio of the current frame of image is the 1× zoom ratio, the electronic device processes the first left channel audio based on the curve 1. If energy intensity of the first left channel audio is −15 dB, energy intensity of the first left channel output audio signal is −15 dB according to a correspondence of the curve 1. If the zoom ratio of the current frame of image is the 3× zoom ratio, the electronic device processes the first left channel audio based on the curve 2. If energy intensity of the first left channel audio is −15 dB, energy intensity of the first left channel output audio signal is −12 dB according to a correspondence of the curve 2. Compared with the first left channel audio, energy of the first left channel output audio signal is enhanced by 3 dB. If the zoom ratio of the current frame of image is the 5× zoom ratio, the electronic device processes the first left channel audio based on the curve 3. If energy intensity of the first left channel audio is −15 dB, energy intensity of the first left channel output audio signal is −8 dB according to a correspondence of the curve 3. Compared with the first left channel audio, energy of the first left channel output audio signal is enhanced by 7 dB.

In some embodiments, the electronic device may alternatively process the first left channel audio and the first right channel audio by using an automatic gain control (Automatic Gain Control, AGC) method, to obtain a first left channel output audio signal and a first right channel audio output signal.

Step S1012: The electronic device performs frequency-time transformation on the first left channel audio output signal and the first right channel audio output signal to obtain the first left channel output audio and the first right channel output audio.

Specifically, the frequency-time transformation is an inverse transform of the time-frequency transformation in step S1003. For example, when the time-frequency transformation in step S1003 is discrete Fourier transform (Discrete Fourier Transform, DFT), the frequency-time transformation is inverse discrete Fourier transform (Inverse Discrete Fourier Transform, IDFT). When the time-frequency transformation is fast Fourier transform (Fast Fourier Transform, FFT), the frequency-time transformation is inverse fast Fourier transform (Inverse Fast Fourier Transform, IFFT).

Step S1013: The electronic device stores the first left channel output audio, the first right channel output audio, and the current frame of image.

In some embodiments, when the audio output by the electronic device is a mono audio, the electronic device fuses the first left channel output audio and the first right channel output audio to obtain and save a first mono output audio.

In this embodiment of this application, during video recording, after detecting an operation of a user for adjusting a zoom ratio of a video image, the electronic device adjusts a focal length of an image in a video in real time. At the same time, the electronic device performs real-time zooming on the audio based on a change in the focal length of the image in the video. To be specific, when the zoom ratio increases and the angle of view decreases, the electronic device suppresses a sound of a photographed object outside a photographing range and enhances a sound of a photographed object within the photographing range, thereby giving the user better audiovisual experience.

In the foregoing embodiment of FIG. 10A and FIG. 10B, the electronic device performs beamforming on the audio signal by using the trained filter coefficient. To ensure that the first left channel output audio and the first right channel output audio can present a stereo sound, the audio signals retained in the first left channel input audio and the first right channel input audio need to be different from the suppressed audio signals. In other words, in the first left channel input audio, the audio signal collected in the direction deviated to the left of the front of the electronic device is retained, and the audio signal collected in the direction deviated to the right of the front of the electronic device is suppressed. In the first right channel input audio, the audio signal collected in the direction deviated to the right of the front of the electronic device is retained, and the audio signal collected in the direction deviated to the left of the front of the electronic device is suppressed. This embodiment of this application is described by using the first direction, the second direction, and the third direction in FIG. 11 as an example. In this embodiment of this application, deviation to the left is deviation to the first direction, the front is the second direction, and deviation to the right is deviation to the third direction.

The first direction is deviated to the left relative to the front of the electronic device, the third direction is deviated to the right relative to the front of the electronic device, and the second direction is in front of the electronic device.

The first filter coefficient corresponding to the first direction and the second filter coefficient corresponding to the second direction are used to generate the first left channel input audio. The first filter coefficient and the second filter coefficient may be used to retain the audio signal collected in the direction deviated to the left of the front of the electronic device, and suppress the audio signal collected in the direction deviated to the right of the front of the electronic device. The first filter coefficient corresponding to the second direction and the third filter coefficient corresponding to the third direction are used to generate the first right channel input audio. The second filter coefficient and the third filter coefficient may be used to retain the audio signal collected in the direction deviated to the right of the front of the electronic device, and suppress the audio signal collected in the direction deviated to the left of the front of the electronic device.

The first filter coefficient corresponding to the first direction, the second filter coefficient corresponding to the second direction, and the third filter coefficient corresponding to the third direction are preconfigured in the electronic device before the electronic device leaves the factory.

Detailed description is provided by using an example in which the electronic device generates the first filter corresponding to the first direction. For this process, refer to the following descriptions of step S1301 to step S1303 in FIG. 13.

The first filter is described in detail as follows:

The first filter coefficient corresponding to the first direction includes a first filter coefficient corresponding to the first microphone in the first direction, a first filter coefficient corresponding to the second microphone in the first direction, and a first filter coefficient corresponding to the third microphone in the first direction. The first filter coefficient corresponding to the first microphone in the first direction may be used to retain the audio signal that is collected in the direction deviated to the left of the front of the electronic device and that is in the first input audio signal, and suppress the audio signals collected in front of the electronic device and in the direction deviated to the right of the front of the electronic device. The first filter coefficient corresponding to the second microphone in the first direction may be used to retain the audio signal that is collected in the direction deviated to the left of the front of the electronic device and that is in the second input audio signal, and suppress the audio signals collected in front of the electronic device and in the direction deviated to the right of the front of the electronic device. The third filter coefficient corresponding to the first microphone in the third direction may be used to retain the audio signal that is collected in the direction deviated to the left of the front of the electronic device and that is in the third audio input signal, and suppress the audio signals collected in front of the electronic device and in the direction deviated to the right of the front of the electronic device. For details about this process, refer to the following description of step S1302.

If the first audio input signal includes L frequency channel numbers, the first filter coefficient corresponding to the first microphone in the first direction should also have L elements (coefficients), where the $j^{th}$ element represents a degree to which the $j^{th}$ frequency channel number of the L frequency channel numbers corresponding to the first audio signal is suppressed.

Specifically, when the $j^{th}$ element is equal to 1 or close to 1, the electronic device does not suppress the audio signal corresponding to the $j^{th}$ frequency channel number (when the $j^{th}$ element is close to 1, a degree of suppression is quite low and there is almost no suppression. In this case, the audio signal is considered to be retained), that is, the audio signal is retained. In this case, it is considered that the direction of the audio signal corresponding to the $j^{th}$ frequency channel number is deviated to the left. In other cases, the audio signal corresponding to the $j^{th}$ frequency channel number is suppressed. For example, when the $j^{th}$ element is equal to 0 or close to 0, the electronic device suppresses the audio signal corresponding to the $j^{th}$ frequency channel number to a greater extent, that is, the audio signal is suppressed. In this case, it is considered that the direction of the audio signal corresponding to the $j^{th}$ frequency channel number is more deviated to the right.

Figure 13:
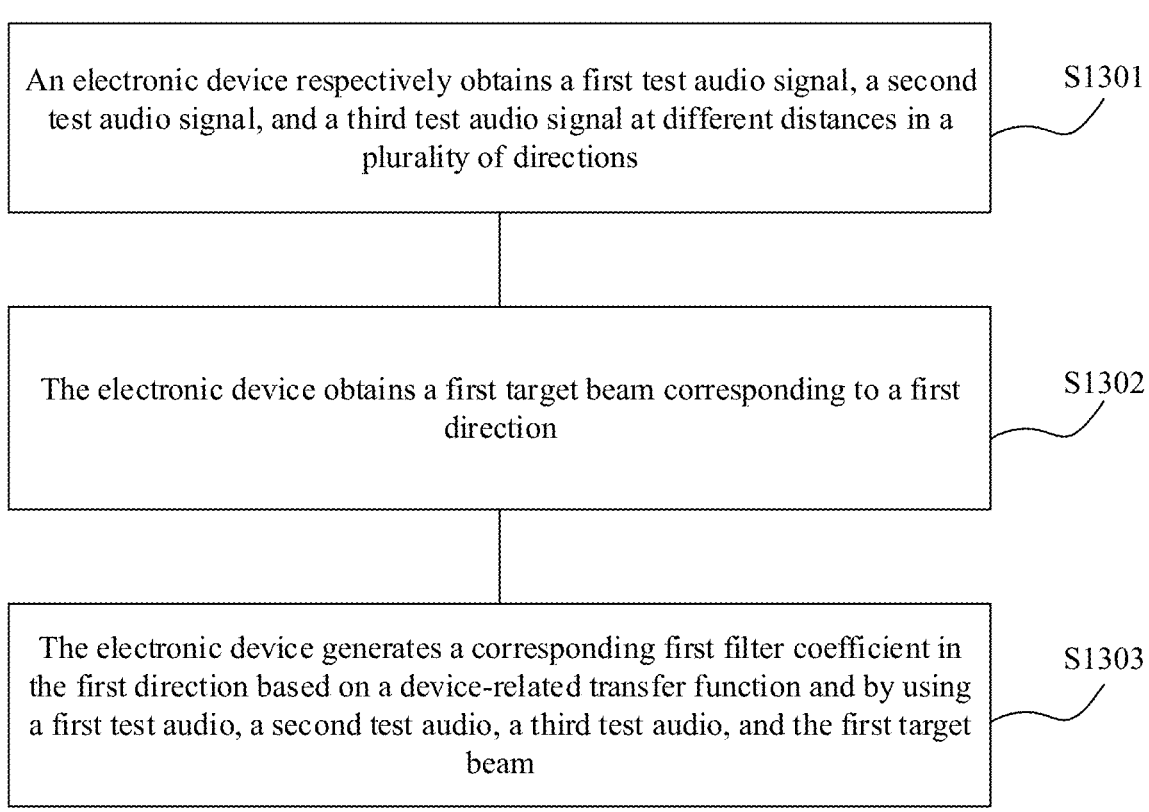
FIG. 13 is a flowchart of training a first filter coefficient by an electronic device according to an embodiment of this application.

In this embodiment of this application, a process in which the electronic device trains a filter coefficient is described in detail by using an example in which the electronic device has three microphones and trains a first filter coefficient corresponding to a first direction. FIG. 13 is a flowchart of training a first filter coefficient by an electronic device according to an embodiment of this application. A specific procedure is as follows:

Step S1301: The electronic device respectively obtains a first test audio signal, a second test audio signal, and a third test audio signal at different distances in a plurality of directions.

Specifically, the direction is a horizontal angle between a sound-emitting object and the electronic device, the distance is a Euclidean distance between the sound-emitting object and the electronic device, and the sound-emitting object is a single sound-emitting object. A purpose of respectively obtaining test audio signals at different distances in a plurality of directions by the electronic device is to make the generated first filter coefficient universal. To be specific, when the electronic device records a video, if the directions of the first input audio signal, the second input audio signal, and the third input audio signal collected by the microphone are the same as or similar to one of the plurality of directions, the electronic device may still use the first filter coefficient to perform beamforming on the first input audio signal, the second input audio signal, and the third input audio signal.

In some embodiments, the plurality of directions may include 36 directions. To be specific, one direction is given at an interval of 10° around the electronic device. The plurality of distances may include three distances: 1 m, 2 m, and 3 m.

The first test audio signal is a set of input audio signals at different distances respectively collected by the first microphone of the electronic device in a plurality of directions.

The second test audio signal is a set of input audio signals at different distances respectively collected by the second microphone of the electronic device in a plurality of directions.

The third test audio signal is a set of input audio signals at different distances respectively collected by the third microphone of the electronic device in a plurality of directions.

Step S1302: The electronic device obtains a first target beam corresponding to the first direction.

Specifically, the first target beam is used by the electronic device to generate a first filter coefficient corresponding to the first direction, and describes a degree of filtering of the electronic device in a plurality of directions.

In some embodiments, when the plurality of directions are 36 directions, there are 36 gain coefficients in the first target beam. The $i^{th}$ gain coefficient represents a degree of suppression in the $i^{th}$ direction, and each direction corresponds to one gain coefficient. The gain coefficient corresponding to the first direction is 1, and for a direction that deviates from the first direction by 10° each time, the gain coefficient is reduced by $1/36$ once. Therefore, an element corresponding to a direction closer to the first direction is closer to 1, and an element corresponding to a direction farther from the first direction is closer to 0.

Step S1303: The electronic device generates the corresponding first filter coefficient in the first direction based on a device-related transfer function and by using the first test audio, the second test audio, the third test audio, and the first target beam.

A formula for generating the first filter coefficient corresponding to the first direction by the electronic device is the following formula (9):

$$w_{1i}(\omega) = \genfrac{}{}{0pt}{}{argmin}{w_1} \|G(H_1(\omega), H_2(\omega), H_3(\omega))w_1 - H_1\|_2^2 \qquad (9)$$

In the formula (9), $w_1(\omega)$ represents the first filter coefficient, which includes three elements, where the $i^{th}$ element may be expressed as $w_{1i}(\omega)$; $w_{1i}(\omega)$ represents a first filter coefficient corresponding to the $i^{th}$ microphone in the first direction; $H_1(\omega)$ represents a first test audio signal, $H_2(\omega)$ represents a second test audio signal, and $H_3(\omega)$ represents a third test audio signal; $G(H_1(\omega), H_2(\omega), H_3(\omega))$ represents processing of the first test audio signal, the second test audio signal, and the third test audio signal based on the device-related transfer function, and may be used to describe correlation between the first test audio signal, the second test audio signal, and the third test audio signal; $H_1$ represents the first target beam; $w_1$ represents a filter coefficient that can be obtained in the first direction; and argmin represents that $w_1$ obtained by using a least square frequency-invariant fixed beamforming method is used as the first filter coefficient corresponding to the first direction.

The second filter coefficient corresponding to the second direction includes a second filter coefficient corresponding to the first microphone in the second direction, a second filter coefficient corresponding to the second microphone in the second direction, and a second filter coefficient corresponding to the third microphone in the second direction. The second filter coefficient corresponding to the first microphone in the second direction may be used to retain the audio signal that is collected in front of the electronic device and that is in the first audio signal, and suppress the audio signals collected in the direction deviated to the left and the direction deviated to the right of the front of the electronic device. The second filter coefficient corresponding to the second microphone in the second direction may be used to retain the audio signal that is collected in front of the electronic device and that is in the second audio signal, and suppress the audio signals collected in the direction deviated to the left and the direction deviated to the right of the front of the electronic device. The third filter coefficient corresponding to the first microphone in the third direction may be used to retain the audio signal that is collected in front of the electronic device and that is in the third audio signal, and suppress the audio signals collected in the direction deviated to the left and the direction deviated to the right of the front of the electronic device.

For a detailed description of the second filter, refer to the foregoing detailed description of the first filter. Details are not described herein again.

A formula for generating the second filter coefficient corresponding to the second direction by the electronic device is the following formula (10):

$$w_2(\omega) = \genfrac{}{}{0pt}{}{argmin}{w_2} \|G(H_1(\omega), H_2(\omega), H_3(\omega))w_2 - H_2\|_2^2 \qquad (10)$$

For a description of the formula (10), refer to the foregoing description of the formula (9). Differences are as follows: $w_2(\omega)$ represents the second filter coefficient, which includes three elements, where the $i^{th}$ element may be expressed as $w_{2i}(\omega)$; $w_{2i}(\omega)$ represents a second filter coefficient corresponding to the $i^{th}$ microphone in the second direction; $H_2$ represents a second target beam corresponding to the second direction; $w_2$ represents a filter coefficient that can be obtained in the second direction; and argmin represents that $w_2$ obtained by using a least square frequency-invariant fixed beamforming method is used as the second filter coefficient corresponding to the second direction.

The second target beam is used by the electronic device to generate a second filter corresponding to the second direction, and describes a degree of filtering of the electronic device in a plurality of directions.

In some embodiments, when the plurality of directions are 36 directions, there are 36 gain coefficients in the second target beam. The $i^{th}$ gain coefficient represents a degree of filtering in the $i^{th}$ direction, and each direction corresponds to one gain coefficient. The gain coefficient corresponding to the second direction is 1, and for a direction that deviates from the second direction by 10° each time, the gain coefficient is reduced by $1/36$ once. Therefore, an element corresponding to a direction closer to the second direction is closer to 1, and an element corresponding to a direction farther from the second direction is closer to 0.

The third filter coefficient corresponding to the third direction includes a third filter coefficient corresponding to the first microphone in the third direction, a third filter coefficient corresponding to the second microphone in the third direction, and a third filter coefficient corresponding to the third microphone in the third direction. The third filter coefficient corresponding to the first microphone in the third direction may be used to retain the audio signal that is collected in the direction deviated to the right of the front of the electronic device and that is in the first audio signal, and suppress the audio signals collected in front of the electronic device and in the direction deviated to the left of the front of the electronic device. The third filter coefficient corresponding to the second microphone in the third direction may be used to retain the audio signal that is collected in the direction deviated to the right of the front of the electronic device and that is in the second audio signal, and suppress the audio signals collected in front of the electronic device and in the direction deviated to the left of the front of the electronic device. The third filter coefficient corresponding to the first microphone in the third direction may be used to retain the audio signal that is collected in the direction deviated to the right of the front of the electronic device and that is in the third audio signal, and suppress the audio signals collected in front of the electronic device and in the direction deviated to the left of the front of the electronic device.

For a detailed description of the third filter, refer to the foregoing detailed description of the first filter. Details are not described herein again.

A formula for generating the third filter coefficient corresponding to the third direction by the electronic device is the following formula (11):

$$w_{3i}(\omega) = {}^{argmin}_{w_3}\|G(H_1(\omega), H_2(\omega), H_3(\omega))w_3 - H_3\|_2^2 \quad (11)$$

For a description of the formula (11), refer to the foregoing description of the formula (9). Differences are as follows: $w_3(\omega)$ represents the third filter coefficient, which includes three elements, where the $i^{th}$ element may be expressed as $w_{3i}(\omega)$; $w_{3i}(\omega)$ represents a third filter coefficient corresponding to the $i^{th}$ microphone in the third direction; $H_3$ represents a third target beam corresponding to the third direction; $w_3$ represents a filter coefficient that can be obtained in the third direction; and argmin represents that $w_3$ obtained by using a least square frequency-invariant fixed beamforming method is used as the third filter coefficient corresponding to the third direction.

The third target beam is used by the electronic device to generate a third filter corresponding to the third direction, and describes a degree of filtering of the electronic device in a plurality of directions.

In some embodiments, when the plurality of directions are 36 directions, there are 36 gain coefficients in the third target beam. The $i^{th}$ gain coefficient represents a degree of filtering in the $i^{th}$ direction, and each direction corresponds to one gain coefficient. The gain coefficient corresponding to the third direction is 1, and for a direction that deviates from the third direction by 10° each time, the gain coefficient is reduced by 1/36 once. Therefore, an element corresponding to a direction closer to the third direction is closer to 1, and an element corresponding to a direction farther from the third direction is closer to 0.

For a group of example user interfaces for using the audio zooming method according to embodiments of this application in scenario 2, refer to the foregoing descriptions of the user interface 10 to the user interface 14 in FIG. 1A(a) to FIG. 1E. According to the audio zooming method used in scenario 2, starting from video recording, the electronic device performs real-time processing on the current frame of image collected by the camera, and at the same time, performs audio zooming on the set of audio signals input by the current frame based on the zoom ratio of the image. The electronic device plays the set of one frame of image and one frame of input audio signal each time the set of one frame of image and one frame of input audio signal is processed.

Figure 14A:
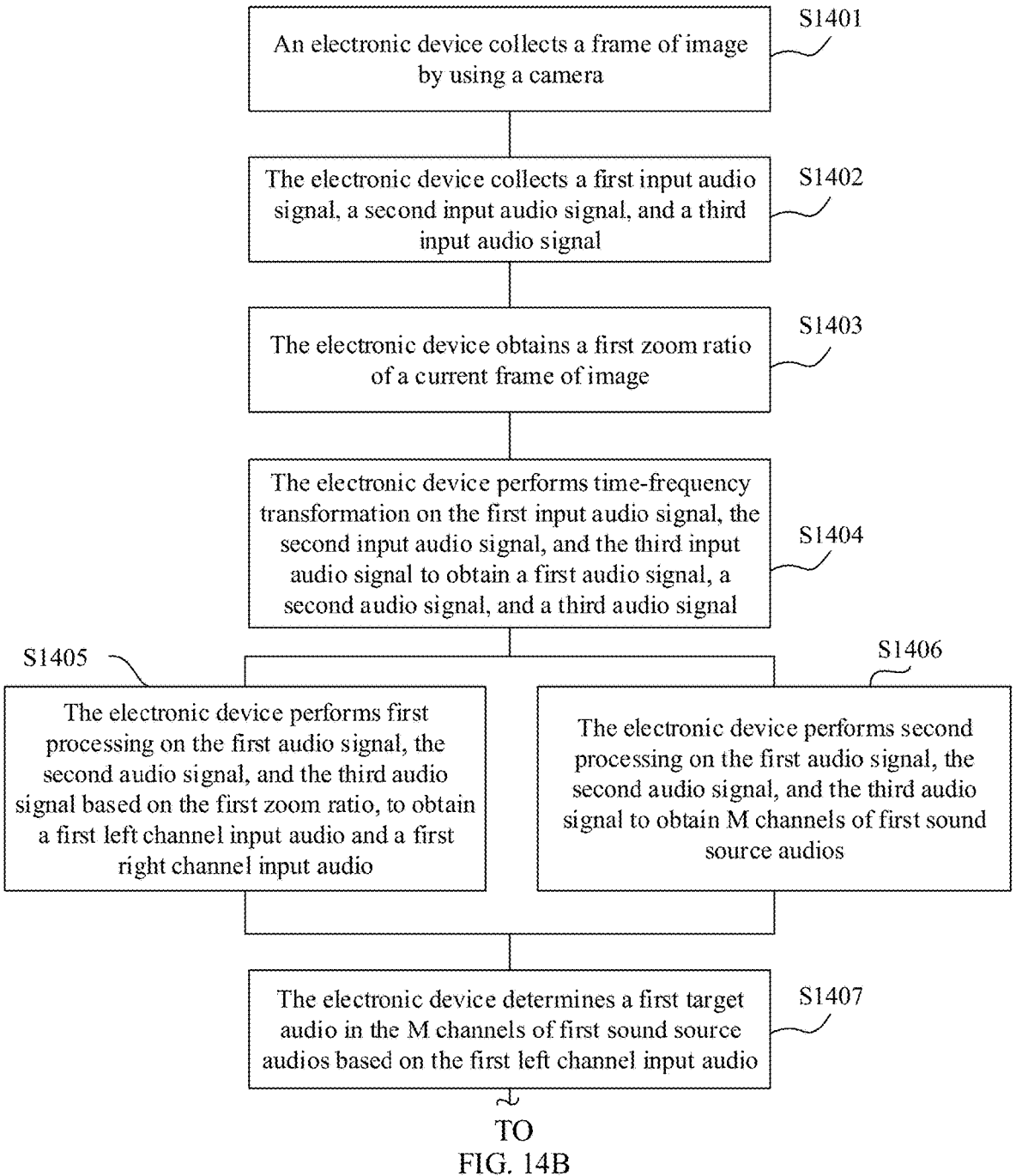
FIG. 14A and FIG. 14B are another flowchart of performing audio zooming by an electronic device in a video recording process according to an embodiment of this application.
Figure 14B:
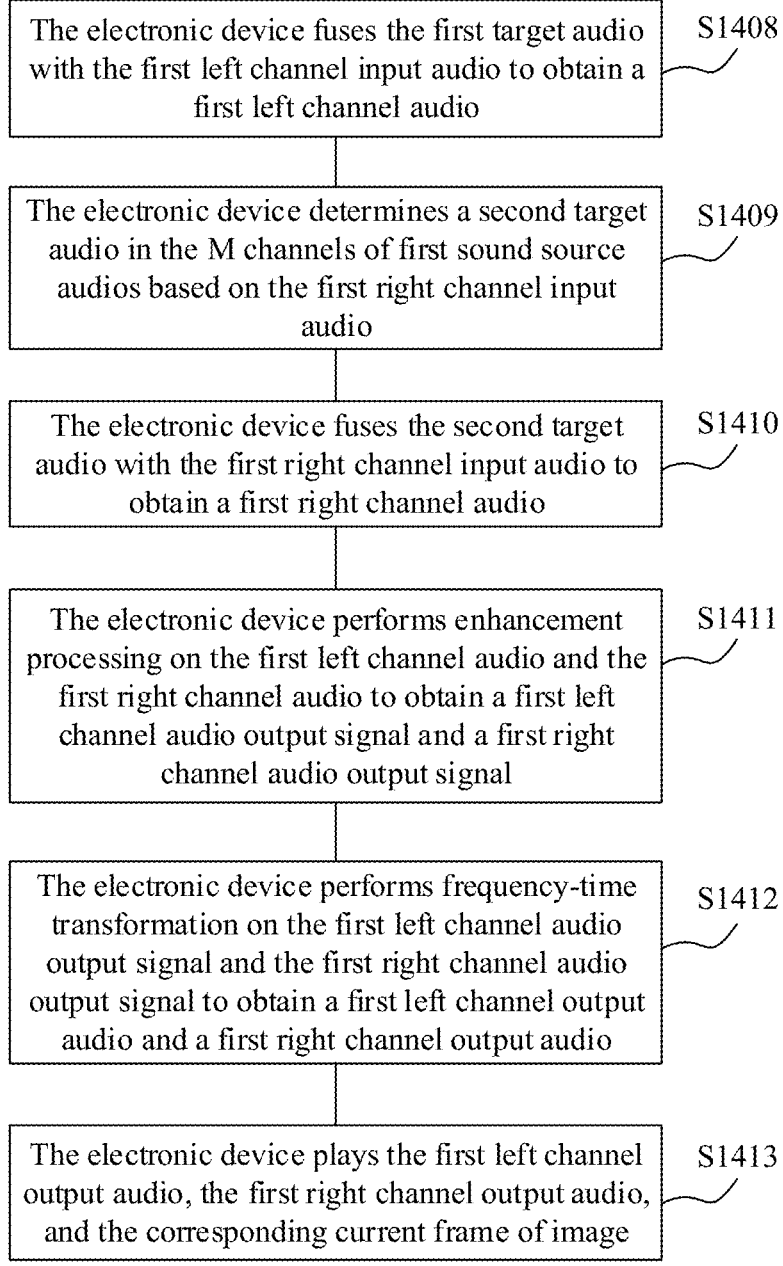

The following describes the procedure of the audio zooming method used in scenario 2. FIG. 14A and FIG. 14B are another flowchart of performing real-time zooming on an audio based on a zoom ratio of a video image in a process of recording a video by an electronic device according to an embodiment of this application. A specific processing procedure of the electronic device is as follows:

Step S1401: The electronic device collects a frame of image by using a camera.

Step S1402: The electronic device collects a first input audio signal, a second input audio signal, and a third input audio signal.

Step S1403: The electronic device obtains a first zoom ratio of a current frame of image.

Step S1404: The electronic device performs time-frequency transformation on the first input audio signal, the second input audio signal, and the third input audio signal to obtain the first audio signal, the second audio signal, and the third audio signal.

Step S1405: The electronic device performs first processing on the first audio signal, the second audio signal, and the third audio signal based on the first zoom ratio, to obtain a first left channel input audio and a first right channel input audio.

Step S1406: The electronic device performs second processing on the first audio signal, the second audio signal, and the third audio signal to obtain M channels of first sound source audios.

It should be understood that the electronic device may perform step S1405 first and then perform step S1406. Alternatively, the electronic device may perform step S1406 first and then perform step S1405. Alternatively, the electronic device may perform step S1405 and step S1406 at the same time. This is not limited in this embodiment of this application.

Step S1407: The electronic device determines a first target audio in the M channels of first sound source audios based on the first left channel input audio.

Step S1408: The electronic device fuses the first target audio with the first left channel input audio to obtain the first left channel audio.

Step S1409: The electronic device determines a second target audio in the M channels of first sound source audios based on the first right channel input audio.

Step S1410: The electronic device fuses the second target audio with the first right channel input audio to obtain the first right channel audio.

It should be understood that the electronic device may first process the first left channel input audio to obtain the first left channel audio, and then process the first right channel input audio to obtain the first right channel audio; in other words, the electronic device first performs step S1407 and step S1408, and then performs step S1409 and step S1410. Alternatively, the electronic device may first process the first right channel input audio to obtain the first right channel audio, and then process the first left channel input audio to obtain the first left channel audio; in other words, the electronic device first performs step S1409 and step S1410, and then performs step S1407 and step S1408. Alternatively, the electronic device may simultaneously process the first left channel input audio and the first right channel input audio, to simultaneously obtain the first left channel audio and the first right channel audio; in other words, the electronic device simultaneously performs step S1407 and step S1409, and then simultaneously performs step S1408 and step S1410. This is not limited in this embodiment of this application.

Step S1411: The electronic device performs enhancement processing on the first left channel audio and the first right channel audio to obtain a first left channel audio output signal and a first right channel audio output signal.

Step S1412: The electronic device performs frequency-time transformation on the first left channel audio output signal and the first right channel audio output signal to obtain the first left channel output audio and the first right channel output audio.

For step S1401 to step S1412, refer to step S1001 to step S1012 described above. Details are not described herein.

Step S1413: The electronic device plays the first left channel output audio, the first right channel output audio, and the corresponding current frame of image.

For a group of user interfaces of the electronic device that are related to using the audio zooming method according to embodiments of this application in scenario 3, refer to the foregoing descriptions of the interfaces in FIG. 9A to FIG. 9E. According to the audio zooming method used in scenario 3, after video recording is completed, the electronic device may subsequently perform audio zooming processing on the recorded video work to generate a new video work.

During recording of the video by the electronic device, the electronic device may save a zoom ratio of each frame of image in the video so that each frame of input audio signal in the video work corresponds to one zoom ratio. Each microphone of the electronic device collects N frames of input audio signals to obtain N zoom ratios. Meanwhile, the electronic device may separately save the N input audio signals collected by any microphone, to obtain an input audio stream. If the electronic device has M microphones, M input audio streams may be obtained.

The electronic device may obtain the M input audio streams, and sequentially obtain N frames of input audio signals in the M input audio streams starting from a first frame of input audio signal in each audio stream. For example, the electronic device first obtains a first frame of input audio signal in the M input audio streams, then obtains a second frame of input audio signal in the M input audio streams, and so on. The electronic device may perform audio zooming on each of M $i^{th}$ frames of input audio signals in the M input audio streams with reference to the method of step S1001 to step S1007. In this embodiment of this application, an example in which the electronic device has three microphones (M=3) is used for description.

Figure 15A:
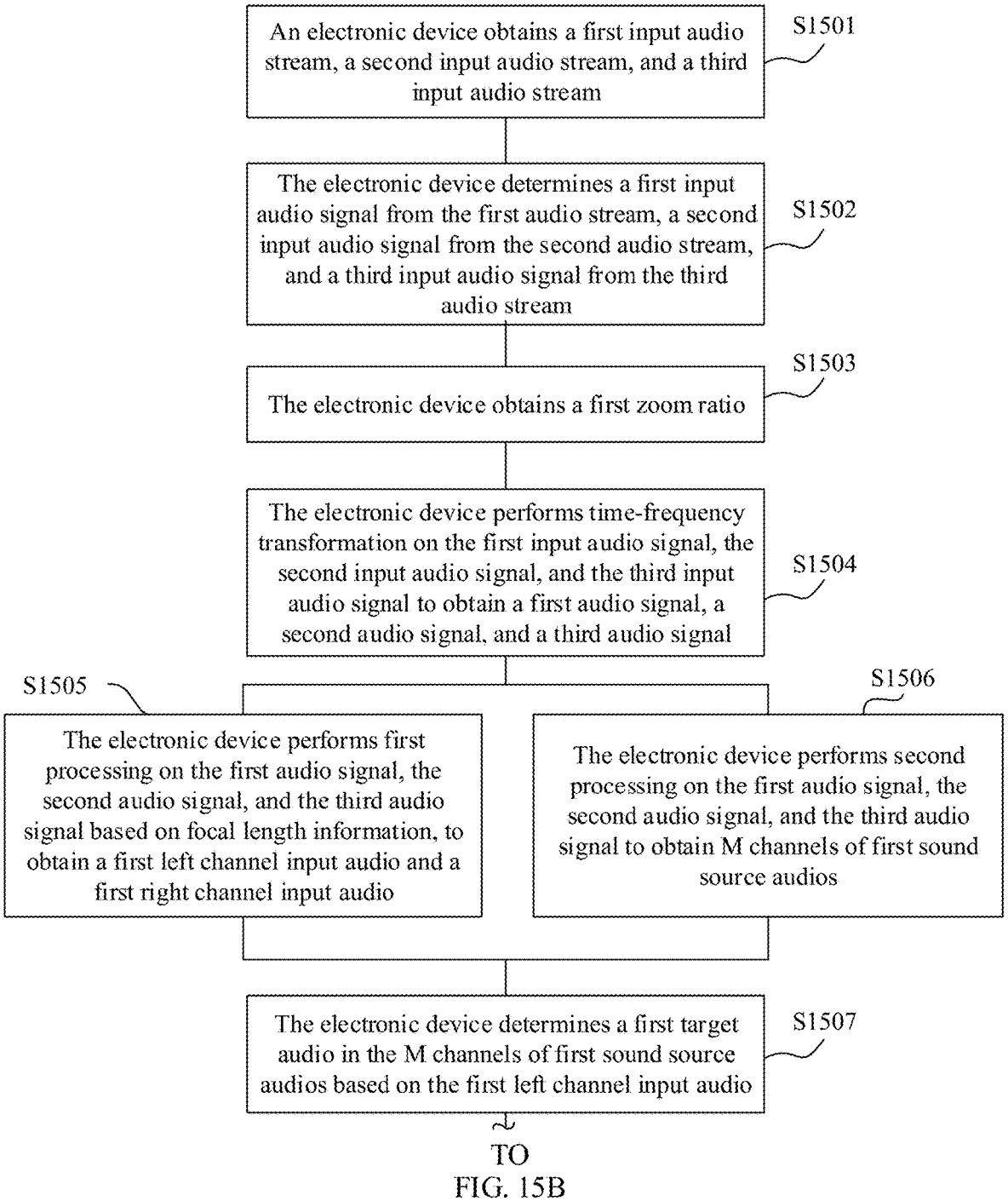
FIG. 15A and FIG. 15B are a flowchart of performing audio zooming on a recorded video by an electronic device according to an embodiment of this application.
Figure 15B:
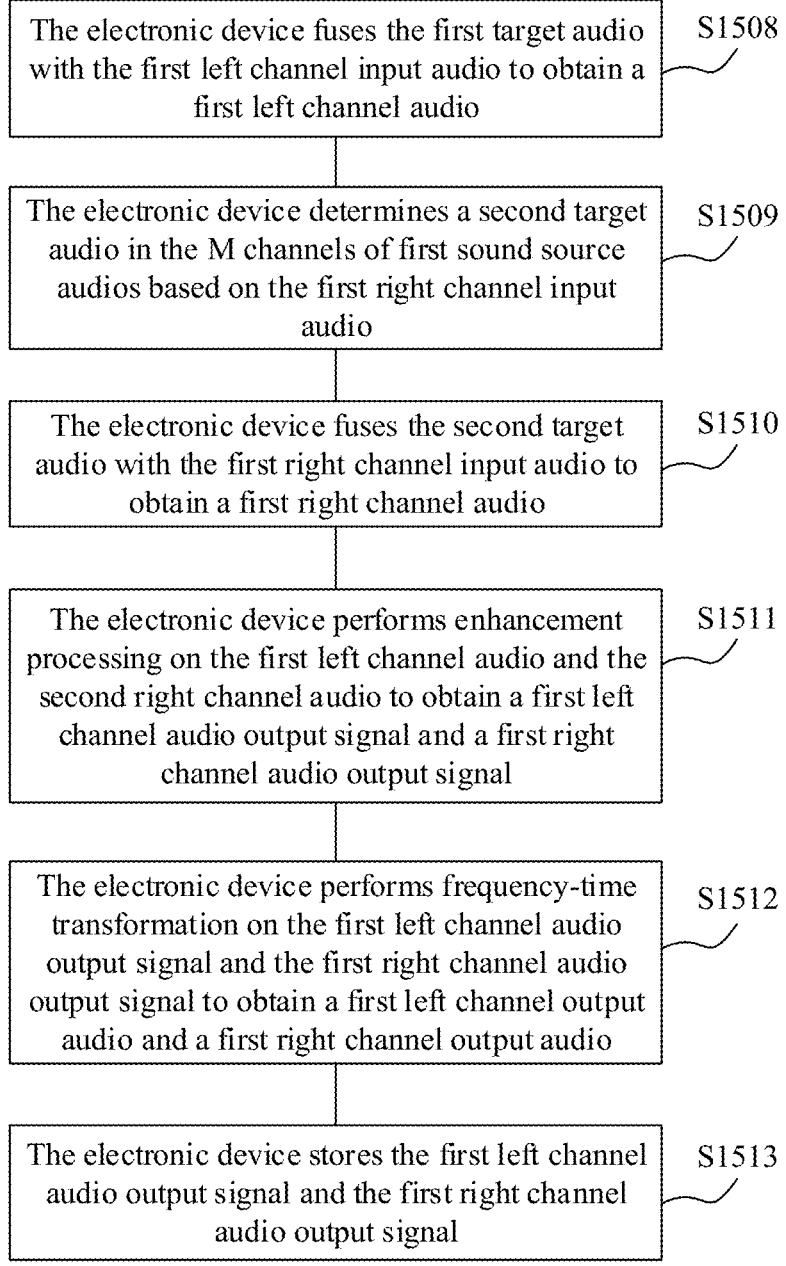

With reference to FIG. 15A and FIG. 15B, the following describes in detail a process of performing audio zooming processing on the $i^{th}$ frame of audio signal in the video work recorded in scenario 3. FIG. 15A and FIG. 15B are another flowchart of audio zooming according to an embodiment of this application. A specific procedure is as follows:

Step S1501: An electronic device obtains a first input audio stream, a second input audio stream, and a third input audio stream.

Specifically, for an example user interface in which the electronic device obtains the first input audio stream, the second input audio stream, and the third input audio stream, refer to the user interface 53 shown in FIG. 9D.

The first input audio stream is a set of N frames of input audio signals collected by a first microphone of the electronic device, the second input audio stream is a set of N frames of input audio signals collected by a second microphone of the electronic device, and the third input audio stream is a set of N frames of input audio signals collected by a third microphone of the electronic device.

Step S1502: The electronic device determines a first input audio signal from the first audio stream, a second input audio signal from the second audio stream, and a third input audio signal from the third audio stream.

Specifically, the first input audio signal is a frame of input audio signal whose collection time is the earliest among all input audio signals on which no audio zooming is currently performed in the first input audio stream.

The second input audio signal is a frame of input audio signal whose collection time is the earliest among all input audio signals on which no audio zooming is currently performed in the second input audio stream.

The third input audio signal is a frame of input audio signal whose collection time is the earliest among all input audio signals on which no audio zooming is currently performed in the third input audio stream.

Step S1503: The electronic device obtains a first zoom ratio.

Specifically, the first zoom ratio is a zoom ratio of a frame of image corresponding to the first input audio signal, the second input audio signal, and the third input audio signal.

Step S1504: The electronic device performs time-frequency transformation on the first input audio signal, the second input audio signal, and the third input audio signal to obtain the first audio signal, the second audio signal, and the third audio signal.

Specifically, the first audio signal is a signal of the first input audio signal in frequency domain, the second audio signal is a signal of the second input audio signal in frequency domain, and the third audio signal is a signal of the third input audio signal in frequency domain. For a related description of the time-frequency transformation performed by the electronic device, refer to the related description in step S1004. Details are not described herein again.

Step S1505: The electronic device performs first processing on the first audio signal, the second audio signal, and the third audio signal based on focal length information, to obtain a first left channel input audio and a first right channel input audio.

Step S1506: The electronic device performs second processing on the first audio signal, the second audio signal, and the third audio signal to obtain M channels of first sound source audios.

It should be understood that the electronic device may perform step S1405 first and then perform step S1406. Alternatively, the electronic device may perform step S1506 first and then perform step S1505. Alternatively, the electronic device may perform step S1405 and step S1406 at the same time. This is not limited in this embodiment of this application.

Step S1507: The electronic device determines a first target audio in the M channels of first sound source audios based on the first left channel input audio.

Step S1508: The electronic device fuses the first target audio with the first left channel input audio to obtain the first left channel audio.

Step S1509: The electronic device determines a second target audio in the M channels of first sound source audios based on the first right channel input audio.

Step S1510: The electronic device fuses the second target audio with the first right channel input audio to obtain the first right channel audio.

It should be understood that the electronic device may first process the first left channel input audio to obtain the first left channel audio, and then process the first right channel input audio to obtain the first right channel audio; in other words, the electronic device first performs step S1507 and step S1508, and then performs step S1509 and step S1510. Alternatively, the electronic device may first process the first right channel input audio to obtain the first right channel audio, and then process the first left channel input audio to obtain the first left channel audio; in other words, the electronic device first performs step S1509 and step S1510, and then performs step S1507 and step S1508. Alternatively, the electronic device may simultaneously process the first left channel input audio and the first right channel input audio, to simultaneously obtain the first left channel audio and the first right channel audio; in other words, the electronic device simultaneously performs step S1507 and step S1509, and then simultaneously performs step S1508 and step S1510. This is not limited in this embodiment of this application.

Step S1511: The electronic device performs enhancement processing on the first left channel audio and the second right channel audio to obtain a first left channel audio output signal and a first right channel audio output signal.

Step S1512: The electronic device performs frequency-time transformation on the first left channel audio output signal and the first right channel audio output signal to obtain the first left channel output audio and the first right channel output audio.

For step S1505 to step S1512, refer to the descriptions of step S1005 to step S1012. Details are not described herein again.

Step S1513: The electronic device stores the first left channel audio output signal and the first right channel audio output signal.

In some embodiments, when the audio output by the electronic device is a mono audio, the electronic device fuses the first left channel audio output signal and the first right channel audio output signal to obtain and save the first mono audio output signal.

Figure 16:
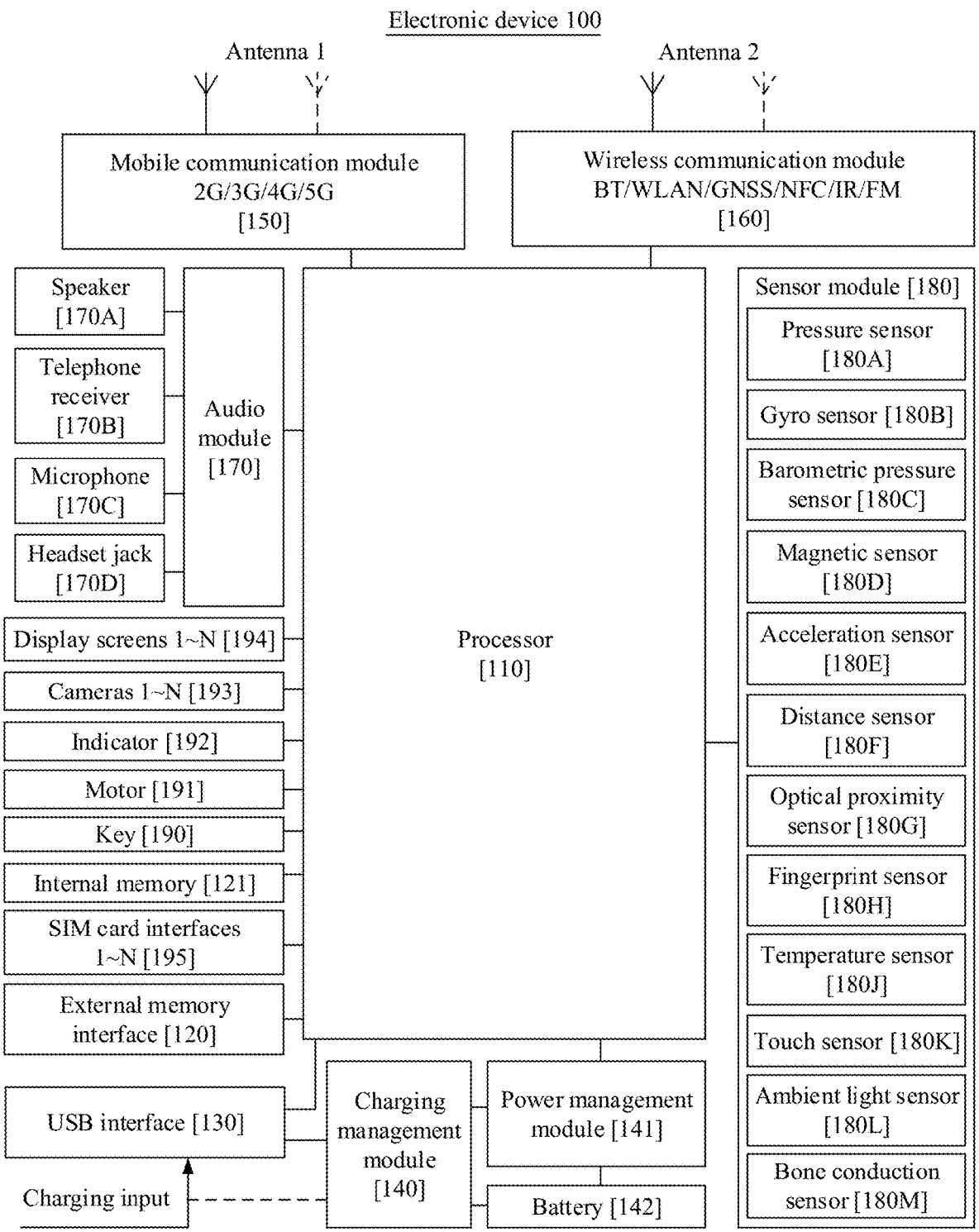
FIG. 16 is a schematic diagram of a hardware structure of an electronic device 100 according to an embodiment of this application.

The following describes the structure of the electronic device 100. FIG. 16 is a schematic diagram of a hardware structure of an electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present invention does not constitute a specific limitation on the electronic device 100. In some other embodiments of this application, the electronic device 100 may include more or fewer components than those shown in the figure, or some components may be combined, or some components may be split, or components are arranged in different manners. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The electronic device 100 implements a display function by using the GPU, the display screen 194, the application processor, and the like. The GPU is an image processing microprocessor, which is connected to the display screen 194 and the application processor. The GPU is configured to perform mathematical and geometric calculations to render graphics. The processor 110 may include one or more GPUs that execute program instructions to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light-emitting diode (active-matrix organic light emitting diode, AMOLED), a flex light-emitting diode (flex light-emitting diode, FLED), Miniled, MicroLed, Micro-oLed, a quantum dot light-emitting diode (quantum dot light emitting diodes, QLED), and the like. In some embodiments, the electronic device 100 may include one or N display screens 194, where N is a positive integer greater than 1. The display screen 194 may be configured to display an image shot by an electronic device.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is opened, light is transmitted to a photosensitive element of the camera through a lens, and an optical signal is converted into an electrical signal. The photosensitive element of the camera transmits the electrical signal to the ISP for processing, so that the ISP converts the electrical signal into an image visible to naked eyes. The ISP can further perform algorithm optimization on noise, brightness, and a skin color of the image. The ISP can further optimize parameters such as exposure and a color temperature in a photographing scene. In some embodiments, the ISP may be disposed in the camera 193.

The digital signal processor is configured to process a digital signal. In addition to processing the digital image signal, the digital signal processor can further process another digital signal. For example, when the electronic device 100 selects a frequency channel number, the digital signal processor is configured to perform Fourier transform or the like on the energy at the frequency channel number.

The NPU is a neural-network (neural-network, NN) computing processor that processes input information rapidly by referring to a structure of a biological neural network, for example, by referring to a transmission mode between human brain neurons, and can further perform self-learning continuously. Applications such as intelligent cognition of the electronic device 100 may be implemented by the NPU, for example, image recognition, face recognition, speech recognition, and text understanding.

The electronic device 100 may implement audio functions by using the audio module 170, the speaker 170A, the telephone receiver 170B, the microphone 170C, the headset jack 170D, the application processor, and the like. For example, the audio functions include music playing and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The speaker 170A, also referred to as a "horn", is configured to convert an audio electrical signal into a sound signal. The electronic device 100 may be used to listen to music or listen to a hands-free call through the speaker 170A.

The telephone receiver 170B, also referred to as an "earpiece", is configured to convert an audio electrical signal into a sound signal. When the electronic device 100 is used to answer a call or listen to voice information, a voice may be listened to by placing the telephone receiver 170B close to a human ear.

The microphone 170C, also referred to as a "mike" or a "mic", is configured to convert a sound signal into an electrical signal. When making a call or sending voice information, a user may place the microphone 170C close to a human mouth and make a sound, to input a sound signal to the microphone 170C. The electronic device 100 may be provided with at least one microphone 170C. In some other embodiments, the electronic device 100 may be provided with two microphones 170C, and may implement a noise reduction function in addition to collecting sound signals. In some other embodiments, the electronic device 100 may alternatively be provided with three, four, or more microphones 170C for collecting sound signals, reducing noise, identifying sound sources, implementing directional recording functions, and the like. In this embodiment of this application, the microphone is used to collect a first audio in a photographing environment.

The touch sensor 180K is also referred to as a "touch panel". The touch sensor 180K may be disposed on the display screen 194, and the touch sensor 180K and the display screen 194 form a touchscreen, which is also referred to as a "touch-controlled screen". The touch sensor 180K is configured to detect a touch operation performed on or near the touch sensor 180K. The touch sensor can transfer a detected touch operation to the application processor to determine a type of a touch event. The display screen 194 may be configured to provide a visual output related to the touch operation. In some other embodiments, the touch sensor 180K may alternatively be disposed on a surface of the electronic device 100, which is different from the position of the display screen 194.

The bone conduction sensor 180M may obtain a vibration signal. In some embodiments, the bone conduction sensor 180M may obtain a vibration signal of a vibrating bone block of a vocal part of a human body.

All or some of the foregoing embodiments may be implemented by software, hardware, firmware, or any combination thereof. When software is used to implement the embodiments, the embodiments may be implemented fully or partially in a form of a computer program product. The computer program product includes one or more computer instructions. When the computer program instructions are loaded and executed on a computer, the procedure or functions according to this application are fully or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, by using a coaxial cable, an optical fiber, or a digital subscriber line) or in a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk), or the like.

A person of ordinary skill in the art may understand that all or some of the processes of the methods in the embodiments may be implemented by a computer program instructing relevant hardware. The program may be stored in a computer-readable storage medium. When the program is executed, the processes in the foregoing method embodiments may be performed. The foregoing storage medium includes any medium that can store program code, such as a ROM, a random access memory RAM, a magnetic disk, or an optical disc.

In conclusion, the foregoing descriptions are only embodiments of the technical solutions of the present invention, and are not intended to limit the protection scope of the present invention. Any modifications, equivalent replacements, improvements, or the like made based on the disclosure of the present invention shall fall within the protection scope of the present invention.

What is claimed is:

1. A video processing method, wherein the method is applied to an electronic device, and comprises:
   starting, by the electronic device, a camera;
   displaying a preview interface, wherein the preview interface comprises a first control;
   detecting a first operation with respect to the first control;
   starting photographing in response to the first operation;
   displaying a photographing interface, wherein the photographing interface comprises a second control and the second control is used to adjust a zoom ratio;
   displaying a first photographed image at a first moment when the zoom ratio is a first zoom ratio;
   collecting, by a microphone, a first audio at the first moment;
   detecting a third operation with respect to a third control; and stopping photographing and saving a first video in response to the third operation; and the method further comprises: processing the first audio to obtain a first left channel output audio and a first right channel output audio, wherein the processing the first audio to obtain a first left channel output audio and a first right channel output audio comprises:

performing first processing on the first audio based on the first zoom ratio to obtain a first left channel input audio and a first right channel input audio;

performing second processing on the first audio to obtain M channels of first sound source audios, wherein M represents a quantity of microphones of the electronic device;

fusing the first left channel input audio with a first target audio to obtain a first left channel audio, wherein the first target audio is a sound source audio having highest correlation with the first left channel input audio among the M channels of first sound source audios;

fusing the first right channel input audio with a second target audio to obtain a first right channel audio, wherein the second target audio is a sound source audio having highest correlation with the first right channel input audio among the M channels of first sound source audios; and performing enhancement processing on the first left channel audio and the first right channel audio to obtain the first left channel output audio and the first right channel output audio.

2. The method according to claim 1, wherein the first photographed image comprises a first target object and a second target object, and the method further comprises:

detecting a second operation with respect to the second control;

adjusting the zoom ratio to be a second zoom ratio in response to the second operation, wherein the second zoom ratio is greater than the first zoom ratio;

displaying a second photographed image at a second moment, wherein the second photographed image comprises the first target object and does not comprise the second target object;

collecting, by the microphone, a second audio at the second moment, wherein the second audio comprises a first sound corresponding to the first target object and a second sound corresponding to the second target object; and processing the second audio to obtain a second left channel output audio and a second right channel output audio, wherein the second left channel output audio and the second right channel output audio comprise a third sound and a fourth sound, the third sound corresponds to the first target object, the fourth sound corresponds to the second target object, the third sound is enhanced with respect to the first sound, and the fourth sound is suppressed with respect to the second sound.

3. The method according to claim 2, wherein the processing the second audio to obtain a second left channel output audio and a second right channel output audio comprises:

performing first processing on the second audio based on the second zoom ratio to obtain a second left channel input audio and a second right channel input audio;

performing second processing on the second audio to obtain M channels of second sound source audios, wherein M represents a quantity of microphones of the electronic device;

fusing the second left channel input audio with a third target audio to obtain a second left channel audio, wherein the third target audio is a sound source audio having highest correlation with the second left channel input audio among the M channels of second sound source audios;

fusing the second right channel input audio with a fourth target audio to obtain a second right channel audio, wherein the fourth target audio is a sound source audio having highest correlation with the second right channel input audio among the M channels of second sound source audios; and performing enhancement processing on the second left channel audio and the second right channel audio to obtain the second left channel output audio and the second right channel output audio.

4. The method according to claim 1, wherein the performing second processing on the first audio to obtain M channels of first sound source audios specifically comprises:

obtaining the M channels of first sound source audios through calculation according to the formula $Y(\omega)=\Sigma_{i=1}^{M}W_i(\omega)x_i(\omega)$, wherein $x_i(\omega)$ represents an audio signal of a first audio collected by the $i^{th}$ microphone in frequency domain, $W_i(\omega)$ represents a first non-negative matrix corresponding to the $i^{th}$ microphone, $Y(\omega)$ represents a first matrix whose size is M*L, and each row vector of the first matrix is one channel of first sound source audio.

5. The method according to claim 1, wherein the performing first processing on the first audio based on the first zoom ratio to obtain a first left channel input audio and a first right channel input audio specifically comprises:

obtaining the first left channel audio according to the formula $y_{l1}(\omega)=\alpha_1*y_1(\omega)+(1-\alpha_1)*y_2(\omega)$; and obtaining the first right channel audio according to the formula $y_{r1}(\omega)=\alpha_1*y_3(\omega)+(1-\alpha_1)*y_2(\omega)$, wherein $y_{l1}$ represents the first left channel input audio, $y_{r1}(\omega)$ represents the first right channel input audio, $\alpha_1$ represents a fusion coefficient obtained based on the first zoom ratio, $y_1(\omega)$ represents a first beam obtained based on the first audio and a first filter coefficient, $y_2(\omega)$ represents a second beam obtained based on the first audio and a second filter coefficient, and $y_3(\omega)$ represents a third beam obtained based on the first audio and a third filter coefficient.

6. The method according to claim 1, before the performing first processing on the first audio based on the first zoom ratio to obtain a first left channel input audio and a first right channel input audio, further comprising:

obtaining a first beam, a second beam, and a third beam respectively according to the formula $y_1(\omega)=\Sigma_{i=1}^{M}w_{1i}(\omega)x_{i1}(\omega)$, the formula $y_2(\omega)=\Sigma_{i=1}^{M}w_{2i}(\omega)x_{i1}(\omega)$, and the formula $y_3(\omega)=\Sigma_{i=1}^{M}w_{3i}(\omega)x_{i1}(\omega)$, wherein $y_1(\omega)$ represents the first beam, $y_2(\omega)$ represents the second beam, $y_3(\omega)$ represents the third beam, $w_{1i}(\omega)$ represents a first filter coefficient corresponding to the $i^{th}$ microphone in a first direction, $w_{2i}(\omega)$ represents a second filter coefficient corresponding to the $i^{th}$ microphone in a second direction, $w_{3i}(\omega)$ represents a third filter coefficient corresponding to the $i^{th}$ microphone in a third direction, $x_{i1}(\omega)$ represents the first audio collected by the $i^{th}$ microphone, the first direction is any direction within a range of 10° counterclockwise from the front to 90° counterclockwise from the front of the electronic device, the second direction is any direction within a range of 10° counterclockwise from the front to 10° clockwise from the front of the electronic device, and the third direction is any direction within a range of 10° clockwise from the front to 90° clockwise from the front of the electronic device.

7. The method according to claim 1,
before the fusing the first left channel input audio with a first target sound source to obtain a first left channel audio, further comprising:
calculating a correlation value between the first left channel input audio and the M channels of first sound source audios according to the formula $$\gamma_i = \frac{\emptyset_{li}}{\sqrt{\emptyset_{ll\_1}\emptyset_{ii}}},$$

$\emptyset_{li}$ represents $E\{y_{l1}(\omega)Y_i(\omega)^*\}$, $\emptyset_{ll\_1}$ represents $E\{y_{l1}(\omega)y_{l1}(\omega)^*\}$, $\emptyset_{ii}$ represents $E\{Y_i(\omega)Y_i(\omega)^*\}$, $\gamma_i$ represents a correlation value between the first left channel input audio and the $i^{th}$ channel of first sound source audio, $y_{l1}(\omega)$ represents the first left channel input audio, and $Y_i(\omega)$ represents the $i^{th}$ channel of first sound source audio;
if there is only one maximum correlation value among the M correlation values, determining a first sound source audio having the maximum correlation value as the first target audio; and
if there are a plurality of maximum correlation values among the M correlation values, calculating an average value of first sound source audios corresponding to the plurality of maximum correlation values to obtain the first target audio;
before the fusing the first right channel input audio with a second target sound source to obtain a first right channel audio, further comprising:
calculating a correlation value between the first right channel input audio and the M channels of first sound source audios according to the formula $$\gamma_j = \frac{\emptyset_{rj}}{\sqrt{\emptyset_{rr\_1}\emptyset_{jj}}},$$

wherein $\emptyset_{rj}$ represents $E\{y_{r1}(\omega)Y_j(\omega)^*\}$, $\emptyset_{rr\_1}$ represents $E\{y_{r1}(\omega)y_{r1}(\omega)^*\}$, $\emptyset_{jj}$ represents $E\{Y_j(\omega)Y_j(\omega)^*\}$, $\gamma_j$ represents a correlation value between the first right channel input audio and the $j^{th}$ channel of first sound source audio, $y_{r1}(\omega)$ represents the first right channel input audio, and $Y_j(\omega)$ represents the $j^{th}$ channel of first sound source audio; and
determining a first sound source audio having a maximum correlation value among the M correlation values as the second target audio.

8. The method according to claim 1, wherein the fusing the first left channel input audio with a first target sound source to obtain a first left channel audio specifically comprises:
obtaining a second left channel audio according to the formula $y_{l1}'(\omega)=\beta_1*y_{l1}(\omega) +(1-\beta_1)*Y_{l1}(\omega)$, wherein $y_{l1}'(\omega)$ represents the first left channel audio, $\beta_1$ represents the first fusion coefficient, $Y_{l1}(\omega)$ represents the first target audio, and $y_{l1}(\omega)$ represents the first left channel input audio.

9. The method according to claim 1, wherein the fusing the first right channel input audio with a second target sound source to obtain a first right channel audio specifically comprises:

obtaining the first right channel audio according to the formula $y_{r1}'(\omega)=\beta_1*y_{r1}(\omega) +(1-\beta_1)*Y_{r2}(\omega)$, wherein $y_{r1}'(\omega)$ represents the first left channel audio, $\beta_1$ represents the first fusion coefficient, $Y_{r2}(\omega)$ represents the first target audio, and $y_{r1}(\omega)$ represents the first right channel input audio.

10. An electronic device, comprising a memory, a processor, and a touchscreen, wherein
the touchscreen is configured to display content;
the memory is configured to store a computer program, wherein the computer program comprises program instructions; and
the processor is configured to invoke the program instructions to enable the electronic device to perform:
starting, by the electronic device, a camera;
displaying a preview interface, wherein the preview interface comprises a first control;
detecting a first operation with respect to the first control;
starting photographing in response to the first operation;
displaying a photographing interface, wherein the photographing interface comprises a second control and the second control is used to adjust a zoom ratio;
displaying a first photographed image at a first moment when the zoom ratio is a first zoom ratio;
collecting, by a microphone, a first audio at the first moment;
detecting a third operation with respect to a third control; and
stopping photographing and saving a first video in response to the third operation; and
processing the first audio to obtain a first left channel output audio and a first right channel output audio, wherein
the processing the first audio to obtain a first left channel output audio and a first right channel output audio comprises:
performing first processing on the first audio based on the first zoom ratio to obtain a first left channel input audio and a first right channel input audio;
performing second processing on the first audio to obtain M channels of first sound source audios, wherein M represents a quantity of microphones of the electronic device;
fusing the first left channel input audio with a first target audio to obtain a first left channel audio, wherein the first target audio is a sound source audio having highest correlation with the first left channel input audio among the M channels of first sound source audios;
fusing the first right channel input audio with a second target audio to obtain a first right channel audio, wherein the second target audio is a sound source audio having highest correlation with the first right channel input audio among the M channels of first sound source audios; and
performing enhancement processing on the first left channel audio and the first right channel audio to obtain the first left channel output audio and the first right channel output audio.

11. The electronic device according to claim 10, wherein the first photographed image comprises a first target object and a second target object, and the method further comprises:
detecting a second operation with respect to the second control;
adjusting the zoom ratio to be a second zoom ratio in response to the second operation, wherein the second zoom ratio is greater than the first zoom ratio;

displaying a second photographed image at a second moment, wherein the second photographed image comprises the first target object and does not comprise the second target object;

collecting, by the microphone, a second audio at the second moment, wherein the second audio comprises a first sound corresponding to the first target object and a second sound corresponding to the second target object; and processing the second audio to obtain a second left channel output audio and a second right channel output audio, wherein the second left channel output audio and the second right channel output audio comprise a third sound and a fourth sound, the third sound corresponds to the first target object, the fourth sound corresponds to the second target object, the third sound is enhanced with respect to the first sound, and the fourth sound is suppressed with respect to the second sound.

12. The electronic device according to claim 11, wherein the processing the second audio to obtain a second left channel output audio and a second right channel output audio comprises:

performing first processing on the second audio based on the second zoom ratio to obtain a second left channel input audio and a second right channel input audio;

performing second processing on the second audio to obtain M channels of second sound source audios, wherein M represents a quantity of microphones of the electronic device;

fusing the second left channel input audio with a third target audio to obtain a second left channel audio, wherein the third target audio is a sound source audio having highest correlation with the second left channel input audio among the M channels of second sound source audios;

fusing the second right channel input audio with a fourth target audio to obtain a second right channel audio, wherein the fourth target audio is a sound source audio having highest correlation with the second right channel input audio among the M channels of second sound source audios; and performing enhancement processing on the second left channel audio and the second right channel audio to obtain the second left channel output audio and the second right channel output audio.

13. The electronic device according to claim 10, wherein the performing second processing on the first audio to obtain M channels of first sound source audios specifically comprises:

obtaining the M channels of first sound source audios through calculation according to the formula $Y(\omega)=\Sigma_{i=1}^{M}W_i(\omega)x_i(\omega)$, wherein $x_i(\omega)$ represents an audio signal of a first audio collected by the $i^{th}$ microphone in frequency domain, $W_i(\omega)$ represents a first non-negative matrix corresponding to the $i^{th}$ microphone, $Y(\omega)$ represents a first matrix whose size is M*L, and each row vector of the first matrix is one channel of first sound source audio.

14. The electronic device according to claim 10, wherein the performing first processing on the first audio based on the first zoom ratio to obtain a first left channel input audio and a first right channel input audio specifically comprises:

obtaining the first left channel audio according to the formula $y_{l1}(\omega)=\alpha_1*y_1(\omega)+(1-\alpha_1)*y_2(\omega)$; and obtaining the first right channel audio according to the formula $y_{r1}(\omega)=\alpha_1*y_3(\omega)+(1-\alpha_1)*y_2(\omega)$, wherein $y_{l1}$ represents the first left channel input audio, $y_{r1}(\omega)$ represents the first right channel input audio, $\alpha_1$ represents a fusion coefficient obtained based on the first zoom ratio, $y_1(\omega)$ represents a first beam obtained based on the first audio and a first filter coefficient, $y_2(\omega)$ represents a second beam obtained based on the first audio and a second filter coefficient, and $y_3(\omega)$ represents a third beam obtained based on the first audio and a third filter coefficient.

15. The electronic device according to claim 10, before the performing first processing on the first audio based on the first zoom ratio to obtain a first left channel input audio and a first right channel input audio, further comprising:

obtaining a first beam, a second beam, and a third beam respectively according to the formula $y_1(\omega)=\Sigma_{i=1}^{M}w_{1i}(\omega)x_{i1}(\omega)$, the formula $y_2(\omega)=\Sigma_{i=1}^{M}w_{2i}(\omega)x_{i1}(\omega)$, and the formula $y_3(\omega)=\Sigma_{i=1}^{M}w_{3i}(\omega)x_{i1}(\omega)$, wherein $y_1(\omega)$ represents the first beam, $y_2(\omega)$ represents the second beam, $y_3(\omega)$ represents the third beam, $w_{1i}(\omega)$ represents a first filter coefficient corresponding to the $i^{th}$ microphone in a first direction, $w_{2i}(\omega)$ represents a second filter coefficient corresponding to the $i^{th}$ microphone in a second direction, $w_{3i}(\omega)$ represents a third filter coefficient corresponding to the $i^{th}$ microphone in a third direction, $x_{i1}(\omega)$ represents the first audio collected by the $i^{th}$ microphone, the first direction is any direction within a range of 10° counterclockwise from the front to 90° counterclockwise from the front of the electronic device, the second direction is any direction within a range of 10° counterclockwise from the front to 10° clockwise from the front of the electronic device, and the third direction is any direction within a range of 10° clockwise from the front to 90° clockwise from the front of the electronic device.

16. The electronic device according to claim 10, before the fusing the first left channel input audio with a first target sound source to obtain a first left channel audio, further comprising:

calculating a correlation value between the first left channel input audio and the M channels of first sound source audios according to the formula $$\gamma_i = \frac{\emptyset_{li}}{\sqrt{\emptyset_{ll\_1}\emptyset_{ii}}},$$

$\emptyset_{li}$ represents $E\{y_{l1}(\omega)Y_i(\omega)*\}$, $\emptyset_{ll\_1}$ represents $E\{y_{l1}(\omega)y_{l1}(\omega)*\}$, $\emptyset_{ii}$ represents $E\{Y_1(\omega)Y_1(\omega)*\}$, $\gamma_1$ represents a correlation value between the first left channel input audio and the $i^{th}$ channel of first sound source audio, $y_{l1}(\omega)$ represents the first left channel input audio, and $Y_i(\omega)$ represents the $i^{th}$ channel of first sound source audio;

if there is only one maximum correlation value among the M correlation values, determining a first sound source audio having the maximum correlation value as the first target audio; and if there are a plurality of maximum correlation values among the M correlation values, calculating an average value of first sound source audios corresponding to the plurality of maximum correlation values to obtain the first target audio.

17. The electronic device according to claim 10, before the fusing the first right channel input audio with a second target sound source to obtain a first right channel audio, further comprising:

calculating a correlation value between the first right channel input audio and the M channels of first sound source audios according to the formula $$\gamma_j = \frac{\emptyset_{rj}}{\sqrt{\emptyset_{rr\_1}\emptyset_{jj}}},$$

wherein $\emptyset_{rj}$ represents $\{y_{r1}(\omega)Y_j(\omega)^*\}$, $\emptyset_{rr\_1}$ represents $E\{y_{r1}(\omega)y_{r1}(\omega)^*\}$, $\emptyset_{jj}$ represents $E\{Y_j(\omega)Y_j(\omega)^*\}$, $\gamma_j$ represents a correlation value between the first right channel input audio and the $j^{th}$ channel of first sound source audio, $y_{r1}(\omega)$ represents the first right channel input audio, and $Y_j(\omega)$ represents the $j^{th}$ channel of first sound source audio; and determining a first sound source audio having a maximum correlation value among the M correlation values as the second target audio.

18. The electronic device according to claim 10, wherein the fusing the first left channel input audio with a first target sound source to obtain a first left channel audio specifically comprises:

obtaining a second left channel audio according to the formula $y_{l1}'(\omega)=\beta_1 *y_{l1}(\omega) +(1-\beta_1)*Y_{t1}(\omega)$, wherein $y_{l1}'(\omega)$ represents the first left channel audio, $\beta_1$ represents the first fusion coefficient, $Y_{t1}(\omega)$ represents the first target audio $y_{l1}(\omega)$ represents the first left channel input audio.

19. The electronic device according to claim 10, wherein the fusing the first right channel input audio with a second target sound source to obtain a first right channel audio specifically comprises:

obtaining the first right channel audio according to the formula $y_{r1}'(\omega)=\beta_1 *y_{r1}(\omega)+(1-\beta_1)*Y_{t2}(\omega)$, wherein $y_{r1}'(\omega)$ represents the first left channel audio, $\beta_1$ represents the first fusion coefficient, $Y_{t2}(\omega)$ represents the first target audio, and $y_{r1}(\omega)$ represents the first right channel input audio.

20. A non-transitory machine readable storage medium, wherein the non-transitory machine readable storage medium stores a computer program, and when the computer program is executed by a processor, an electronic device is caused to execute:

starting a camera;

displaying a preview interface, wherein the preview interface comprises a first control;

detecting a first operation with respect to the first control;

starting photographing in response to the first operation;

displaying a photographing interface, wherein the photographing interface comprises a second control and the second control is used to adjust a zoom ratio;

displaying a first photographed image at a first moment when the zoom ratio is a first zoom ratio;

collecting, by a microphone, a first audio at the first moment;

detecting a third operation with respect to a third control; and stopping photographing and saving a first video in response to the third operation; and processing the first audio to obtain a first left channel output audio and a first right channel output audio, wherein the processing the first audio to obtain a first left channel output audio and a first right channel output audio comprises:

performing first processing on the first audio based on the first zoom ratio to obtain a first left channel input audio and a first right channel input audio;

performing second processing on the first audio to obtain M channels of first sound source audios, wherein M represents a quantity of microphones of the electronic device;

fusing the first left channel input audio with a first target audio to obtain a first left channel audio, wherein the first target audio is a sound source audio having highest correlation with the first left channel input audio among the M channels of first sound source audios;

fusing the first right channel input audio with a second target audio to obtain a first right channel audio, wherein the second target audio is a sound source audio having highest correlation with the first right channel input audio among the M channels of first sound source audios; and performing enhancement processing on the first left channel audio and the first right channel audio to obtain the first left channel output audio and the first right channel output audio.

* * * * *